(12) United States Patent
Kubo et al.

(10) Patent No.: US 9,133,397 B2
(45) Date of Patent: *Sep. 15, 2015

(54) TRICYCLIC COMPOUND HAVING A PLURALITY OF CF2O BONDING GROUPS, LIQUID CRYSTAL COMPOSITION, AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Takahiro Kubo, Chiba (JP); Yasuyuki Gotoh, Tokyo (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 19 days.

This patent is subject to a terminal disclaimer.

(21) Appl. No.: 13/856,760

(22) Filed: Apr. 4, 2013

(65) Prior Publication Data

US 2013/0271719 A1    Oct. 17, 2013

(30) Foreign Application Priority Data

Apr. 17, 2012 (JP) ................................ 2012-093793

(51) Int. Cl.
*C09K 19/52* (2006.01)
*C09K 19/30* (2006.01)
*C09K 19/04* (2006.01)

(52) U.S. Cl.
CPC ..... *C09K 19/3066* (2013.01); *C09K 2019/0466* (2013.01)

(58) Field of Classification Search
CPC . C09K 19/42; C09K 19/3001; C09K 19/3402
USPC .............................. 252/299.01, 299.63, 299.6
See application file for complete search history.

(56) References Cited

U.S. PATENT DOCUMENTS

| | | | |
|---|---|---|---|
| 5,262,085 A | | 11/1993 | Bartmann et al. |
| 5,858,270 A | * | 1/1999 | Matsui et al. ............. 252/299.01 |
| 6,548,126 B1 | * | 4/2003 | Sasada et al. .................. 428/1.1 |
| 2006/0210725 A1 | * | 9/2006 | Fujita et al. ..................... 428/1.1 |
| 2008/0017830 A1 | * | 1/2008 | Takeda ........................ 252/299.1 |
| 2009/0302273 A1 | | 12/2009 | Tanaka |

FOREIGN PATENT DOCUMENTS

| | | |
|---|---|---|
| DE | 40 23 106 | 1/1992 |
| EP | 0 786 445 | 7/1997 |
| EP | 0 844 229 | 5/1998 |
| EP | 2 351 741 | 8/2011 |
| GB | 2 229 438 | 9/1990 |
| JP | 10-204016 | 8/1998 |
| JP | 2008-015286 | 1/2008 |
| WO | 96/11897 | 4/1996 |
| WO | 2010/047260 | 4/2010 |

* cited by examiner

*Primary Examiner* — Chanceity Robinson
(74) *Attorney, Agent, or Firm* — Wenderoth, Lind & Ponack, L.L.P.

(57) ABSTRACT

To provide a liquid crystal compound having a large positive value of dielectric anisotropy and a small viscosity. The compound is represented by formula (1):

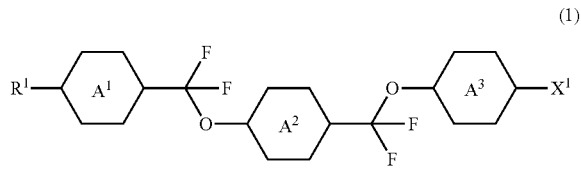

(1)

wherein, in formula (1), $R^1$ is alkyl having 1 to 20 carbons or the like; ring $A^1$ is 1,4-cyclohexylene or the like; ring $A^2$ is 1,4-phenylene, 2-fluoro-1,4-phenylene, 2,6-difluoro-1,4-phenylene or the like; ring $A^3$ is 1,4-cyclohexylene, 1,4-phenylene, 2-fluoro-1,4-phenylene, 2,6-difluoro-1,4-phenylene or the like; and $X^1$ is halogen, alkyl having 1 to 10 carbons or the like, and in the alkyl, at least one of hydrogen may be replaced by halogen.

11 Claims, No Drawings

TRICYCLIC COMPOUND HAVING A PLURALITY OF CF2O BONDING GROUPS, LIQUID CRYSTAL COMPOSITION, AND LIQUID CRYSTAL DISPLAY DEVICE

TECHNICAL FIELD

The invention relates to a liquid crystal compound, a liquid crystal composition and a liquid crystal display device. More specifically, the invention relates to a tricyclic compound having a plurality of $CF_2O$ bonding groups, a liquid crystal composition containing the compound and having a nematic phase, and a liquid crystal display device using the composition.

BACKGROUND ART

A liquid crystal display device is widely utilized for a display of a personal computer, a television and so forth. The display device utilizes dielectric anisotropy, optical anisotropy or the like of a liquid crystal compound. As an operating mode of the display device, various modes are known, such as a phase change (PC) mode, a twisted nematic (TN) mode, a super twisted nematic (STN) mode, a bistable twisted nematic (BTN) mode, an electrically controlled birefringence (ECB) mode, an optically compensated bend (OCB) mode, an in-plane switching (IPS) mode, a vertical alignment (VA) mode and a polymer sustained alignment (PSA) mode.

In such a liquid crystal display device, a liquid crystal composition having suitable physical properties is used. In order to further improve characteristics of the display device, the liquid crystal compound contained in the composition preferably has physical properties as shown in (1) to (8) below:
(1) high stability to heat, light and so forth;
(2) high clearing point;
(3) low minimum temperature of a liquid crystal phase;
(4) small viscosity ($\eta$);
(5) large value of dielectric anisotropy ($\Delta\epsilon$);
(6) suitable value of optical anisotropy ($\Delta n$);
(7) suitable elastic constant (K); and
(8) excellent compatibility with other liquid crystal compounds.

An effect of the physical properties of the liquid crystal compound on the characteristics of the liquid crystal display device is as described below.

A compound having a high stability to heat, light and so forth as described in (1) increases a voltage holding ratio of a device. Thus, a service life of the display device becomes long. A compound having a high clearing point as described in (2) extends a temperature range in which the device can be used. A compound having a low minimum temperature of a liquid crystal phase such as a nematic phase or a smectic phase as described in (3), particularly, a compound having a low minimum temperature of the nematic phase also extends the temperature range in which the device can be used. A compound having a small viscosity as described in (4) shortens a response time of the device.

A compound showing a large dielectric anisotropy as described in (5) decreases a threshold voltage of the display device. Thus, an electric power consumption of the display device becomes small. As is well known, the threshold voltage ($V_{th}$) is expressed by an equation as described below (H. J. Deuling, et al., Mol. Cryst. Liq. Cryst., 27 (1975), 81).

$$V_{th} = \pi(K/\epsilon_0\Delta\epsilon)^{1/2}$$

In the equation, K is an elastic constant of a liquid crystal material, and $\epsilon_0$ is a dielectric constant of vacuum.

A compound showing a suitable optical anisotropy as described in (6) improves a contrast of the display device. According to a design of the display device, a compound showing a large optical anisotropy or small optical anisotropy, more specifically, a compound showing a suitable optical anisotropy is required. When a response time is shortened by decreasing a cell gap of the display device, a compound showing a large optical anisotropy is suitable.

With regard to (7), a compound having a large elastic constant shortens a response time of the display device, and a compound having a small elastic constant decreases a threshold voltage of the display device. Accordingly, a suitable elastic constant is required according to characteristics to be desirably improved.

A compound having excellent compatibility with other liquid crystal compounds as described in (8) is preferred. The reason is that such a compound is useful in view of adjusting physical properties of a liquid crystal composition by mixing two or more kinds of liquid crystal compounds having different physical properties.

Various kinds of liquid crystal compounds showing a large dielectric anisotropy and a large optical anisotropy have been synthesized so far, and some of the compounds have been put in practical use.

For example, Patent literature Nos. 1 to 3 disclose a compound having a $CF_2O$ bonding group. However, the compounds have an insufficiently high value of dielectric anisotropy in view of requirements of a marketplace. Therefore, when a liquid crystal composition containing each of the compounds is prepared, $V_{th}$ cannot be sufficiently decreased in view of the requirements of the marketplace.

Furthermore, Patent literature Nos. 4 to 5 discloses a tricyclic compound (compounds (S-1) to (S-2)) having two $CF_2O$ bonding groups. However, compound (S-1) has a low phase transition temperature between a liquid crystal phase and an isotropic phase, and compound (S-2) has a small value of optical anisotropy.

Moreover, Patent literature Nos. 6 to 7 disclose a pentacyclic compound having two $CF_2O$ bonding groups (compounds (S-3) to (S-4)). However, the compounds (S-3) to (S-4) have an insufficiently small viscosity in view of requirements of a marketplace.

Formula 1

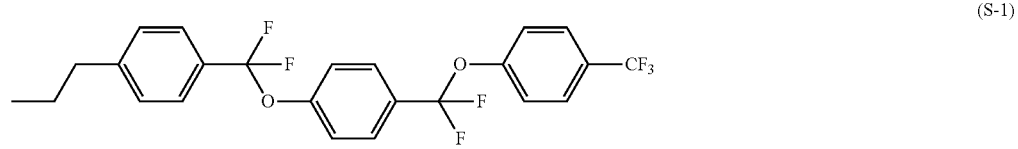

(S-1)

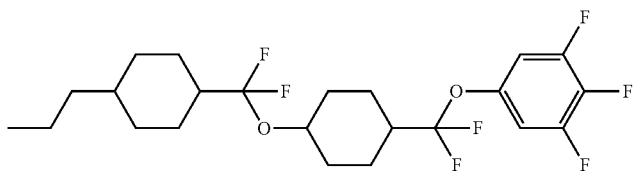

(S-2)

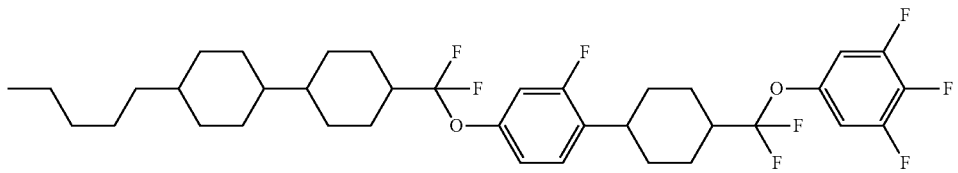

(S-3)

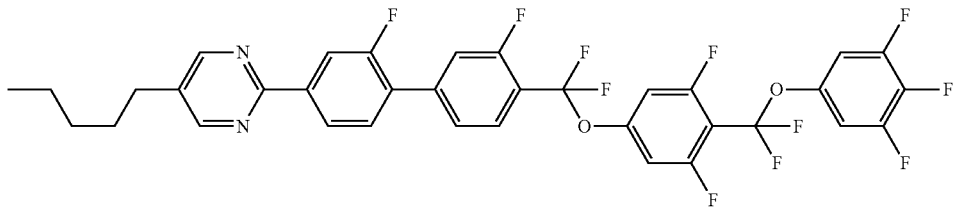

(S-4)

CITATION LIST

Patent Literature

Patent literature No. 1: WO 96/011897 A.
Patent literature No. 2: GB 2229438 B.
Patent literature No. 3: DE 4023106 A.
Patent literature No. 4: JP 2008-15286 A.
Patent literature No. 5: JP H10-204016 A.
Patent literature No. 6: US 2009/0302273 A.
Patent literature No. 7: WO 2010/047260 A.

SUMMARY OF INVENTION

Technical Problem

An object of the invention is to provide a compound having physical properties such as a large positive value of dielectric anisotropy (Δ∈), and a small viscosity, as is excellent as a liquid crystal compound, a liquid crystal composition containing the compound and a liquid crystal display device including the composition.

Solution to Problem

The present inventors have diligently conducted research to achieve the object. As a result, the present inventors have found that the object can be achieved by a tricyclic compound having a plurality of CF$_2$O bonding groups as constituted as described below, a liquid crystal composition containing the tricyclic compound, and a liquid crystal display device including the liquid crystal composition, and thus completed the invention.

More specifically, the invention concerns a compound represented by formula (1).

Formula 2

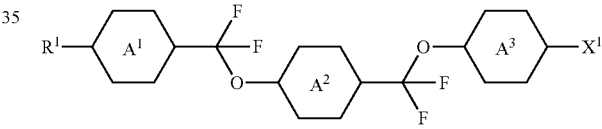

(1)

In formula (1), $R^1$ is hydrogen, halogen or alkyl having 1 to 20 carbons, and in the alkyl, at least one of —CH$_2$— may be replaced by —O— or —S—, at least one of —(CH$_2$)$_2$— may be replaced by —CH=CH—, and at least one of hydrogen may be replaced by halogen; ring $A^1$ is 1,4-cyclohexylene, 2-fluoro-1,4-phenylene, 2,6-difluoro-1,4-phenylene, 1,4-cyclohexenylene, pyrimidine-2,5-diyl, pyridine-2,5-diyl, 1,3-dioxane-2,5-diyl or tetrahydropyran-2,5-diyl; ring $A^2$ is 1,4-phenylene, 2-fluoro-1,4-phenylene, 2,6-difluoro-1,4-phenylene, 1,4-cyclohexenylene, pyrimidine-2,5-diyl, pyridine-2,5-diyl, 1,3-dioxane-2,5-diyl or tetrahydropyran-2,5-diyl; ring $A^3$ is 1,4-cyclohexylene, 1,4-phenylene, 2-fluoro-1,4-phenylene, 2,6-difluoro-1,4-phenylene, 1,4-cyclohexenylene, pyrimidine-2,5-diyl, pyridine-2,5-diyl, 1,3-dioxane-2,5-diyl or tetrahydropyran-2,5-diyl; and $X^1$ is hydrogen, halogen, —C≡N, —N=C=S, —SF$_5$ or alkyl having 1 to 10 carbons, and in the alkyl, at least one of —CH$_2$— may be replaced by —O— or —S—, at least one of —(CH$_2$)$_2$— may be replaced by —CH=CH—, and at least one of hydrogen may be replaced by halogen.

The invention also concerns a liquid crystal composition containing the compound.

The invention further concerns a liquid crystal display device including the composition.

The compound of the invention is preferably represented by formula (1-1).

Formula 3

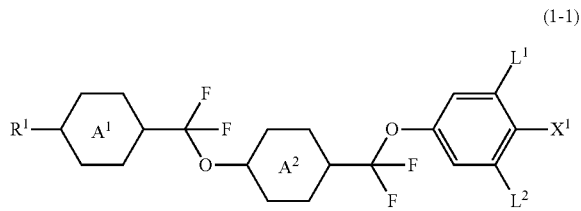

In formula (1-1), $R^1$ is alkyl having 1 to 15 carbons, and in the alkyl, at least one of —$CH_2$— may be replaced by —O— or —S—, at least one of —$(CH_2)_2$— may be replaced by —CH=CH—, and at least one of hydrogen may be replaced by fluorine; ring $A^1$ is 1,4-cyclohexylene, 2-fluoro-1,4-phenylene, 2,6-difluoro-1,4-phenylene, 1,4-cyclohexenylene, 1,3-dioxane-2,5-diyl or tetrahydropyran-2,5-diyl; ring $A^2$ is 1,4-phenylene, 2-fluoro-1,4-phenylene, 2,6-difluoro-1,4-phenylene, 1,4-cyclohexenylene, 1,3-dioxane-2,5-diyl or tetrahydropyran-2,5-diyl;

$L^1$ and $L^2$ are independently hydrogen or fluorine; and $X^1$ is fluorine or alkyl having 1 to 10 carbons, and in the alkyl, at least one of —$CH_2$— may be replaced by —O— or —S—, at least one of —$(CH_2)_2$— may be replaced by —CH=CH—, and at least one of hydrogen may be replaced by fluorine.

The compound of the invention is further preferably represented by formula (1-1-1).

Formula 4

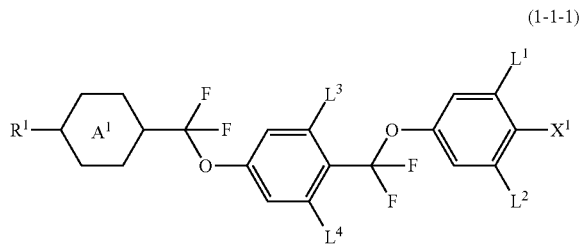

In formula (1-1-1), $R^1$ is alkyl having 1 to 10 carbons, and in the alkyl, at least one of —$CH_2$— may be replaced by —O—, at least one of —$(CH_2)_2$— may be replaced by —CH=CH—; ring $A^1$ is 1,4-cyclohexylene, 2-fluoro-1,4-phenylene, 2,6-difluoro-1,4-phenylene, 1,3-dioxane-2,5-diyl or tetrahydropyran-2,5-diyl; $L^1$, $L^2$, $L^3$ and $L^4$ are independently hydrogen or fluorine; and $X^1$ is fluorine or —$CF_3$.

The compound of the invention is still further preferably represented by any one of formulas (1-1-1-1) to (1-1-1-3).

Formula 5

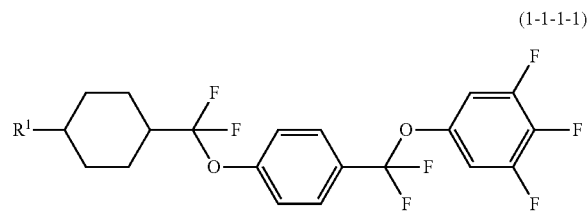

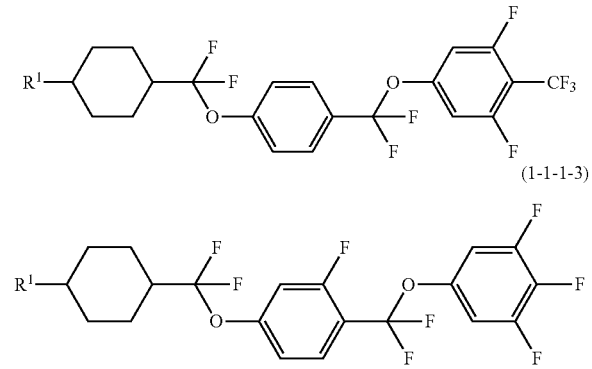

In formulas (1-1-1-1) to (1-1-1-3), $R^1$ is alkyl having 1 to 10 carbons.

The invention also concerns a liquid crystal composition containing at least one kind of the tricyclic compound described above.

The composition preferably contains at least one kind of compound selected from the group of compounds represented by formulas (2) to (4) as described later. The composition also preferably further contains a compound represented by formula (5) as described later. The composition also preferably further contains at least one kind of compound selected from the group of compounds represented by formulas (6) to (11) as described later. The composition also preferably further contains at least one kind of compound selected from the group of compounds represented by formulas (12) to (14) as described later.

The composition also preferably further contains an optically active compound; and also preferably further contains at least one kind selected from an antioxidant and an ultraviolet light absorber.

Moreover, the invention concerns a liquid crystal display device including the liquid crystal composition.

Advantageous Effects of Invention

The invention can provide a compound having physical properties such as a large positive value of dielectric anisotropy (Δ∈) and a small viscosity, as is excellent as a liquid crystal compound, a liquid crystal composition containing the compound, and a liquid crystal display device including the composition.

DESCRIPTION OF EMBODIMENTS

Hereinafter, a tricyclic compound having a plurality of $CF_2O$ bonding groups, a liquid crystal composition containing the compound, and a liquid crystal display device including the liquid crystal composition according to the present invention will be explained in detail with showing specific examples.

Usage of terms herein is as described below.

"Liquid crystal compound" is a generic term for a compound having a liquid crystal phase such as a nematic phase or a smectic phase, and a compound having no liquid crystal phase but being useful as a component of the liquid crystal composition.

"Liquid crystal display device" is a generic term for a liquid crystal display panel and a liquid crystal display module.

"Liquid crystal display device" may be occasionally abbreviated as "display device" or "device."

"Clearing point" is one of values of physical properties as measured using a liquid crystal compound per se as a sample, and is a phase transition temperature between the liquid crystal phase (examples: nematic phase or smectic phase) and an isotropic phase in the liquid crystal compound.

"Minimum temperature of the liquid crystal phase" is one of the values of physical properties as measured using a liquid crystal compound per se as a sample, and is a phase transition temperature between a crystal phase and the liquid crystal phase (examples: nematic phase or smectic phase) in the liquid crystal compound.

"Maximum temperature of the nematic phase" is a phase transition temperature between the nematic phase and the isotropic phase in a liquid crystal composition, or a phase transition temperature between the nematic phase and the isotropic phase (in a liquid crystal compound) as calculated according to an extrapolation method from a measured value of a mixture of the liquid crystal compound and a base liquid crystal, and may be occasionally abbreviated as "maximum temperature."

"Minimum temperature of the nematic phase" is a phase transition temperature between the nematic phase and the crystal phase or between the nematic phase and the smectic phase in a liquid crystal composition, or a phase transition temperature between the nematic phase and the crystal phase or between the nematic phase and the smectic phase (in a liquid crystal compound) as calculated according to an extrapolation method from a measured value of a mixture of the liquid crystal compound and a base liquid crystal, and may be occasionally abbreviated as "minimum temperature."

A compound represented by formula (1) (symbol "i" represents the formula number) may be occasionally abbreviated as "compound (i)." In the explanation of formula (1), ring $A^1$ to ring $A^3$ generically may be occasionally referred to simply as "ring A."

In the explanation of each formula, a symbol such as $A^1$, $B^1$, $C^1$, $D^1$ and $E^1$ each surrounded by a hexagonal shape corresponds to ring $A^1$, ring $B^1$, ring $C^1$, ring $D^1$ and ring $E^1$, respectively. A plurality of $R^1$ are described in different formulas. In the compounds, two groups represented by two of arbitrary $R^1$ may be identical or different. The rule also applies to a symbol such as ring $A^1$ and $X^1$.

In the explanation of each formula, an expression "at least one" in the context of "at least one of "A" may be replaced by "B"" means that a position of "A" is arbitrary when the number of "A" is one, and also that a position thereof may be selected without limitation also when the number of "A" is two or more. For example, an expression "at least one of A may be replaced by B, C or D" includes a case where arbitrary A is replaced by B, a case where arbitrary A is replaced by C, and a case where arbitrary A is replaced by D, and also a case where a plurality of A are replaced by at least two of B, C and D.

Specifically, "alkyl in which at least one of —$CH_2$— may be replaced by —O—, and at least one of —$(CH_2)_2$— may be replaced by —CH=CH—" includes alkyl, alkenyl, alkoxy, alkoxyalkyl, alkoxyalkenyl and alkenyloxyalkyl.

In the invention, in consideration of stability of a compound, a case where two successive —$CH_2$— are replaced by —O— to form —O—O— or the like is not preferred. Moreover, a case where —$CH_2$— in a methyl part (—$CH_2$—H) on a terminal in alkyl is replaced by —O— to form —O—H is not preferred, either.

1. Tricyclic Compound Having a Plurality of $CF_2O$ Bonding Groups 1-1. Constitution of Tricyclic Compound Having a Plurality of $CF_2O$ Bonding Groups A tricyclic compound having a plurality of $CF_2O$ bonding groups according to the invention is represented by formula (1).

Formula 6

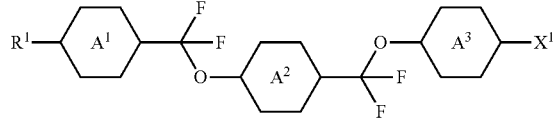

(1)

In formula (1), a meaning of each symbol is as described below.

Left-Terminal Group $R^1$ $R^1$ is hydrogen, halogen or alkyl having 1 to 20 carbons.

In the alkyl exemplified as $R^1$, at least one of —$CH_2$— may be replaced by —O— or —S—, at least one of —$(CH_2)_2$— may be replaced by —CH=CH—, and at least one of hydrogen may be replaced by halogen (preferably fluorine or chlorine, further preferably, fluorine). Hereinafter, a group in which replacement as described above is performed in the alkyl is also referred to as "substituted alkyl."

Specific examples of the substituted alkyl exemplified as $R^1$ include alkoxy, alkoxyalkyl, alkoxyalkoxy, alkylthio, alkylthioalkoxy, alkenyl, alkenyloxy, alkenyloxyalkyl, alkoxyalkenyl, alkenylthio, and a group in which at least one of hydrogen in alkyl and the group exemplified in the paragraph is replaced by halogen (alkyl halide, alkoxy halide and alkenyl halide).

Substituted alkyl exemplified as $R^1$ preferably includes a group in which, in the alkyl, at least one of —$CH_2$— is replaced by —O—, and/or at least one of —$(CH_2)_2$— is replaced by —CH=CH—; and specific examples include alkoxy, alkoxyalkyl, alkenyl and alkenyloxy.

Alkyl and substituted alkyl have a straight chain or a branched chain, and does not include a cyclic group such as cyclohexyl. When $R^1$ has a straight chain, compound (1) has a wide temperature range of the liquid crystal phase, and a small viscosity. When $R^1$ has a branched chain, compound (1) has a good compatibility with other liquid crystal compounds. Alkyl and substituted alkyl preferably have a straight-chain as compared with a branched chain.

Even if $R^1$ has a branched chain, when $R^1$ is an optically active group, such $R^1$ is preferred. When $R^1$ is an optically active group, compound (1) is useful as a chiral dopant. When the compound is added to the liquid crystal composition, a reverse twisted domain generated in a device can be prevented. When $R^1$ is not an optically active group, compound (1) is useful as a component of the liquid crystal composition.

Specific examples of the groups exemplified as $R^1$ are shown below.

Specific examples of halogen exemplified as $R^1$ include fluorine, chlorine and bromine, preferably, fluorine and chlorine, further preferably, fluorine.

Specific examples of alkyl exemplified as $R^1$ include alkyl having 1 to 20 carbons, preferably, alkyl having 1 to 15 carbons, further preferably, alkyl having 1 to 10 carbons; and specific examples include —$CH_3$, —$C_2H_5$, —$C_3H_7$, —$C_4H_9$, —$C_5H_{11}$, —$C_6H_{13}$, —$C_7H_{15}$, —$C_8H_{17}$, —$C_9H_{19}$, —$C_{10}H_{21}$, —$C_{11}H_{23}$, —$C_{12}H_{25}$, —$C_{13}H_{27}$, —$C_{14}H_{29}$ and —$C_{15}H_{31}$.

Specific examples of alkoxy exemplified as $R^1$ include alkoxy having 1 to 19 carbons, preferably, alkoxy having 1 to 14 carbons, further preferably, alkoxy having 1 to 9 carbons; and specific examples include —$OCH_3$, —$OC_2H_5$, —$OC_3H_7$, —$OC_4H_9$, —$OC_5H_{11}$, —$OC_6H_{13}$, —$OC_7H_{15}$, —$OC_8H_{17}$, —$OC_9H_{19}$, —$OC_{10}H_{21}$, —$OC_{11}H_{23}$, —$OC_{12}H_{25}$, —$OC_{13}H_{27}$ and —$OC_{14}H_{29}$.

Specific examples of alkoxyalkyl exemplified as $R^1$ include alkoxyalkyl having 2 to 19 carbons, preferably, alkoxyalkyl having 2 to 14 carbons, further preferably, alkoxyalkyl having 2 to 9 carbons; and specific examples include —$CH_2OCH_3$, —$CH_2OC_2H_5$, —$CH_2OC_3H_7$, —$(CH_2)_2$—$OCH_3$, —$(CH_2)_2$—$OC_2H_5$, —$(CH_2)_2$—$OC_3H_7$, —$(CH_2)_3$—$OCH_3$, —$(CH_2)_4$—$OCH_3$ and —$(CH_2)_5$—$OCH_3$.

Specific examples of alkenyl exemplified as $R^1$ include alkenyl having 2 to 20 carbons, preferably, alkenyl having 2 to 15 carbons, further preferably, alkenyl having 2 to 10 carbons; and specific examples include —$CH=CH_2$, —$CH=CHCH_3$, —$CH_2CH=CH_2$, —$CH=CHC_2H_5$, —$CH_2CH=CHCH_3$, —$(CH_2)_2$—$CH=CH_2$, —$CH=CHC_3H_7$, —$CH_2CH=CHC_2H_5$, —$(CH_2)_2$—$CH=CHCH_3$, —$(CH_2)_3$—$CH=CH_2$, —$CH=CHC_4H_9$, —$(CH_2)_2CH=CHC_2H_5$ and —$CH_2CH=CHC_3H_7$.

A preferred configuration of —CH=CH— in alkenyl depends on a position of a double bond. A trans configuration is preferred in alkenyl having a double bond in an odd-numbered position, such as —$CH=CHCH_3$, —$CH=CHC_2H_5$, —$(CH_2)_2$—$CH=CH_2$, —$CH=CHC_3H_7$, —$(CH_2)_2$—$CH=CHCH_3$, —$CH=CHC_4H_9$ and —$(CH_2)_2$—$CH=CHC_2H_5$. A cis configuration is preferred in alkenyl having a double bond in an even-numbered position, such as —$CH_2CH=CH_2$, —$CH_2CH=CHCH_3$, —$CH_2CH=CHC_2H_5$, —$(CH_2)_3$—$CH=CH_2$ and —$CH_2CH=CHC_3H_7$. An alkenyl compound having the preferred configuration has a high clearing point and maximum temperature or a wide temperature range of the liquid crystal phase. A detailed description is found in Mol. Cryst. Liq. Cryst., 1985, 131, 109 and Mol. Cryst. Liq. Cryst., 1985, 131, 327.

Specific examples of alkenyloxy exemplified as $R^1$ include alkenyloxy having 2 to 19 carbons, preferably, alkenyloxy having 2 to 14 carbons, further preferably, alkenyloxy having 2 to 9 carbons; and specific examples include —$OCH_2CH=CH_2$, —$OCH_2CH=CHCH_3$ and —$OCH_2CH=CHC_2H_5$.

Specific examples of the groups (alkyl halide) in which, in the alkyl, at least one of hydrogen is replaced by halogen include alkyl fluoride such as —$CH_2F$, —$CHF_2$, —$CF_3$, —$(CH_2)_2$—F, —$CF_2CH_2F$, —$CF_2CHF_2$, —$CH_2CF_3$, —$CF_2CF_3$, —$(CH_2)_3$—F, —$(CF_2)_3$—F, —$CF_2CHFCF_3$, —$CHFCF_2CF_3$, —$(CH_2)_4$—F, —$(CF_2)_4$—F, —$(CH_2)_5$—F and —$(CF_2)_5$—F; and alkyl chloride such as —$CH_2Cl$, —$CHCl_2$, —$CCl_3$, —$(CH_2)_2$—Cl, —$CCl_2CH_2Cl$, —$CCl_2CHCl_2$, —$CH_2CCl_3$, —$CCl_2CCl_3$, —$(CH_2)_3$Cl, —$(CCl_2)_3$—Cl, —$CCl_2CHClCCl_3$, —$CHClCCl_2CCl_3$, —$(CH_2)_4$—Cl, —$(CCl_2)_4$—Cl, —$(CCl_2)_5$—Cl and —$(CCl_2)_5$—Cl.

Specific examples of the groups (alkoxy halide) in which, in the alkoxy, at least one of hydrogen is replaced by halogen include alkoxy fluoride such as —$OCH_2F$, —$OCHF_2$, —$OCF_3$, —O—$(CH_2)_2$—F, —$OCF_2CH_2F$, —$OCF_2CHF_2$, —$OCH_2CF_3$, —O—$(CH_2)_3$—F, —O—$(CF_2)_3$—F, —$OCF_2CHFCF_3$, —$OCHFCF_2CF_3$, —$O(CH_2)_4$—F, —O—$(CF_2)_4$—F, —O—$(CH_2)_5$—F and —O—$(CF_2)_5$—F; and alkoxy chloride such as —$OCH_2Cl$, —$OCHCl_2$, —$OCCl_3$, —O—$(CH_2)_2$—Cl, —$OCCl_2CH_2Cl$, —$OCCl_2CHCl_2$, —$OCH_2CCl_3$, —O—$(CH_2)_3$—Cl, —O—$(CCl_2)_3$—Cl, —$OCCl_2CHClCCl_3$, —$OCHClCCl_2CCl_3$, —$O(CH_2)_4$—Cl, —O—$(CCl_2)_4$—Cl, —O—$(CH_2)_5$—Cl and —O—$(CCl_2)_5$—Cl.

Specific examples of the groups (alkenyl halide) in which, in the alkenyl, at least one of hydrogen is replaced by halogen include alkenyl fluoride such as —CH=CHF, —CH=$CF_2$, —CF=CHF, —CH=$CHCH_2F$, —CH=$CHCF_3$, —$(CH_2)_2$—CH=$CF_2$, —$CH_2CH=CHCF_3$ and —CH=$CHCF_2CF_3$; and alkenyl chloride such as —CH=CHCl, —CH=$CCl_2$, —CCl=CHCl, —CH=$CHCH_2Cl$, —CH=$CHCCl_3$, —$(CH_2)_2$—CH=$CCl_2$, —$CH_2CH=CHCCl_3$ and —CH=$CHCCl_2CCl_3$.

$R^1$ is preferably alkyl having 1 to 20 carbons or substituted alkyl thereof, further preferably, alkyl having 1 to 15 carbons or substituted alkyl thereof, still further preferably, alkyl having 1 to 10 carbons or substituted alkyl thereof. Substituted alkyl herein is preferably alkoxy, alkoxyalkyl, alkenyl, alkenyloxy, alkyl halide, alkoxy halide and alkenyl halide, further preferably, alkenyl and alkoxy, still further preferably, alkenyl.

Ring $A^1$ to ring $A^3$

Ring $A^1$ is 1,4-cyclohexylene, 2-fluoro-1,4-phenylene, 2,6-difluoro-1,4-phenylene, 1,4-cyclohexenylene, pyrimidine-2,5-diyl, pyridine-2,5-diyl, 1,3-dioxane-2,5-diyl or tetrahydropyran-2,5-diyl; preferably, 1,4-cyclohexylene, 2-fluoro-1,4-phenylene, 2,6-difluoro-1,4-phenylene, 1,4-cyclohexenylene, 1,3-dioxane-2,5-diyl or tetrahydropyran-2,5-diyl; and particularly preferably, 1,4-cyclohexylene, 2-fluoro-1,4-phenylene, 2,6-difluoro-1,4-phenylene, 1,3-dioxane-2,5-diyl or tetrahydropyran-2,5-diyl.

Ring $A^2$ is 1,4-phenylene, 2-fluoro-1,4-phenylene, 2,6-difluoro-1,4-phenylene, 1,4-cyclohexenylene, pyrimidine-2,5-diyl, pyridine-2,5-diyl, 1,3-dioxane-2,5-diyl or tetrahydropyran-2,5-diyl; preferably, 1,4-phenylene, 2-fluoro-1,4-phenylene, 2,6-difluoro-1,4-phenylene, 1,4-cyclohexenylene, 1,3-dioxane-2,5-diyl or tetrahydropyran-2,5-diyl; and particularly preferably, 1,4-phenylene, 2-fluoro-1,4-phenylene or 2,6-difluoro-1,4-phenylene.

Ring $A^3$ is 1,4-cyclohexylene, 1,4-phenylene, 2-fluoro-1,4-phenylene, 2,6-difluoro-1,4-phenylene, 1,4-cyclohexenylene, pyrimidine-2,5-diyl, pyridine-2,5-diyl, 1,3-dioxane-2,5-diyl or tetrahydropyran-2,5-diyl; preferably, 1,4-phenylene, 2-fluoro-1,4-phenylene or 2,6-difluoro-1,4-phenylene; and particularly preferably, 2-fluoro-1,4-phenylene or 2,6-difluoro-1,4-phenylene.

In the explanation of ring $A^1$ to ring $A^3$ in formula (1), 2-fluoro-1,4-phenylene includes a case where fluorine on a lateral position is located on a side of left-terminal group $R^1$, and a case where fluorine on the lateral position is located on a side of right-terminal group $X^1$. More specifically, 2-fluoro-1,4-phenylene includes two cases of divalent groups as described below. More specifically, 2-fluoro-1,4-phenylene may have any direction of fluorine on the lateral position.

Formula 7

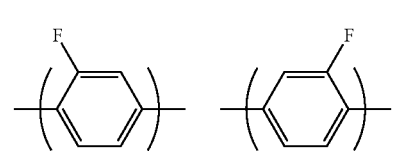

For example, when ring $A^1$ is 2-fluoro-1,4-phenylene, formula (1) may be represented by any of (a) and (b) as described below. In the explanation of ring $A^1$ to ring $A^3$ in formula (1), ring $B^1$ to ring $B^3$ in formulas (2) to (4), ring $C^1$ to ring $C^3$ in formula (5), ring $D^1$ to ring $D^4$ in formulas (6) to (11), and ring $E^1$ to ring $E^3$ in formulas (12) to (14) as described later, the rule also applies to a left-right asymmetrical divalent group such as 2,6-difluoro-1,4-phenylene and tetrahydropyran-2,5-diyl.

Formula 8

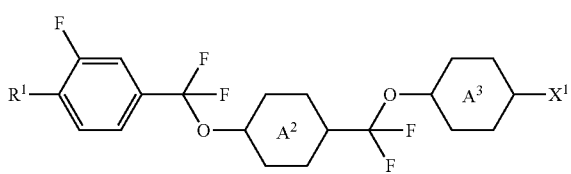
(a)

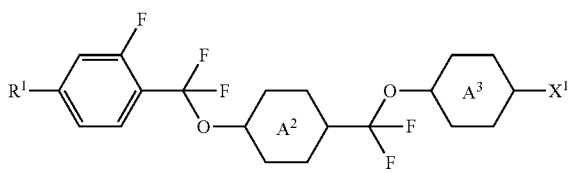
(b)

Preferred examples of 2-fluoro-1,4-phenylene, 2,6-difluoro-1,4-phenylene, 1,4-cyclohexenylene, pyrimidine-2,5-diyl, pyridine-2,5-diyl, 1,3-dioxane-2,5-diyl and tetrahydropyran-2,5-diyl in ring $A^1$, ring $A^2$ and ring $A^3$ include groups (A-1) to (A-7).

Formula 9

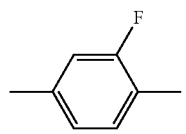
(A-1)

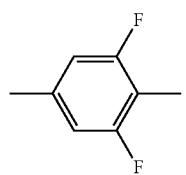
(A-2)

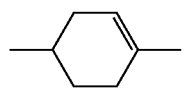
(A-3)

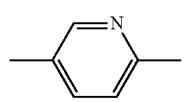
(A-4)

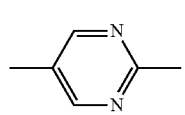
(A-5)

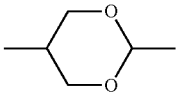
(A-6)

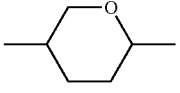
(A-7)

In addition, from a viewpoint of dielectric anisotropy, groups (A-1) to (A-7) are preferably arranged such that, in formula (1), a bonding hand on a left side is arranged on a side of $R^1$ and a bonding hand on a right side is arranged on a side of $X^1$. For example, when ring $A^1$ is 1,4-cyclohexylene, ring $A^2$ is group (A-1) and ring $A^3$ is group (A-2), compound (1) is preferably represented by formula (β) as described below, and not by formula (α) as described below.

Formula 10

(α)

(β)

Right-Terminal Group $X^1$ $X^1$ is hydrogen, halogen, —C≡N, —N=C=S, —SF$_5$ or alkyl having 1 to 10 carbons.

In the alkyl exemplified as $X^1$, at least one of —CH$_2$— may be replaced by —O— or —S—, at least one of —(CH$_2$)$_2$— may be replaced by —CH=CH—, and at least one of hydrogen may be replaced by halogen (preferably, fluorine or chlorine, further preferably, fluorine). Hereinafter, a group in which replacement as described above is performed in the alkyl is also referred to as "substituted alkyl."

Specific examples of the substituted alkyl exemplified as $X^1$ include alkoxy, alkylthio, alkenyl and alkenyloxy, and a group in which at least one of hydrogen in alkyl and the group exemplified in the paragraph is replaced by halogen (alkyl halide, alkoxy halide and alkenyl halide); and preferably, alkoxy and alkenyl, and alkyl halide, alkoxy halide and alkenyl halide.

In the following, specific examples of the groups exemplified as $X^1$ are shown.

Specific examples of halogen exemplified as $X^1$ include fluorine, chlorine and bromine, preferably, fluorine and chlorine, further preferably, fluorine.

Specific examples of alkyl exemplified as $X^1$ include alkyl having 1 to 10 carbons, preferably, alkyl having 1 to 6 carbons, further preferably, alkyl having 1 to 3 carbons; and specific examples include —CH$_3$, —C$_2$H$_5$, —C$_3$H$_7$, —C$_4$H$_9$, —C$_5$H$_{11}$, —C$_6$H$_{13}$, —C$_7$H$_{15}$, —C$_8$H$_{17}$, —C$_9$H$_{19}$ and —C$_{10}$H$_{21}$.

Specific examples of alkoxy exemplified as $X^1$ include alkoxy having 1 to 9 carbons, preferably, alkoxy having 1 to 5 carbons, further preferably, alkoxy having 1 to 2 carbons; and specific examples include —$OCH_3$, —$OC_2H_5$, —$OC_3H_7$, —$OC_4H_9$ and —$OC_5H_{11}$.

Specific examples of alkenyl exemplified as $X^1$ include alkenyl having 2 to 10 carbons, preferably, alkenyl having 2 to 6 carbons, further preferably, alkenyl having 2 to 3 carbons; and specific examples include —$CH=CH_2$, —$CH=CHCH_3$, —$CH_2CH=CH_2$, —$CH=CHC_2H_5$, —$CH_2CH=CHCH_3$, —$(CH_2)_2$—$CH=CH_2$, —$CH=CHC_3H_7$, —$CH_2CH=CHC_2H_5$, —$(CH_2)_2$—$CH=CHCH_3$, —$(CH_2)_3$—$CH=CH_2$, —$CH=CHC_4H_9$, —$(CH_2)_2CH=CHC_2H_5$ and —$CH_2CH=CHC_3H_7$.

Specific examples of the groups (alkyl halide) in which, in the alkyl, at least one of hydrogen is replaced by halogen include the groups exemplified in the paragraphs of left-terminal group $R^1$; preferably alkyl fluoride.

Specific examples of the groups (alkoxy halide) in which, in the alkoxy, at least one of hydrogen is replaced by halogen include the groups exemplified in the paragraphs of left-terminal group $R^1$; preferably alkoxy fluoride.

Specific examples of the groups (alkenyl halide) in which, in the alkenyl, at least one of hydrogen is replaced by halogen include the groups exemplified in the paragraphs of left-terminal group $R^1$; preferably alkenyl fluoride.

$X^1$ is preferably hydrogen, fluorine, chlorine, —C≡N, —N=C=S, —$SF_5$, alkyl having 1 to 10 carbons, alkyl fluoride having 1 to 10 carbons, alkoxy having 1 to 9 carbons, alkoxy fluoride having 1 to 9 carbons, alkenyl having 2 to 10 carbons, or alkenyl fluoride having 2 to 10 carbons; further preferably fluorine, chlorine, —C≡N, alkyl fluoride having 1 to 10 carbons, or alkoxy fluoride having 1 to 9 carbons; still further preferably, fluorine, chlorine, —C≡N, —$CF_3$, —$CHF_2$, —$CH_2F$, —$OCF_3$, —$OCHF_2$ or —$OCH_2F$; and most preferably, fluorine, —$CF_3$ or —$OCF_3$.

A compound in which $X^1$ is fluorine is preferred from a viewpoint of having a small viscosity. A compound in which $X^1$ is —$CF_3$ is preferred from a viewpoint of having a large value of dielectric anisotropy. A compound in which $X^1$ is —$OCF_3$ is preferred from a viewpoint of having an excellent compatibility with other liquid crystal compounds.

$CF_2O$ Bonding Group

Compound (1) of the invention has a plurality of $CF_2O$ bonding groups as represented by formula (1). When compound (1) has such a structure, compound (1) of the invention has a large value of dielectric anisotropy and a small viscosity.

1-2. Specific Examples of Tricyclic Compound Having a Plurality of $CF_2O$ Bonding Groups As compound (1) of the invention, a compound represented by formula (1-1) is preferred, a compound represented by formula (1-1-1) is further preferred, and a compound represented by any one of formulas (1-1-1-1) to (1-1-1-3) is particularly preferred.

Formula 11

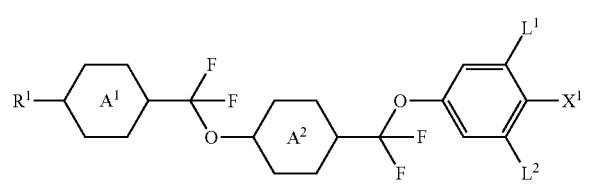

(1-1)

In formula (1-1), $R^1$ is alkyl having 1 to 15 carbons, and in the alkyl, at least one of —$CH_2$— may be replaced by —O— or —S—, at least one of —$(CH_2)_2$— may be replaced by —CH=CH—, and at least one of hydrogen may be replaced by fluorine;

Ring $A^1$ is 1,4-cyclohexylene, 2-fluoro-1,4-phenylene, 2,6-difluoro-1,4-phenylene, 1,4-cyclohexenylene, 1,3-dioxane-2,5-diyl or tetrahydropyran-2,5-diyl;

Ring $A^2$ is 1,4-phenylene, 2-fluoro-1,4-phenylene, 2,6-difluoro-1,4-phenylene, 1,4-cyclohexenylene, 1,3-dioxane-2,5-diyl or tetrahydropyran-2,5-diyl;

$L^1$ and $L^2$ are independently hydrogen or fluorine;

$X^1$ is fluorine or alkyl having 1 to 10 carbons, and in the alkyl, at least one of —$CH_2$— may be replaced by —O— or —S—, at least one of —$(CH_2)_2$— may be replaced by —CH=CH—, and at least one of hydrogen may be replaced by fluorine.

In formula (1-1), further preferred groups as $R^1$, ring $A^1$, ring $A^2$ and $X^1$ are as shown in individual paragraphs of left-terminal group $R^1$, ring $A^1$ to ring $A^3$ and right-terminal group $X^1$ in the explanation of formula (1).

Formula 12

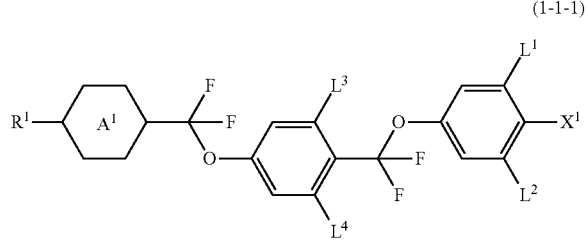

(1-1-1)

In formula (1-1-1), $R^1$ is alkyl having 1 to 10 carbons, and in the alkyl, at least one of —$CH_2$— may be replaced by —O—, and at least one of —$(CH_2)_2$— may be replaced by —CH=CH—;

Ring $A^1$ is 1,4-cyclohexylene, 2-fluoro-1,4-phenylene, 2,6-difluoro-1,4-phenylene, 1,3-dioxane-2,5-diyl or tetrahydropyran-2,5-diyl;

$L^1$, $L^2$, $L^3$ and $L^4$ are independently hydrogen or fluorine; and $X^1$ is fluorine or —$CF_3$.

In formula (1-1-1), further preferred groups as $R^1$, ring $A^1$ and $X^1$ are as shown in individual paragraphs of left-terminal group $R^1$, ring $A^1$ to ring $A^3$ and right-terminal group $X^1$ in the explanation of formula (1).

Formula 13

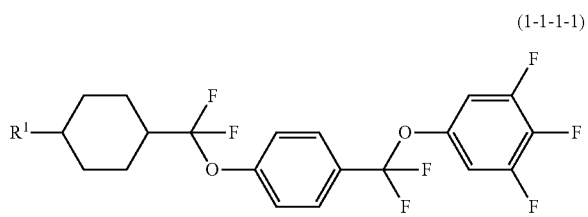

(1-1-1-1)

-continued

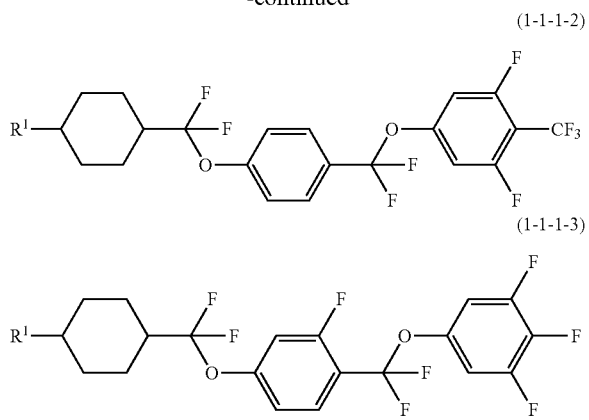

(1-1-1-2)

(1-1-1-3)

In formulas (1-1-1-1) to (1-1-1-3), $R^1$ is alkyl having 1 to 10 carbons; and specific examples include —$CH_3$, —$C_2H_5$, —$C_3H_7$, —$C_4H_9$, —$C_5H_{11}$, —$C_6H_{13}$, —$C_7H_{15}$, —$C_8H_{17}$, —$C_9H_{19}$ and —$C_{10}H_{21}$.

As compared with a compound in which all of ring $A^1$ to ring $A^3$ are a benzene ring, compounds represented by formulas (1-1-1-1) to (1-1-1-3) tend to have a maximum temperature or clearing point, and a small viscosity.

1-3. Physical Properties of Tricyclic Compound Having a Plurality of $CF_2O$ Bonding Groups When compound (1) of the invention simultaneously has a plurality of $CF_2O$ bonding groups, ring $A^1$ to ring $A^3$, and terminal groups $R^1$ and $X^1$, compound (1) of the invention shows a large positive dielectric anisotropy, a suitable optical anisotropy, a small bulk viscosity, a small rotational viscosity, a suitable elastic constant, a small threshold voltage, a high voltage holding ratio, and a high maximum temperature or clearing point of the liquid crystal phase. Moreover, when types of terminal groups $R^1$ and $X^1$, ring $A^1$ to ring $A^3$, $L^1$ to $L^4$, or the like are suitably combined, physical properties of compound (1) of the invention, such as the dielectric anisotropy, the optical anisotropy, the bulk viscosity, the rotational viscosity, the elastic constant, the threshold voltage, the voltage holding ratio, and the maximum temperature or clearing point of the liquid crystal phase, can be adjusted. Compound (1) may contain a higher amount of isotopes, such as $^2H$ (deuterium) and $^{13}C$, than an amount of natural abundance because compound (1) has no large difference in the physical properties of the compound.

Moreover, compound (1) of the invention shows general physical properties required as the liquid crystal compound, such as a high stability to heat and light, a low minimum temperature of the liquid crystal phase, an excellent compatibility with other liquid crystal compounds (compatibility at a low temperature), and has an excellent balance of physical properties.

Main effects of types of ring $A^1$ or the like on the physical properties of compound (1) will be explained below.

When at least one of ring $A^1$ and ring $A^3$ is 1,4-cyclohexylene, compound (1) has a high maximum temperature or clearing point, a small bulk viscosity, a small rotational viscosity and a small elastic constant. When ring $A^1$ is 2-fluoro-1,4-phenylene or 2,6-difluoro-1,4-phenylene, compound (1) has a relatively large value of optical anisotropy, a relatively large elastic constant, a relatively excellent compatibility at a low temperature and a relatively large orientational order parameter.

When at least one of ring $A^2$ and ring $A^3$ is 1,4-phenylene, 2-fluoro-1,4-phenylene or 2,6-difluoro-1,4-phenylene, compound (1) has a relatively large value of optical anisotropy, a relatively large elastic constant, a relatively excellent compatibility at a low temperature and a relatively large orientational order parameter.

When ring $A^1$ is 2-fluoro-1,4-phenylene or 2,6-difluoro-1,4-phenylene, and both ring $A^2$ and ring $A^3$ are 1,4-phenylene, 2-fluoro-1,4-phenylene or 2,6-difluoro-1,4-phenylene, compound (1) has a particularly large value of optical anisotropy, a particularly large elastic constant and a particularly excellent compatibility at a low temperature.

When right-terminal group $X^1$ is fluorine, chlorine, —C≡N, —N=C=S, —$SF_5$, —$CF_3$, —$CHF_2$, —$CH_2F$, —$OCF_3$, —$OCHF_2$ or —$OCH_2F$, compound (1) has a large value of dielectric anisotropy, and a small threshold voltage. When $X^1$ is —C≡N, —N=C=S or alkenyl, compound (1) has a large value of optical anisotropy. When $X^1$ is fluorine, —$CF_3$ or alkyl, compound (1) has a high chemical stability and a high voltage holding ratio.

When ring $A^3$ is 2,6-difluoro-1,4-phenylene, and $X^1$ is fluorine, chlorine, —C≡N, —N=C=S, —$SF_5$, —$CF_3$, —$CHF_2$, —$CH_2F$, —$OCF_3$, —$OCHF_2$ or —$OCH_2F$, compound (1) has a large value of dielectric anisotropy, and a small threshold voltage.

When ring $A^3$ is 2-fluoro-1,4-phenylene, and $X^1$ is —$CF_3$, or when ring $A^3$ is 2,6-difluoro-1,4-phenylene, and $X^1$ is fluorine or —$CF_3$, compound (1) has a high chemical stability, a wide temperature range of the liquid crystal phase, a large value of dielectric anisotropy, a small threshold voltage and a high voltage holding ratio.

As described above, a compound having objective physical properties can be obtained by suitably selecting types of a ring structure, the terminal group or the like. Accordingly, compound (1) of the invention is useful as a component of the liquid crystal composition used for a liquid crystal display device having a mode such as PC, TN, STN, BTN, ECB, OCB, IPS, VA or PSA.

1-4. Method for Synthesizing a Tricyclic Compound Having a Plurality of $CF_2O$ Bonding Groups A method for synthesizing compound (1) of the invention will be explained.

Compound (1) of the invention can be prepared by suitably combining techniques in synthetic organic chemistry. Methods for introducing an objective terminal group, ring and bonding group into a starting material are described in Organic Syntheses (John Wiley & Sons, Inc.), Organic Reactions (John Wiley & Sons, Inc.), Comprehensive Organic Synthesis (Pergamon Press), New Experimental Chemistry Course (Shin Jikken Kagaku Koza in Japanese) (Maruzen Co., Ltd.) or the like.

1-4-1. Formation of Ring A

With regard to a ring such as 1,4-cyclohexylene, 1,4-phenylene, 2-fluoro-1,4-phenylene, 2,6-difluoro-1,4-phenylene, 1,4-cyclohexenylene, pyrimidine-2,5-diyl, pyridine-2,5-diyl, 1,3-dioxane-2,5-diyl and tetrahydropyran-2,5-diyl, a starting material is commercially available, or a synthetic method thereof is well known.

1-4-2. Method for Synthesizing Compound (1)

Compound (1) of the invention can be prepared by synthesis methods 1 to 3, for example.

1-4-2-1. Method 1 for Synthesizing Compound (1)

Method 1 for synthesizing compound (1) of the invention has, for example, a step for obtaining ester (32) by allowing dehydrating condensation of carboxylic acid (30) with hydroxyl group-containing compound (31) under the presence of DCC, DMAP and the like; a step for obtaining thione- O-ester (33) by allowing ester (32) to react with a thiation reagent such as a Lawesson's reagent; a step for obtaining compound (34) by fluorinating thione-O-esters (33) with a hydrogen fluoride-pyridine complex and NBS: a step for obtaining carboxylic acid (35) by allowing compound (34) to react with n-butyllithium and subsequently carbon dioxide; a step for obtaining ester (37) by allowing dehydrating condensation of carboxylic acid (35) with hydroxyl group-containing compound (36) under the presence of DCC, DMAP and the like; a step for obtaining thione-O-ester (38) by allowing ester (37) to react with a thiation reagent such as a Lawesson's reagent; and a step for obtaining compound (1) by fluorinating thione-O-esters (38) with a hydrogen fluoride-pyridine complex and NBS. In addition, the formula number herein corresponds to a reaction scheme as described below.

carbodiimide, DMAP represents 4-dimethylaminopyridine, HF-Py represents a hydrogen fluoride-pyridine complex, and NBS represents N-bromosuccinimide.

1-4-2-2. Method 2 for Synthesizing Compound (1)

When ring $A^2$ is 1,4-phenylene, 2-fluoro-1,4-phenylene or 2,6-difluoro-1,4-phenylene among types of compound (1) of the invention, compound (1) can also be prepared by a method shown below.

Method 2 for synthesizing compound (1) of the invention has, for example, according to the method described in P. Kirsch et al., Angew. Chem. Int. Ed., 2001, 40, 1480, a step for obtaining dithianilium salt (39) by allowing alkane dithiol and trifluoromethanesulfonic acid to react with carboxylic acid (30); and a step for obtaining compound (41) by allowing phenolic compound (40) and subsequently $Et_3N$-3HF to react Formula 14

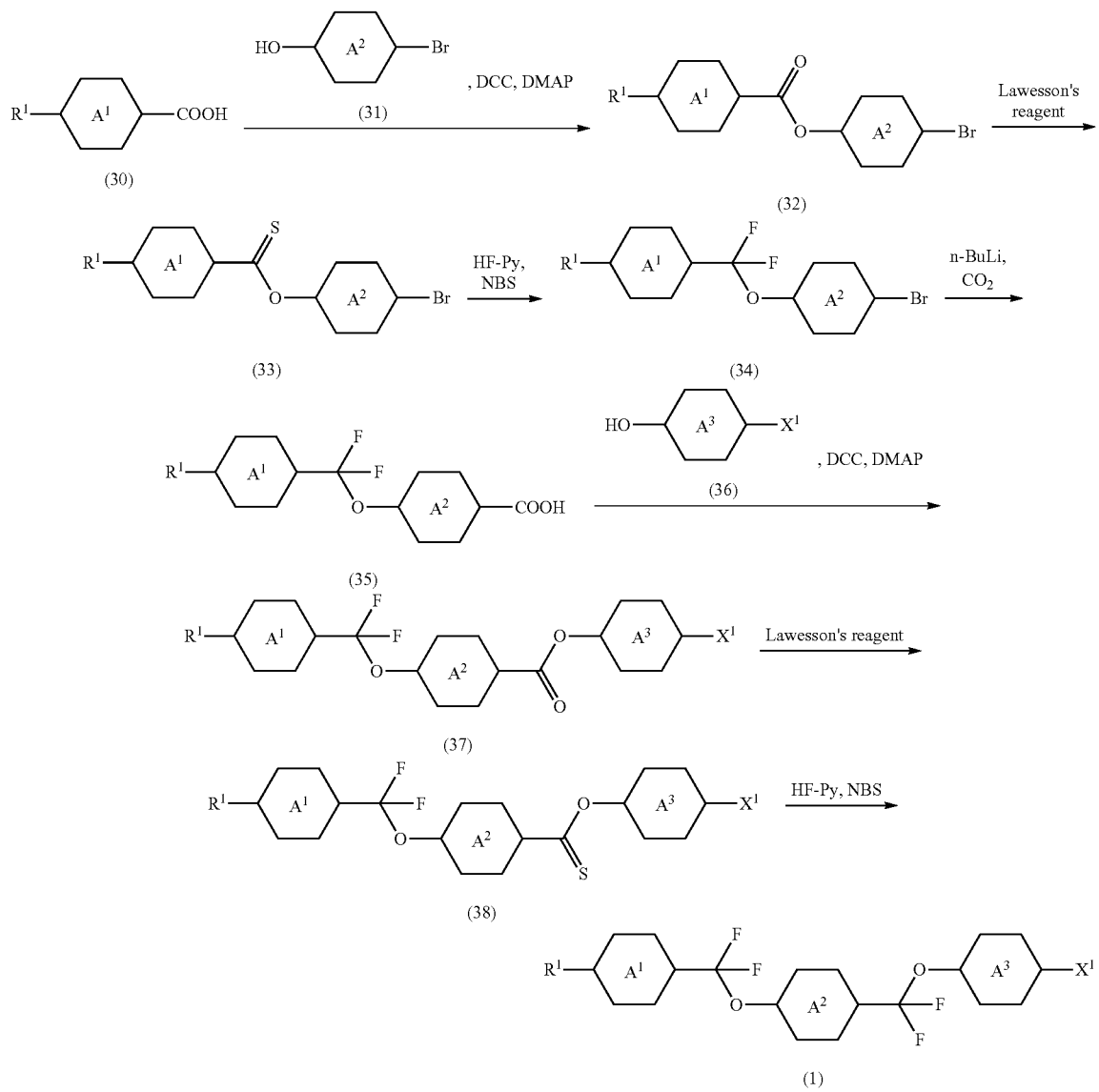

In the reaction scheme, $R^1$, ring $A^1$, ring $A^2$, ring $A^3$ and $X^1$ are defined in a manner identical with the definitions of identical symbols in formula (1). DCC represents dicyclohexylwith dithianilium salt (39) and treating the resultant reaction mixture with bromine; according to the method described in U.S. Pat. No. 6,231,785 B1, a step for obtaining compound

(42) by allowing compound (41) to react with n-butyllithium and subsequently dibromodifluoromethane; and a step for obtaining compound (1) by allowing compound (42) to react with hydroxyl group-containing compound (36) under the presence of a base such as potassium carbonate.

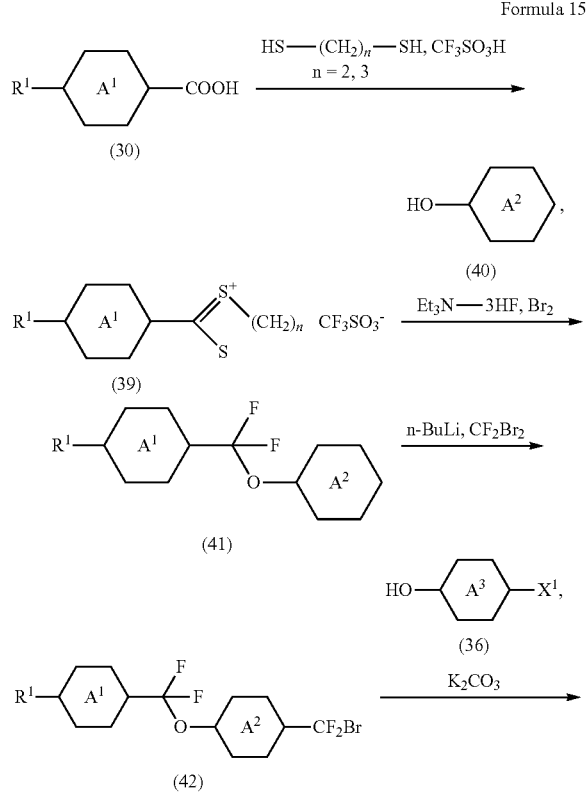

Formula 15

-continued (1)

In the reaction scheme, $R^1$, ring $A^1$, ring $A^3$ and $X^1$ are defined in a manner identical with the definitions of identical symbols in formula (1), and ring $A^2$ is 1,4-phenylene, 2-fluoro-1,4-phenylene, or 2,6-difluoro-1,4-phenylene.

1-4-2-3. Method 3 for Synthesizing Compound (1)

Method 3 for synthesizing compound (1) of the invention has, for example, according to P. Kirsch et al., Angew. Chem. Int. Ed., 2001, 40, 1480, a step for obtaining dithianilium salt (39) by allowing alkane dithiol and trifluoromethanesulfonic acid to react with carboxylic acid (30); a step for obtaining dithianilium salt (44) by allowing alkane dithiol and trifluoromethanesulfonic acid to react with carboxylic acid (43); a step for obtaining compound (46) by allowing dithianilium salt (44) to react with hydroxyl group-containing compound (45) and subsequently $Et_3N$-3HF, and treating the resultant reaction mixture with bromine; a step for obtaining compound (47) by coupling compound (46) and bispinacolato diborane under the presence of tetrakis(triphenylphosphine)palladium and potassium acetate, or the like; a step for obtaining hydroxyl group-containing compound (48) by oxidizing compound (47) with $H_2O_2$ under the presence of DBU or the like; and a step for obtaining compound (1) by allowing dithianilium salt (39) to react with hydroxyl group-containing compound (48) and subsequently $Et_3N$-3HF, and treating the resultant reaction mixture with bromine.

Formula 16

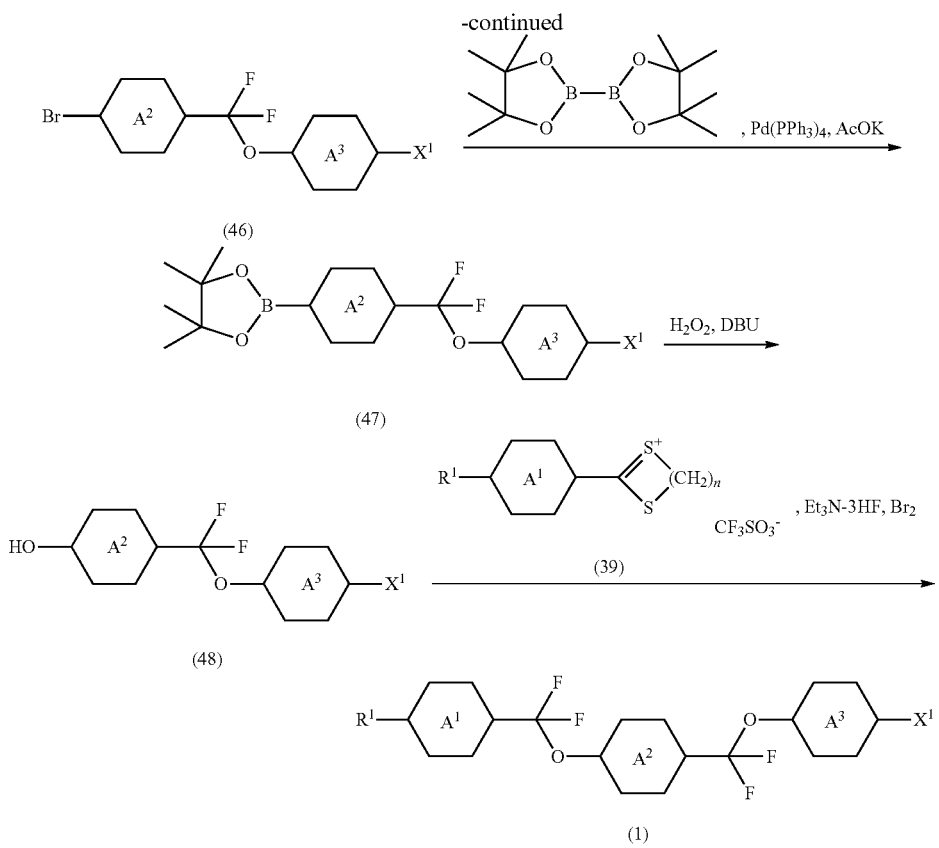

In the reaction scheme, $R^1$, ring $A^1$, ring $A^2$, ring $A^3$ and $X^1$ are defined in a manner identical with the definitions of identical symbols in formula (1), and AcOK represents potassium acetate, and DBU represents 1,8-diazabicyclo[5.4.0]undec-7-ene.

2. Liquid Crystal Composition

The liquid crystal composition of the invention contains compound (1) of the invention as component A. The liquid crystal composition of the invention may contain only one kind of compound (1), or two or more kinds of compound (1).

The liquid crystal composition of the invention contains component A preferably in a ratio of approximately 1 to approximately 99% by mass, further preferably, in a ratio of approximately 5 to approximately 60% by mass, based on the total mass of the liquid crystal composition. Content of component A in the range is preferred in view of developing good characteristics of the liquid crystal composition (examples: threshold voltage, a temperature range of the liquid crystal phase, a value of dielectric anisotropy, a value of optical anisotropy, viscosity).

The liquid crystal composition of the invention may contain only component A, or component A and any other component that is not particularly named herein. Moreover, in order to develop various kinds of characteristics, the liquid crystal composition may further contain at least one kind of component selected from component B, component C, component D and component E as explained below.

When preparing the liquid crystal composition of the invention, a component can also be selected, for example, in consideration of dielectric anisotropy of compound (1). Moreover, the liquid crystal composition prepared by suitably selecting each component shows a high maximum temperature of the nematic phase, a low minimum temperature of the nematic phase, a small viscosity, a large dielectric anisotropy, a suitable optical anisotropy and a suitable elastic constant.

Component B is at least one kind of compound selected from the group of compounds represented by formulas (2) to (4) as described later. Component C is a compound represented by formula (5) as described later. Component D is at least one kind of compound selected from the group of compounds represented by formulas (6) to (11) as described later. Component E is at least one kind of compound selected from the group compounds represented by formulas (12) to (14) as described later.

In addition, an expression "at least one kind of compound selected from the group of compounds represented by formulas (2) to (4)" means at least one kind of compound selected from the group of a compound represented by formula (2), a compound represented by formula (3), and a compound represented by formula (4). A similar definition applies to other examples.

The liquid crystal composition of the invention may further contain an optically active compound and at least one kind selected from an antioxidant and an ultraviolet light absorber, according to an application.

Component B (Compounds (2) to (4))

The liquid crystal composition of the invention may contain at least one kind of compound (component B) selected from the group of compounds represented by formulas (2) to (4). Component B is a compound having halogen or a fluorine-containing group as a right-terminal group.

Component B has a positive value of dielectric anisotropy and a superb stability to heat, light and so forth, and therefore is suitably used when preparing a liquid crystal composition for application to the TN mode or IPS mode to be driven by TFT.

Formula 17

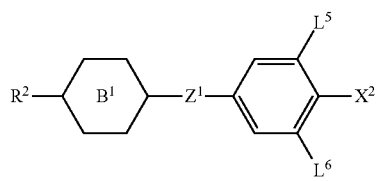
(2)

Formula 18

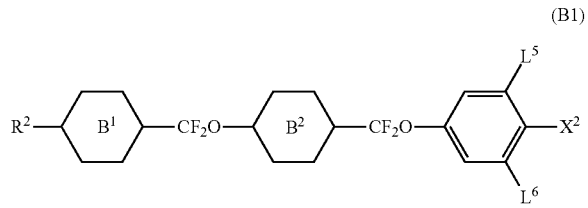
(B1)

(3)

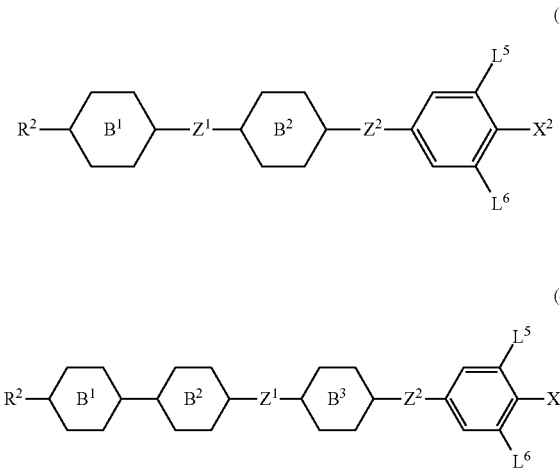
(4)

Moreover, in formula (3), when both $Z^1$ and $Z^2$ are —OCF$_2$—, both $L^5$ and $L^6$ are hydrogen. The rule means that, when both $Z^1$ and $Z^2$ are —OCF$_2$—, formula (3) is represented by formula (B2) as described below.

Formula 19

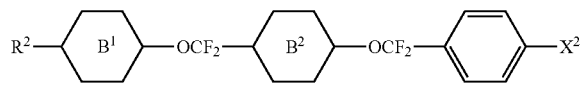
(B2)

In formula (B1) and formula (B2), $R^2$, $X^2$, $B^1$, $B^2$, $L^5$ and $L^6$ are defined in a manner identical with the definitions of identical symbols in formula (3).

Content of component B when using component B is ordinarily in the range of approximately 1 to approximately 99% by mass, preferably in the range of approximately 10 to approximately 97% by mass, further preferably, in the range of approximately 40 to approximately 95% by mass, based on the total mass of the liquid crystal composition. A liquid crystal composition having the content of component B in the range is preferred as a liquid crystal composition for application to the TN mode or the IPS mode.

In formulas (2) to (4), a meaning of each symbol is as described below.

$R^2$ is independently alkyl having 1 to 10 carbons or alkenyl having 2 to 10 carbons, and in the alkyl and the alkenyl, at least one of hydrogen may be replaced by fluorine, and at least one of —CH$_2$— may be replaced by —O—.

$X^2$ is fluorine, chlorine, —OCF$_3$, —OCHF$_2$, —CF$_3$, —CHF$_2$, —CH$_2$F, —CF=CF$_2$, —OCF$_2$CHF$_2$ or —OCF$_2$CHFCF$_3$.

Ring $B^1$, ring $B^2$ and ring $B^3$ are independently 1,4-cyclohexylene, 1,4-phenylene, 2-fluoro-1,4-phenylene, 2,6-difluoro-1,4-phenylene, tetrahydropyran-2,5-diyl, 1,3-dioxane-2,5-diyl or pyrimidine-2,5-diyl.

$Z^1$ and $Z^2$ are independently a single bond, —(CH$_2$)$_2$—, —CH=CH—, —C≡C—, —COO—, —CF$_2$O—, —OCF$_2$—, —CH$_2$O— or —(CH$_2$)$_4$—.

Herein, —COO— is bonded with each ring in a direction in which carbonyl (—CO—) is on a side of left-terminal group $R^2$ and an ether bond (—O—) is on a side of right-terminal group $X^2$. The rule means that, for example, when $Z^1$ is —COO— in formula (2), —COO— is bonded in the form of $R^2$-ring $B^1$—COO-Ph($L^5$)($L^6$)-$X^2$, and not $R^2$-ring $B^1$—OCO-Ph($L^5$) ($L^6$)-$X^2$. The rule also applies to —CH$_2$O—.

$L^5$ and $L^6$ are independently hydrogen or fluorine.

In addition, in formula (3), a case where both $Z^1$ and $Z^2$ are —CF$_2$O— is excluded. The rule means that component B does not contain a compound (compound represented by formula (B1) as described below) in which both $Z^1$ and $Z^2$ are —CF$_2$O—.

Moreover, when component E is further introduced into the composition together with component B, the viscosity of the liquid crystal composition can be adjusted. Content of component E in the case is ordinarily in the range of approximately 1 to approximately 99% by mass, preferably in the range of approximately 10 to approximately 97% by mass, further preferably, in the range of approximately 30 to approximately 95% by mass, based on the total mass of the liquid crystal composition.

Component C (Compound (5))

The liquid crystal composition of the invention may contain a compound (component C) represented by formula (5). Component C is a compound having a right terminal group in the form of —C≡N or —C≡C—C≡N.

Component C has a very large positive value of dielectric anisotropy, and therefore is suitably used when preparing a liquid crystal composition for application to the TN mode, the STN mode or the IPS mode. When component C is introduced into the composition, the value of dielectric anisotropy of the liquid crystal composition can be increased, viscosity can be adjusted, the value of optical anisotropy can be adjusted, and a temperature range of the liquid crystal phase can be extended. Furthermore, component C is useful also for adjusting a voltage-transmittance curve of the device.

Formula 20

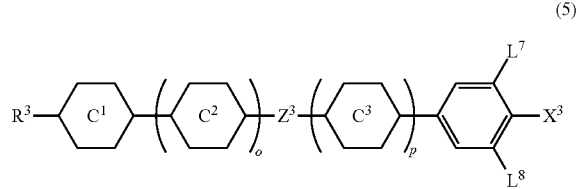

(5)

In formula (5), a meaning of each symbol is as described below.

$R^3$ is alkyl having 1 to 10 carbons or alkenyl having 2 to 10 carbons, and in the alkyl and the alkenyl, at least one of hydrogen may be replaced by fluorine, and at least one of —$CH_2$— may be replaced by —O—.

$X^3$ is —C≡N or —C≡C—C≡N.

Ring $C^1$, ring $C^2$ and ring $C^3$ are independently 1,4-cyclohexylene, 1,4-phenylene, tetrahydropyran-2,5-diyl, 1,3-dioxane-2,5-diyl or pyrimidine-2,5-diyl, and in the 1,4-phenylene, at least one of hydrogen may be replaced by fluorine.

$Z^3$ is a single bond, —$(CH_2)_2$—, —C≡C—, —COO—, —$CF_2O$—, —$OCF_2$— or —$CH_2O$—. Herein, —COO— is bonded with each ring in a direction in which carbonyl (—CO—) is on a side of left-terminal group $R^3$ and an ether bond (—O—) is on a side of right-terminal group $X^3$. The rule means that, for example, when $Z^3$ is —COO— and an equation: o=p=1 applies, —COO— is bonded in the form of ring $C^2$—COO-ring $C^3$, and not ring $C^2$—OCO-ring $C^3$. The rule also applies to —$CH_2O$—.

$L^7$ and $L^8$ are independently hydrogen or fluorine.

Then, o is 0, 1 or 2 and p is 0 or 1.
A sum of o and p is 0, 1, 2 or 3.

Content of component C when using component C is ordinarily in the range of approximately 1 to approximately 99% by mass, preferably in the range of approximately 10 to approximately 97% by mass, further preferably, in the range of approximately 40 to approximately 95% by mass, based on the total mass of the liquid crystal composition. A liquid crystal composition having the content of component C in the range is preferred as a liquid crystal composition for application to the TN mode, the STN mode or the IPS mode.

Moreover, when component E is further introduced into the composition together with component C, a temperature range of the liquid crystal phase, viscosity, dielectric anisotropy and optical anisotropy of the liquid crystal composition can be adjusted. Content of component E in the case is ordinarily in the range of approximately 1 to approximately 99% by mass, preferably, in the range of approximately 10 to approximately 97% by mass, further preferably, in the range of approximately 30 to approximately 95% by mass, based on the total mass of the liquid crystal composition.

Component D (Compounds (6) to (11))

The liquid crystal composition of the invention may contain at least one kind of compound (component D) selected from the group of compounds represented by formulas (6) to (11). Component D is a compound having a benzene ring in which lateral positions are replaced by two halogens, such as 2,3-difluoro-1,4-phenylene.

Component D is a compound having a negative value of dielectric anisotropy. Component D is suitably used when preparing a liquid crystal composition for application to the VA mode or the PSA mode. Moreover, when component D is mixed, an elastic constant can be controlled, and a voltage-transmittance curve of the device can be adjusted.

Formula 21

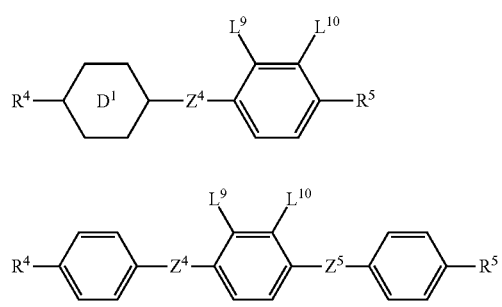

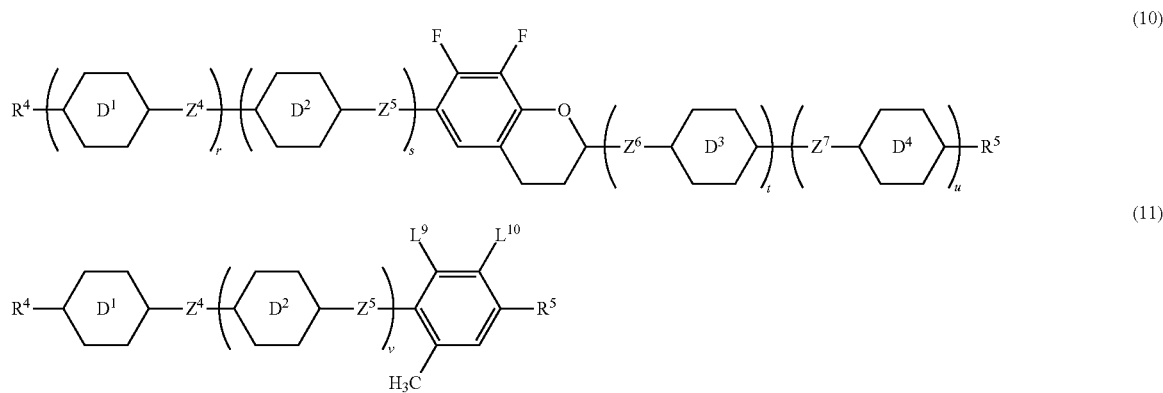

In formulas (6) to (11), a meaning of each symbol is as described below.

$R^4$ and $R^5$ are independently alkyl having 1 to 10 carbons or alkenyl having 2 to 10 carbons, and in the alkyl and the alkenyl, at least one of hydrogen may be replaced by fluorine, and at least one of —$CH_2$— may be replaced by —O—.

Ring $D^1$, ring $D^2$, ring $D^3$ and ring $D^4$ are independently 1,4-cyclohexylene, 1,4-cyclohexenylene, 1,4-phenylene, tetrahydropyran-2,5-diyl or decahydro-2,6-naphthalene, and in the 1,4-phenylene, at least one of hydrogen may be replaced by fluorine.

$Z^4$, $Z^5$, $Z^6$ and $Z^7$ are independently a single bond, —$(CH_2)_2$—, —COO—, —$CH_2O$—, —$OCF_2$— or —$OCF_2(CH_2)_2$—. Herein, —COO— is bonded with each ring in a direction in which carbonyl (—CO—) is on a side of left-terminal group $R^4$ and an ether bond (—O—) is on a side of right-terminal group $R^5$. The rule means that, for example, when $Z^4$ is —COO— in formula (6), —COO— is bonded in the form of $R^4$-ring $D^1$-COO-Ph($L^9$)($L^{10}$)-$R^5$, and not $R^4$-ring $D^1$-OCO-Ph($L^9$)($L^{10}$)-$R^5$. The rule also applies to —$CH_2O$—. Moreover, —$OCF_2$— is bonded with each ring in a direction in which an ether bond (—O—) is on a side of left-terminal group $R^4$ and difluoromethylene (—$CF_2$—) is on a side of right-terminal group $R^5$. The rule also applies to —$OCF_2(CH_2)_2$—.

$L^9$ and $L^{10}$ are independently fluorine or chlorine.

Then, q, r, s, t, u and v are independently 0 or 1.

A sum of r, s, t and u is 1 or 2.

Compound (6) is a bicyclic compound, and therefore effective mainly in adjusting the viscosity, the value of dielectric anisotropy or the value of optical anisotropy. Compound (7) and compound (8) each are a tricyclic compound, and therefore effective in increasing the maximum temperature, increasing the absolute value of dielectric anisotropy, increasing the value of optical anisotropy, or the like. Compounds (9) to (11) are effective in increasing the absolute value of dielectric anisotropy, or the like.

If the content of component D is increased, the absolute value of dielectric anisotropy of the liquid crystal composition increases, but the viscosity increases, and therefore the content is preferably decreased, as long as the requirement for the dielectric anisotropy of the liquid crystal composition is met. However, an absolute value of dielectric anisotropy of component D is approximately 5. Accordingly, in order to perform sufficient voltage driving, the content of component D is preferably in the range of approximately 40% by mass or more, further preferably, in the range of approximately 50% to approximately 95% by mass, based on the total mass of the liquid crystal composition. In the case, content of component A is preferably in the range of approximately 2 to approximately 40% by mass based on the total mass of the liquid crystal composition. A liquid crystal composition having the content of component D in the range is preferred as a liquid crystal composition for application to the VA mode or the PSA mode in the application.

On the other hand, when component D is mixed with a liquid crystal composition having a positive value of dielectric anisotropy, the content thereof is preferably in the range of approximately 30% by mass or less, further preferably, in the range of approximately 10% or less, based on the total mass of the liquid crystal composition.

Component E (Compounds (12) to (14))

The liquid crystal composition of the invention may contain at least one kind of compound (component E) selected from the group of compounds represented by formulas (12) to (14). Component E is a compound having alkyl or the like as two terminal groups.

Component E has a small absolute value of dielectric anisotropy, and is close to neutrality. When component E is used, the threshold voltage, the temperature range of the liquid crystal phase, the value of dielectric anisotropy, the value of optical anisotropy, and the viscosity can be adjusted.

Formula 22

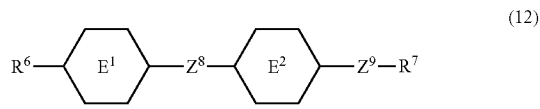

(12)

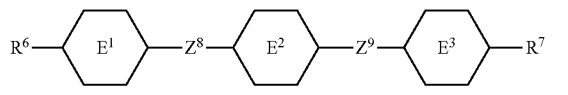

(13)

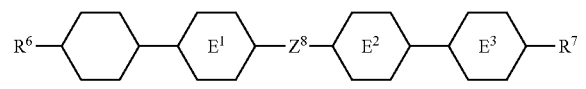

(14)

In formulas (12) to (14), a meaning of each symbol is as described below.

$R^6$ and $R^7$ are independently alkyl having 1 to 10 carbons or alkenyl having 2 to 10 carbons, and in the alkyl and the alkenyl, at least one of —$CH_2$— may be replaced by —O—.

Ring $E^1$, ring $E^2$ and ring $E^3$ are independently 1,4-cyclohexylene, 1,4-phenylene, 2-fluoro-1,4-phenylene, 2,5-difluoro-1,4-phenylene, or pyrimidine-2,5-diyl.

$Z^8$ and $Z^9$ are independently a single bond, —$(CH_2)_2$—, —CH=CH—, —C≡C—, or —COO—. Herein, —COO— is bonded with each ring in a direction in which carbonyl (—CO—) is on a side of left-terminal group $R^6$ and an ether bond (—O—) is on a side of right-terminal group $R^7$.

The rule means that, for example, when $Z^8$ is —COO— in formula (12), —COO— is bonded in the form of ring $E^1$-COO-ring $E^2$, and not ring $E^1$-OCO-ring $E^2$.

Compound (12) is effective mainly in adjusting the viscosity or the value of optical anisotropy. Compound (13) and compound (14) are effective in extending the temperature range of the nematic phase by increasing the maximum temperature, or effective in adjusting the value of optical anisotropy.

If the content of component E is increased, the viscosity of the liquid crystal composition decreases, but the value of dielectric anisotropy of the liquid crystal composition decreases, and therefore the content is preferably increased, as long as the requirement for the dielectric anisotropy of the liquid crystal composition is met.

When preparing a liquid crystal composition for application to the VA mode or the PSA mode, the content of component E is preferably in the range of approximately 30% by mass or more, further preferably, in the range of approximately 40% by mass or more, based on the total mass of the liquid crystal composition.

Description of Specific Examples of Component B to Component E

Among types of component B, specific examples of suitable compounds represented by formula (2) include compounds represented by formulas (2-1) to (2-16), specific examples of suitable compounds represented by formula (3) include compounds represented by formulas (3-1) to (3-112), and specific examples of suitable compounds represented by formula (4) include compounds represented by formulas (4-1) to (4-54).

Formula 23
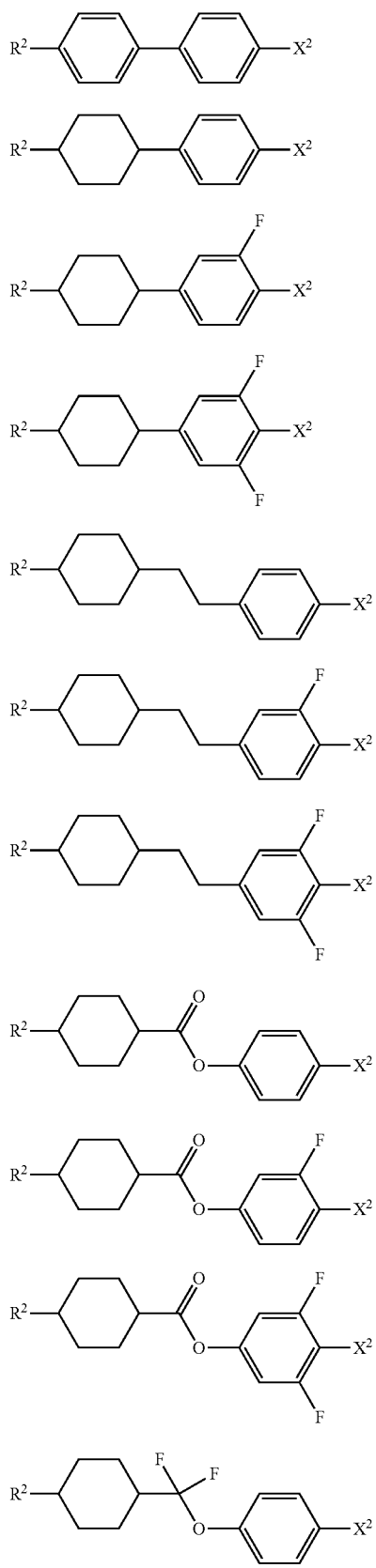
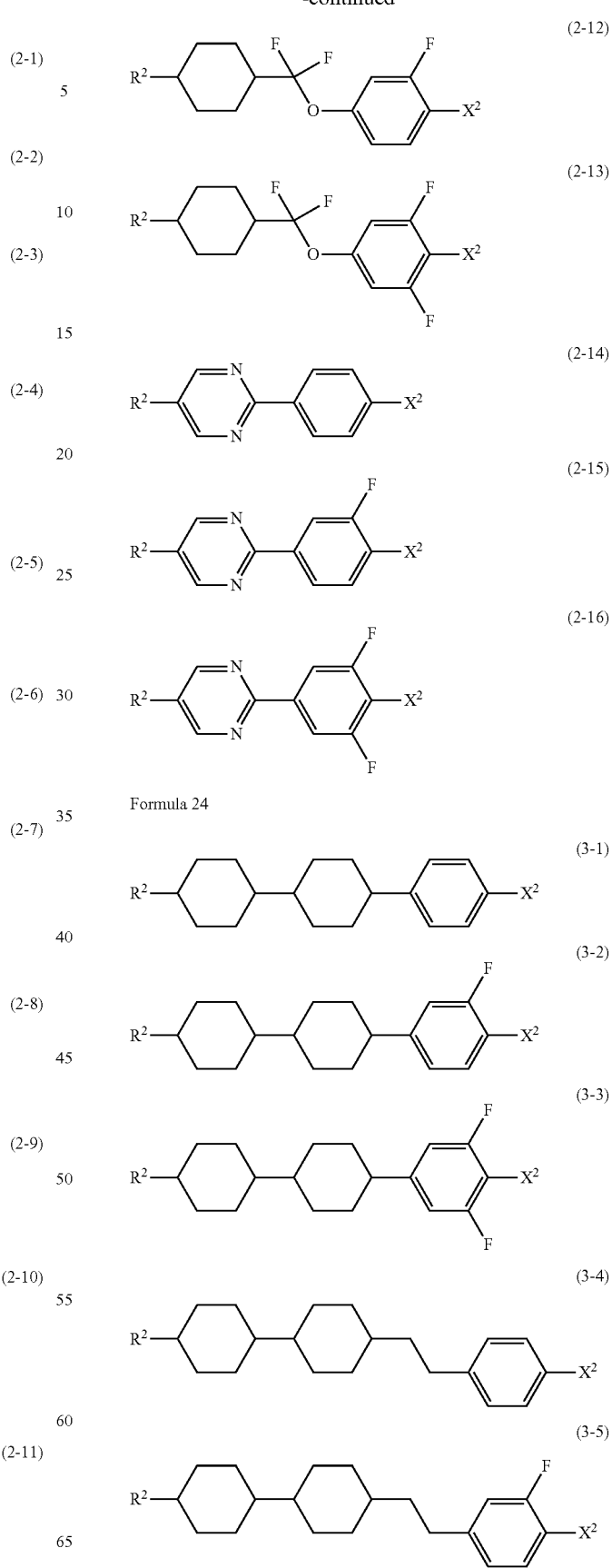
Formula 24

(3-6)
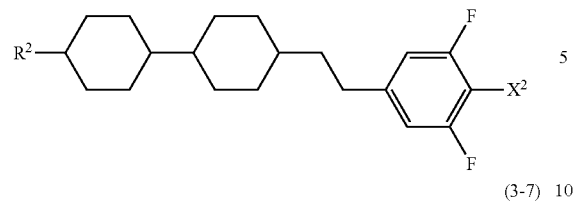
(3-7)
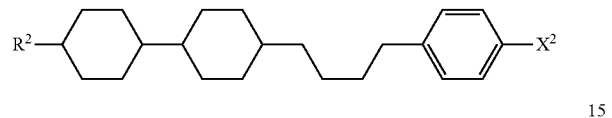
(3-8)
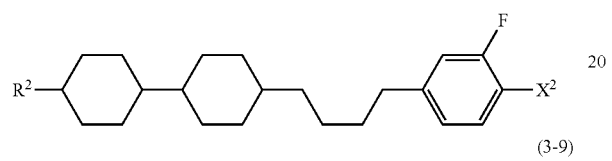
(3-9)
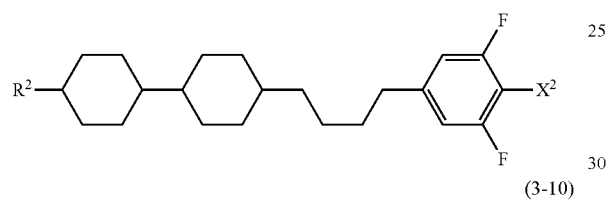
(3-10)
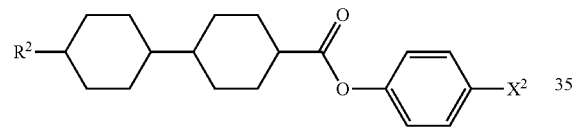
(3-11)
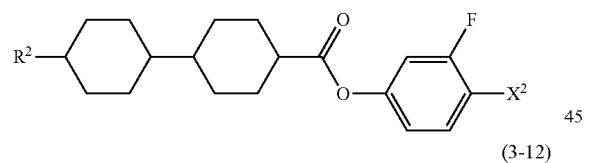
(3-12)
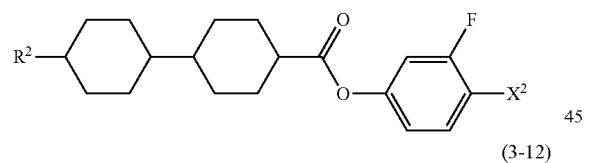
(3-13)
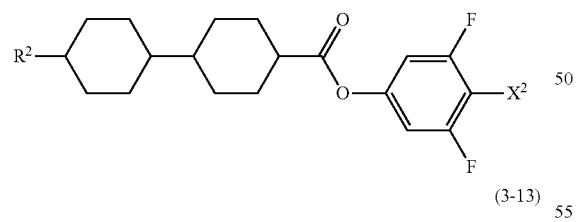
(3-14)
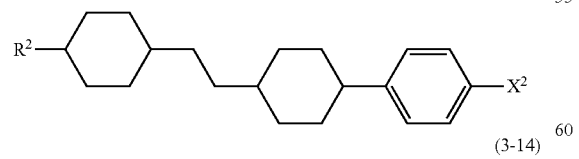
(3-15)
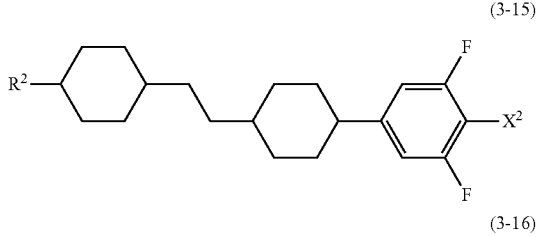
(3-16)
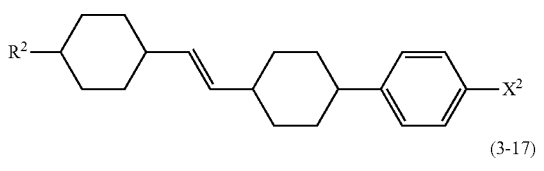
(3-17)
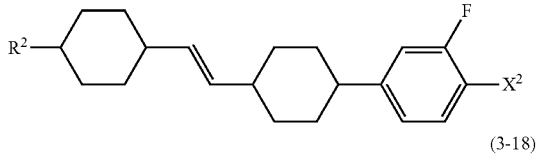
(3-18)
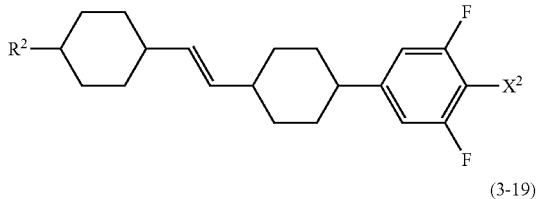
(3-19)
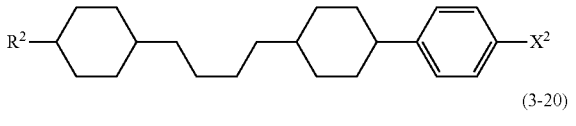
(3-20)
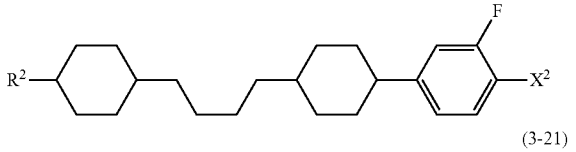
(3-21)
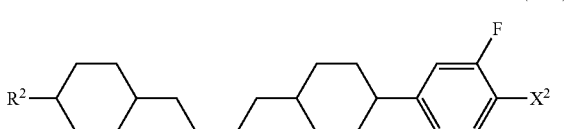
(3-21)
(3-22)
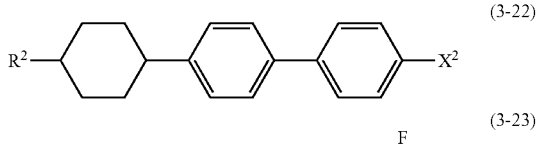
(3-23)
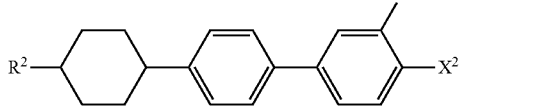

(3-24) 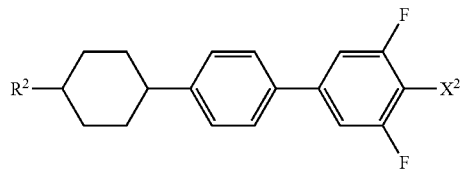
Formula 25
(3-25) 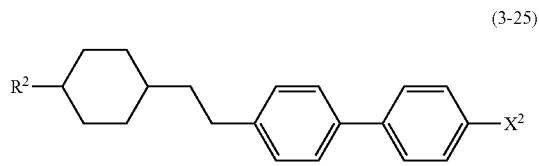
(3-26) 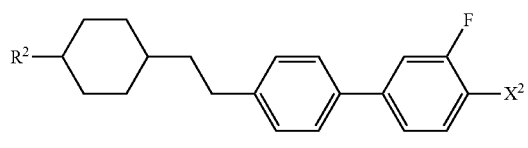
(3-27) 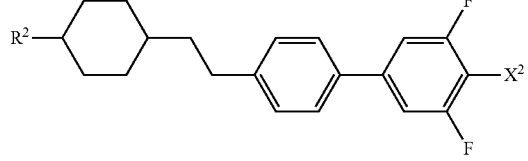
(3-28) 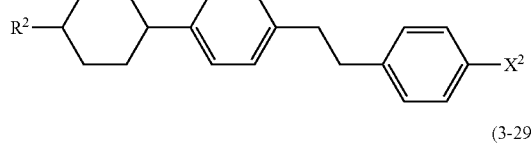
(3-29) 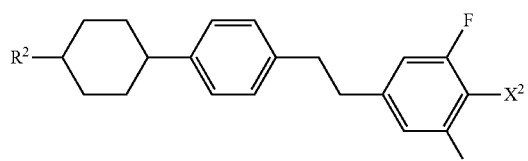
(3-30) 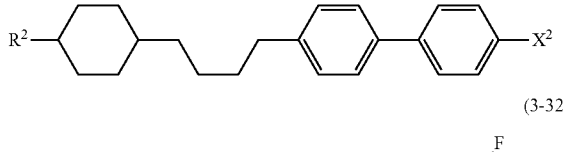
(3-31) 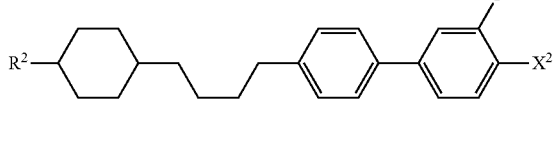
(3-32)
(3-33) 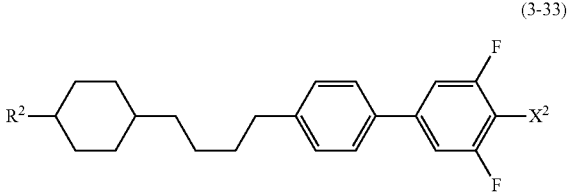
(3-34) 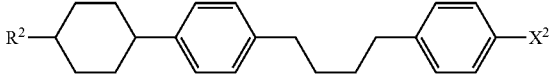
(3-35) 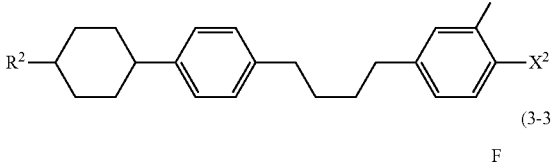
(3-36) 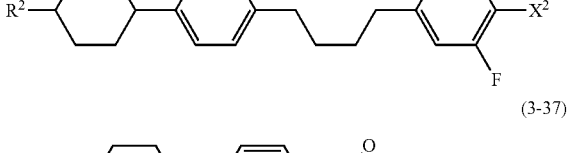
(3-37) 
(3-38) 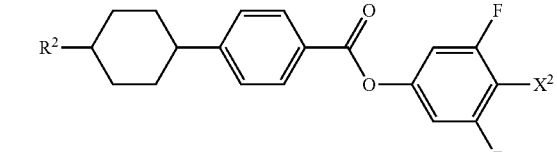
(3-39) 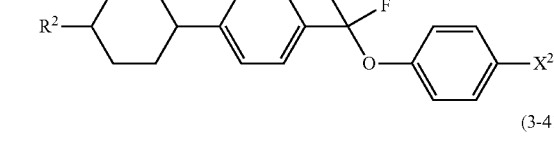
(3-40) 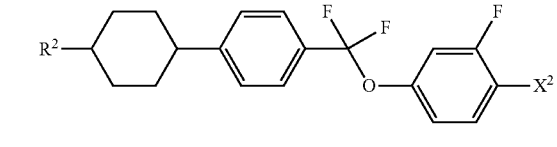
(3-41)

(3-42) 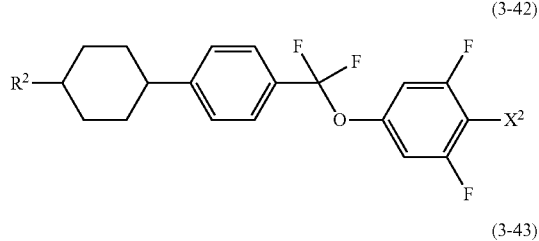
(3-43) 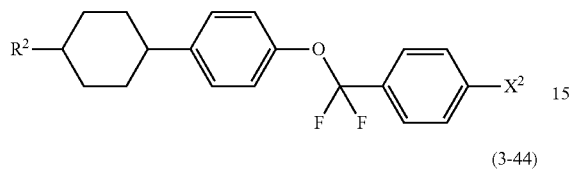
(3-44) 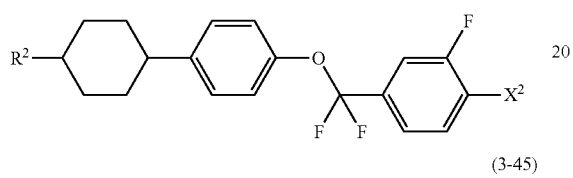
(3-45) 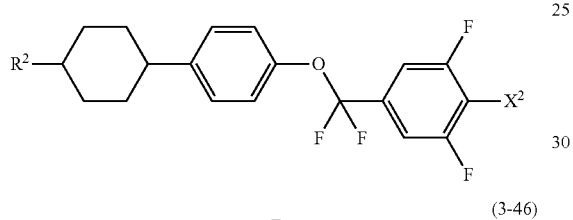
(3-46) 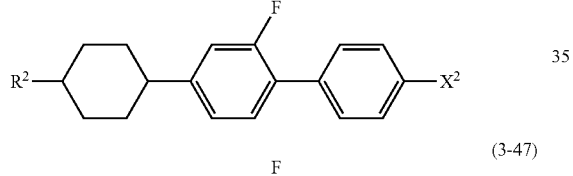
(3-47) 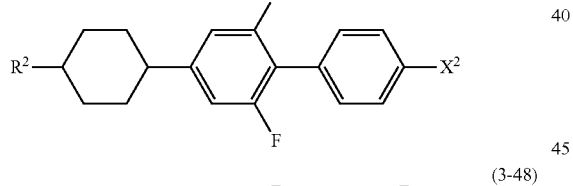
(3-48) 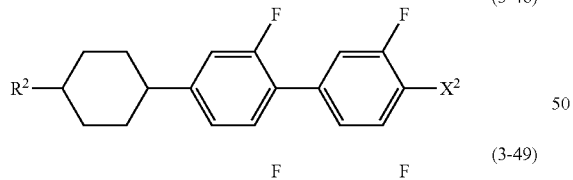
(3-49) 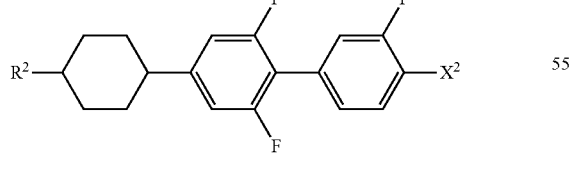
(3-50) 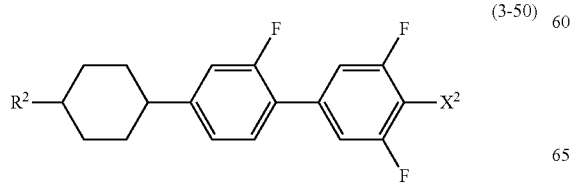
(3-51) 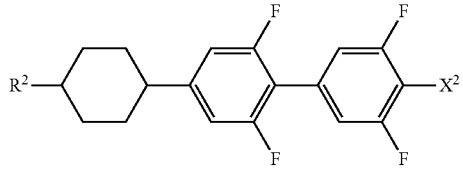
Formula 26
(3-52) 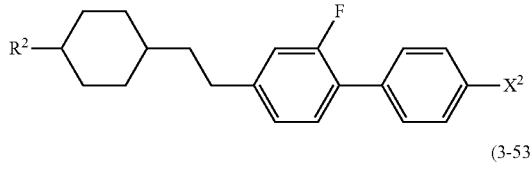
(3-53) 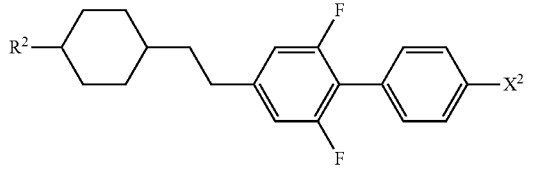
(3-54) 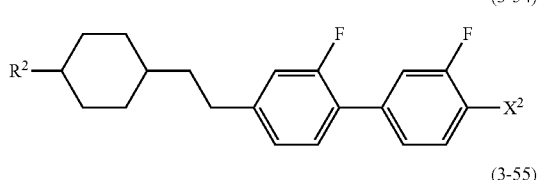
(3-55) 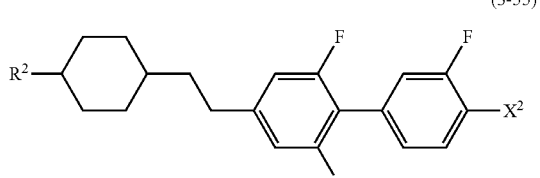
(3-56) 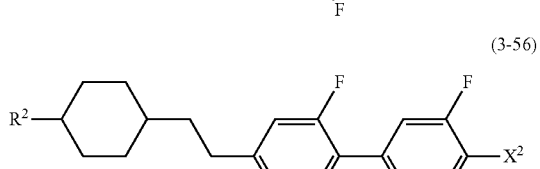
(3-57) 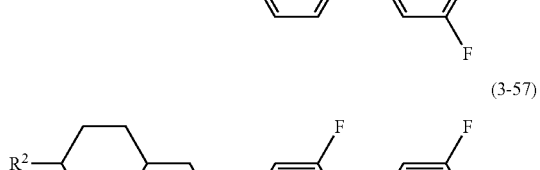
(3-58) 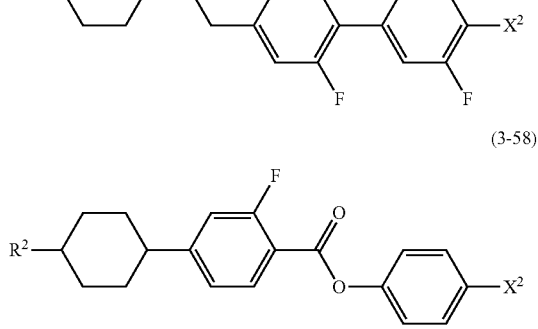

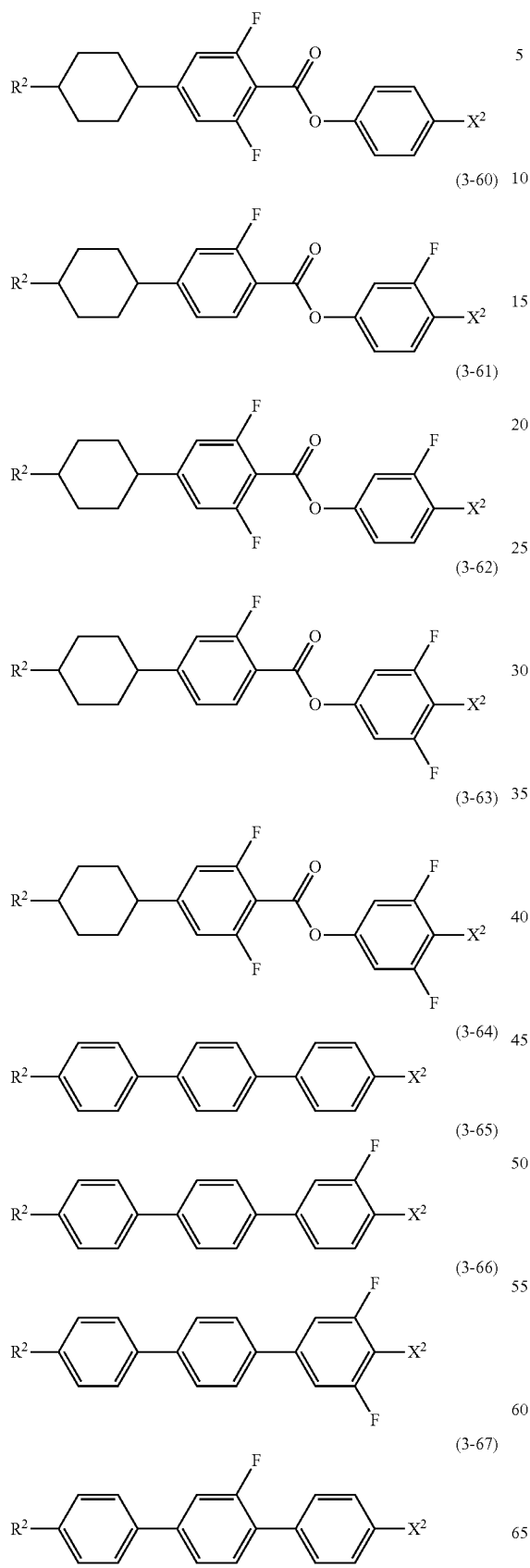
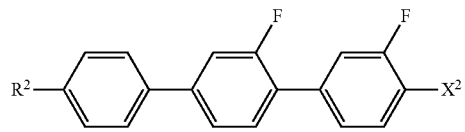
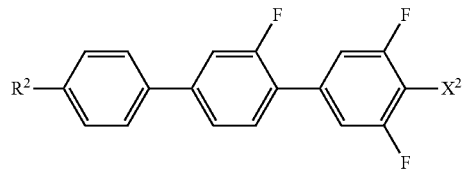
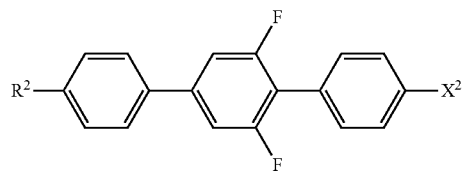
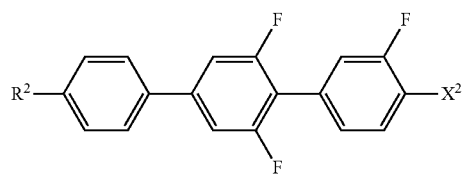
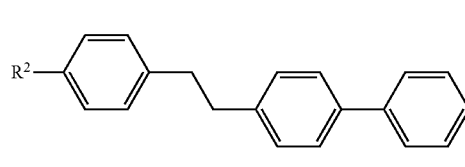
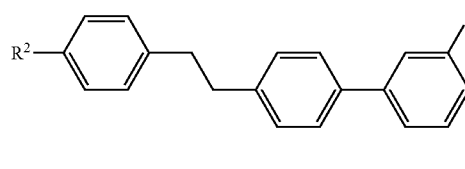
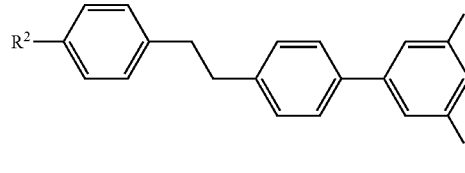
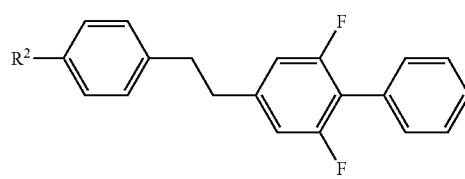
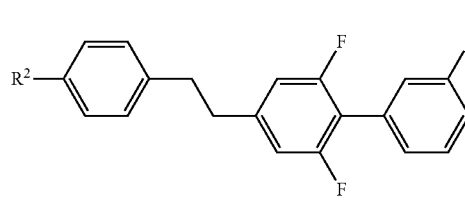

Formula 27
(3-77) 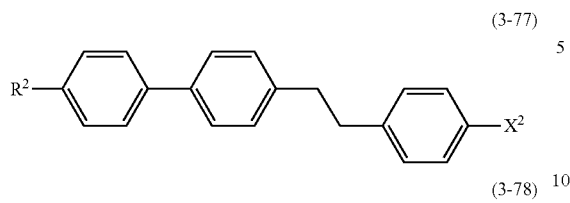
(3-78) 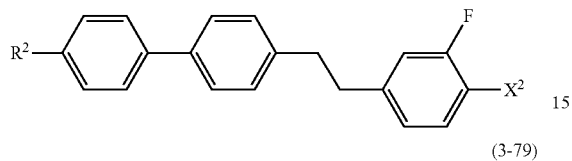
(3-79) 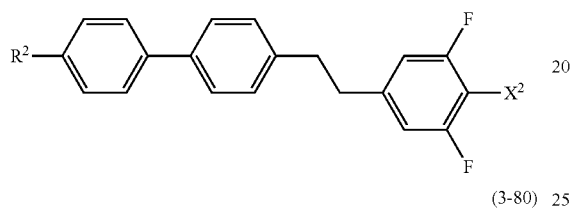
(3-80) 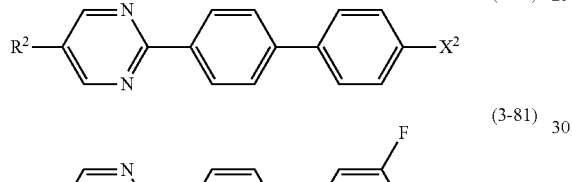
(3-81) 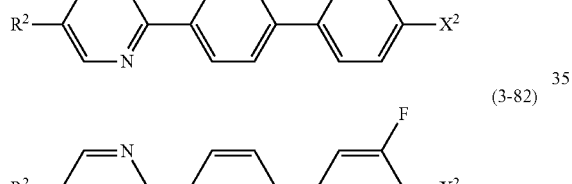
(3-82) 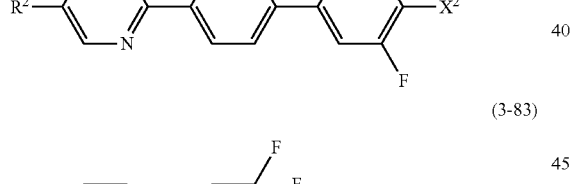
(3-83) 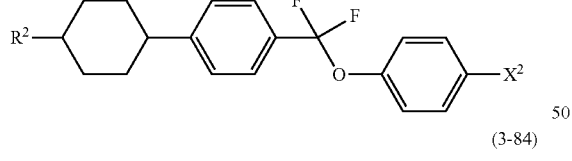
(3-84) 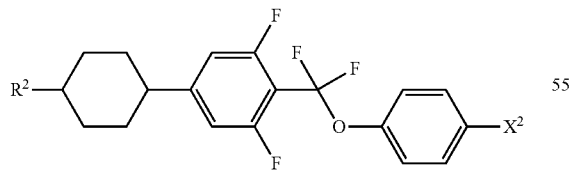
(3-85) 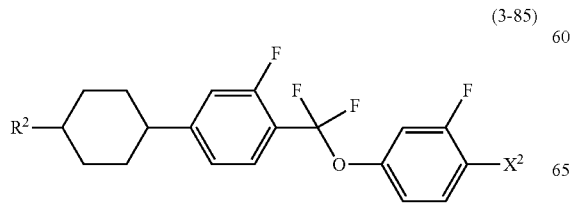
(3-86) 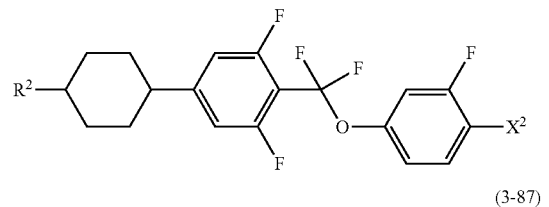
(3-87) 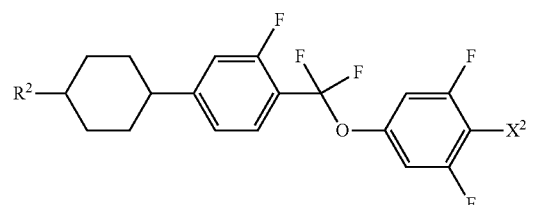
(3-88) 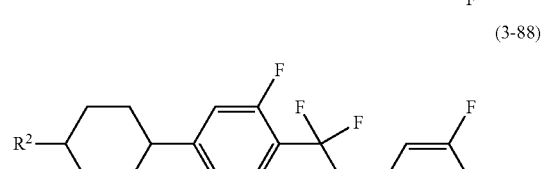
(3-89) 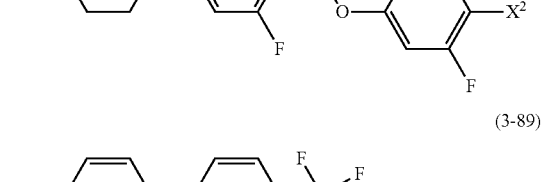
(3-90) 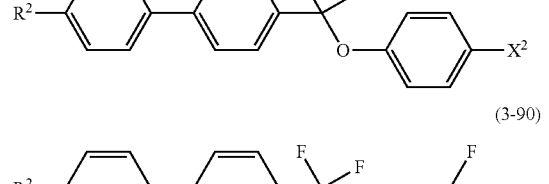
(3-91) 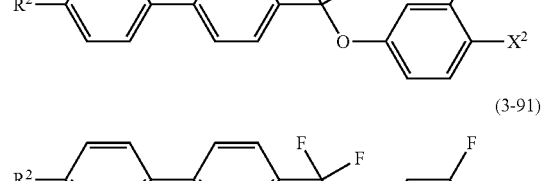
(3-92) 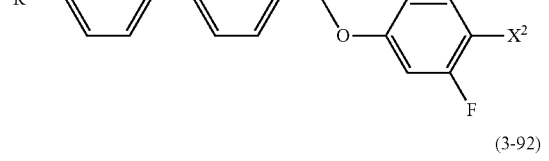
(3-93) 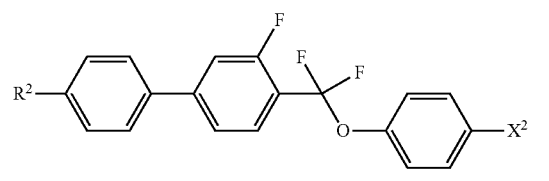

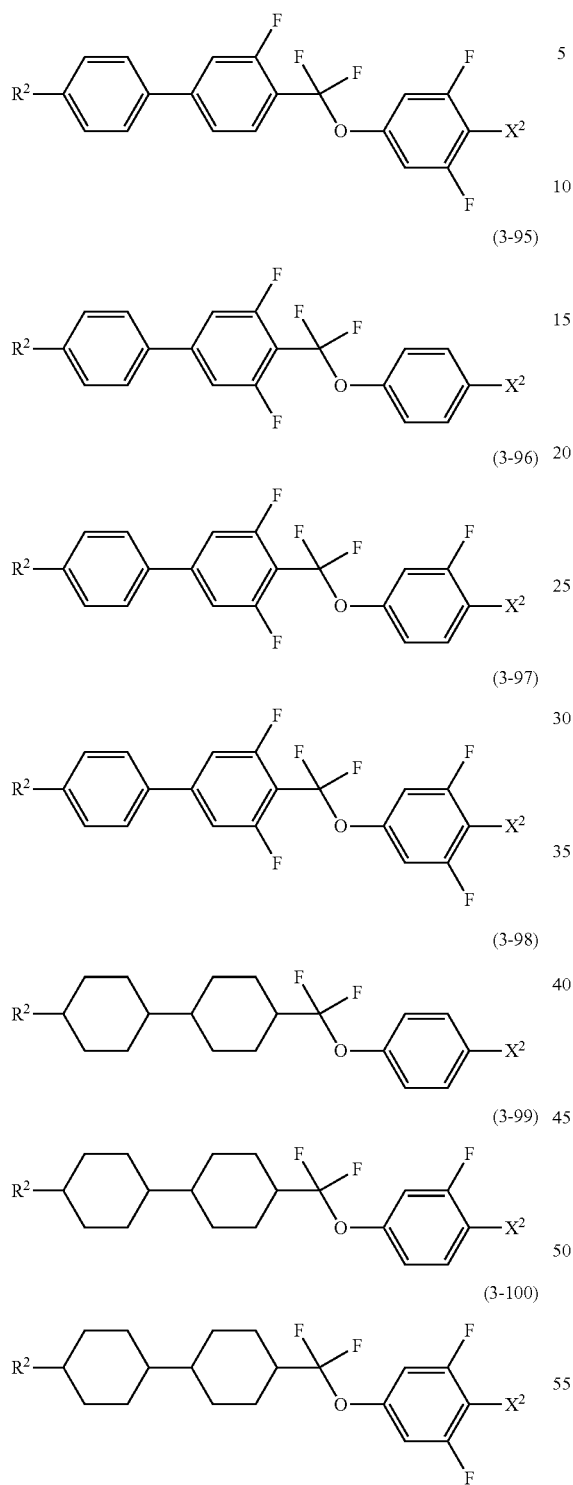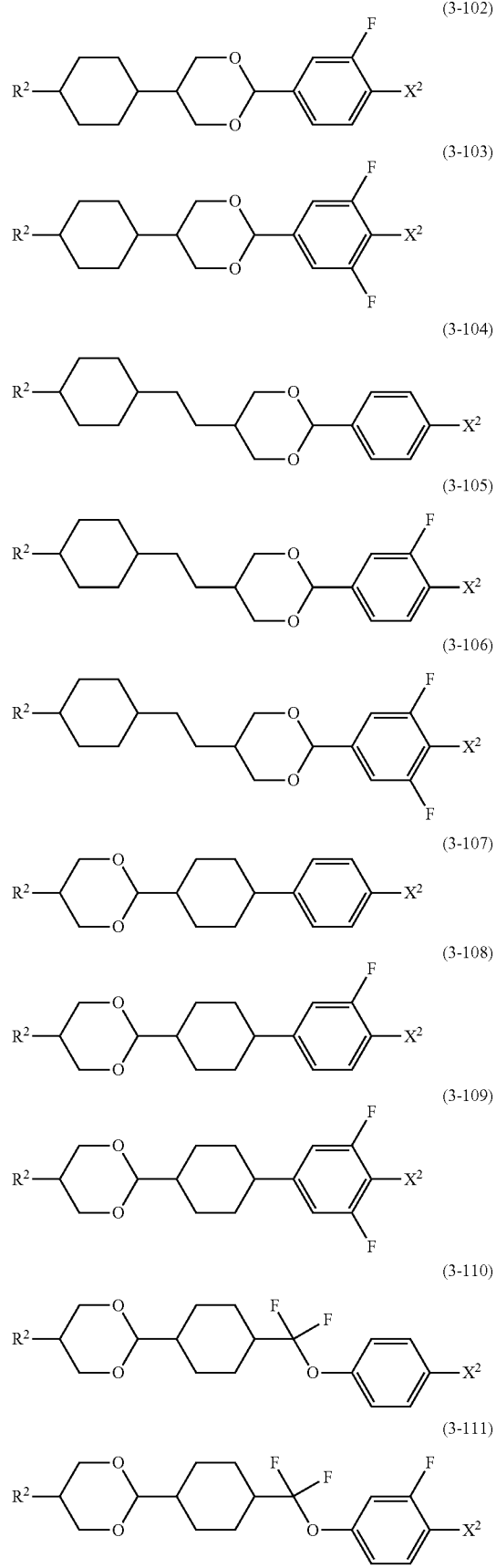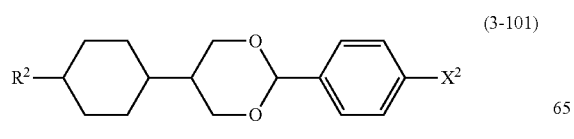

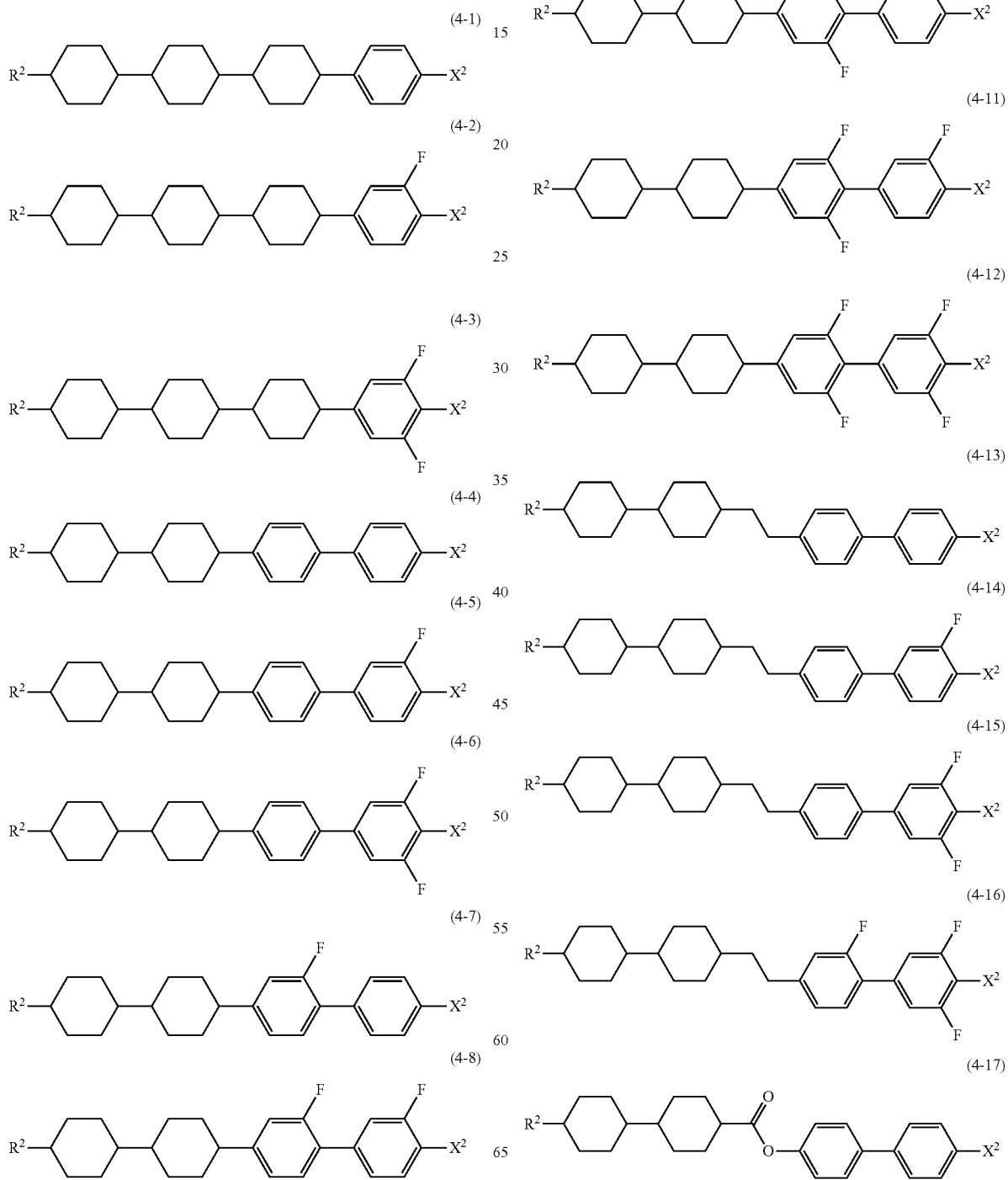

(4-18)
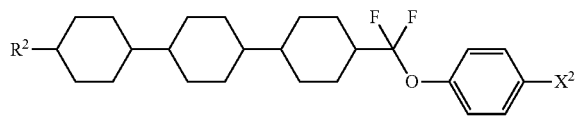
(4-19)
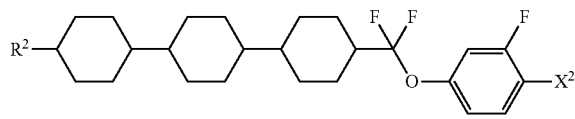
(4-20)
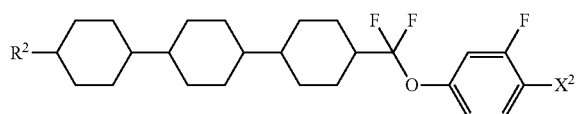
(4-21)
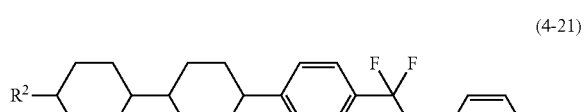
(4-22)
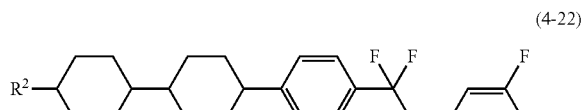
(4-23)
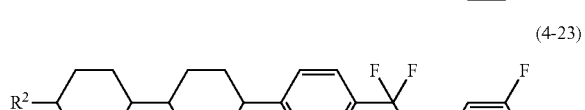
(4-24)
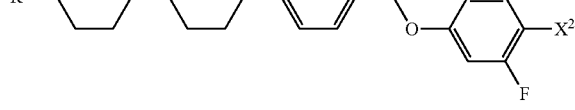
(4-25)
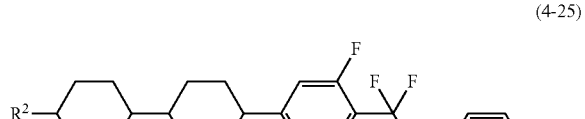
(4-26)
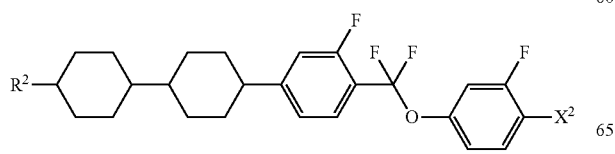
(4-27)
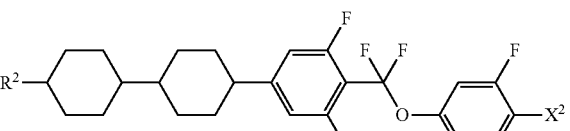
(4-28)
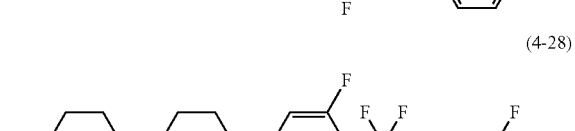
(4-29)
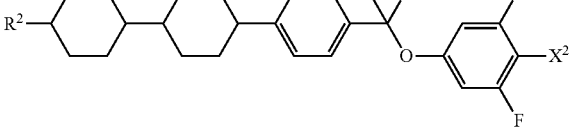
Formula 30
(4-30)
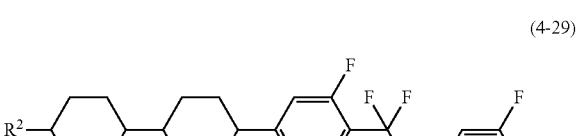
(4-31)
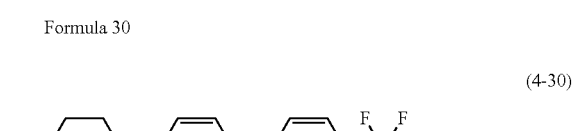
(4-32)
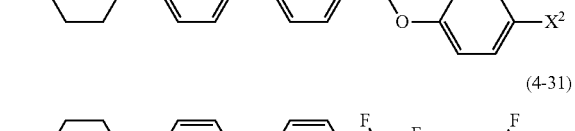
(4-33)
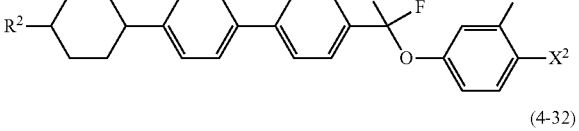
(4-34)
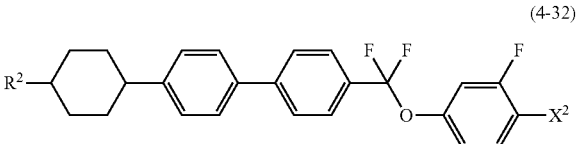

(4-35)
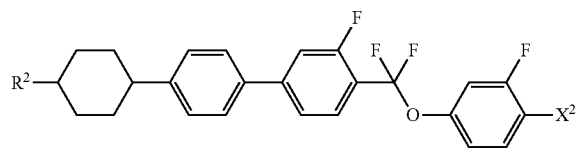
(4-36)
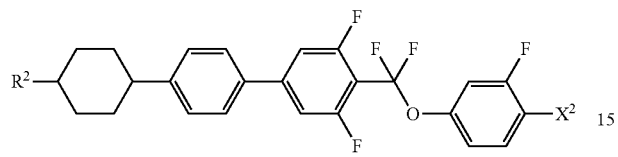
(4-37)
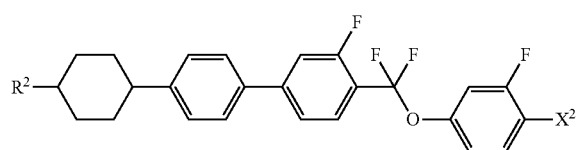
(4-38)
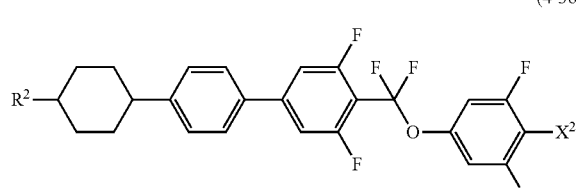
(4-39)
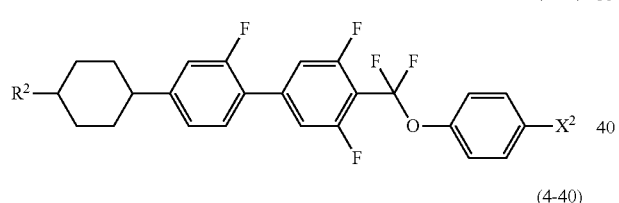
(4-40)
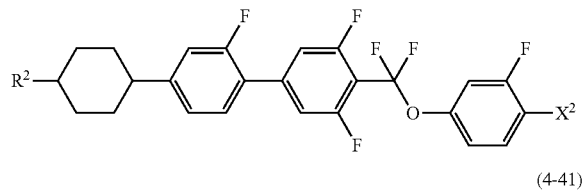
(4-41)
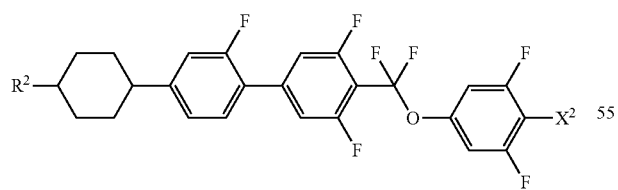
(4-42)
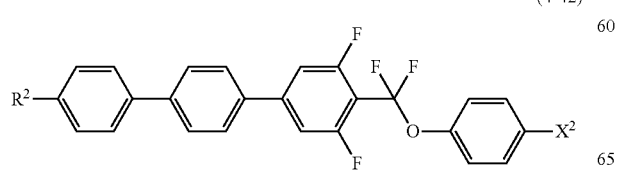
(4-43)
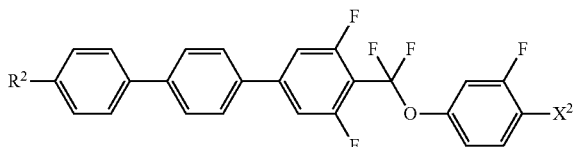
(4-44)
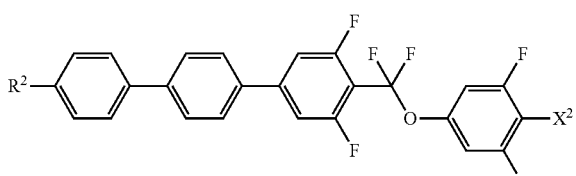
(4-45)
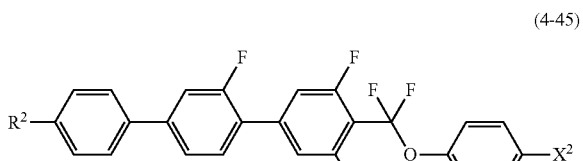
(4-46)
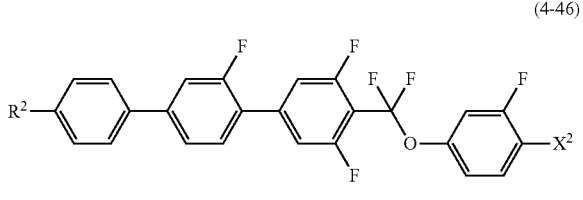
(4-47)
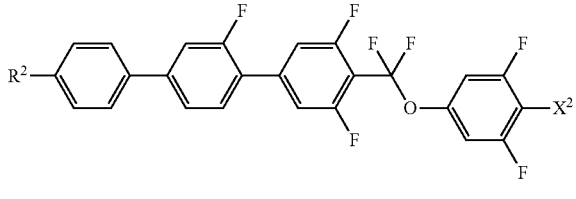
(4-48)
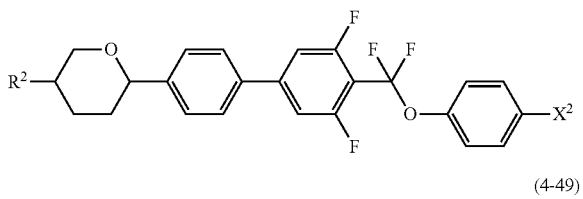
(4-49)
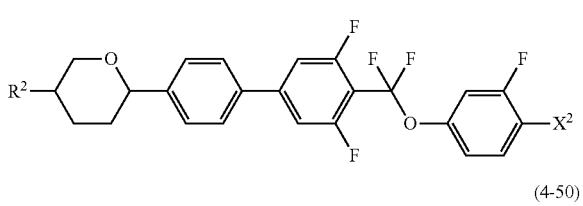
(4-50)
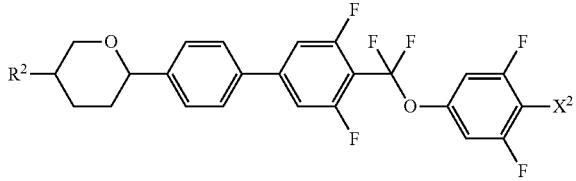

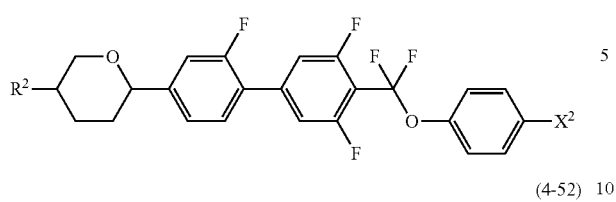
(4-51)
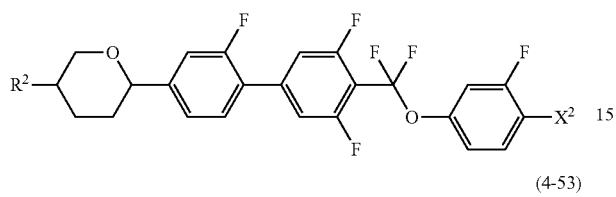
(4-52)
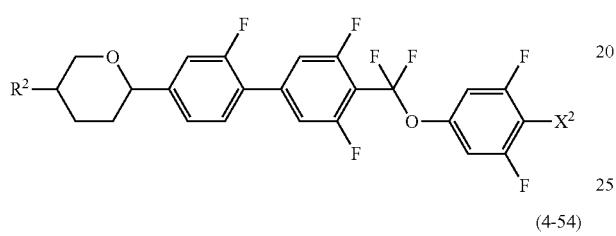
(4-53)
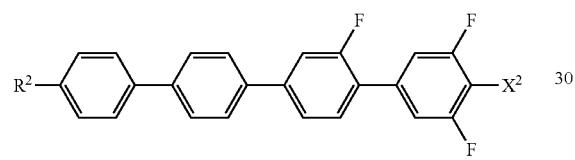
(4-54)
In the formulas, $R^2$ and $X^2$ are defined in a manner identical with the definitions of $R^2$ and $X^2$ in formulas (2) to (4).
Among types of component C, specific examples of suitable compounds represented by formula (5) include compounds represented by formulas (5-1) to (5-64).
Formula 31
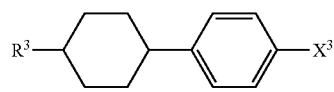
(5-1)
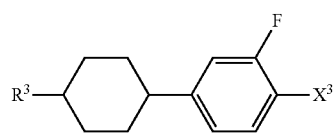
(5-2)
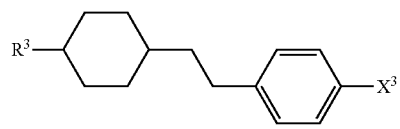
(5-3)
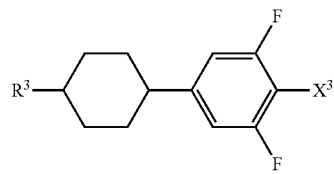
(5-4)
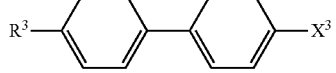
(5-5)
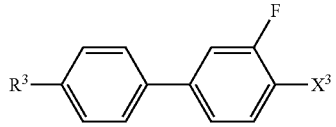
(5-6)
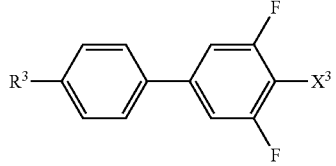
(5-7)
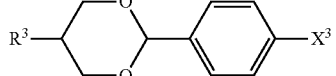
(5-8)
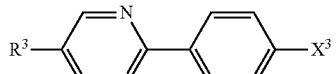
(5-9)
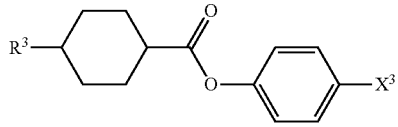
(5-10)
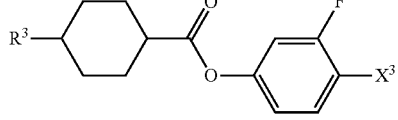
(5-11)
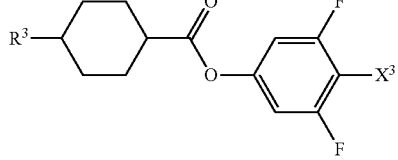
(5-12)
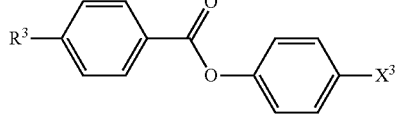
(5-13)
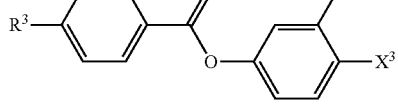
(5-14)
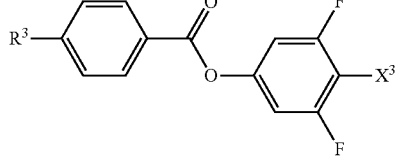
(5-15)

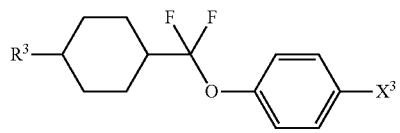
(5-16)
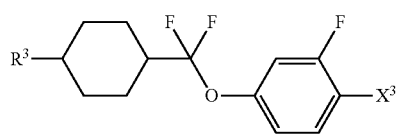
(5-17)
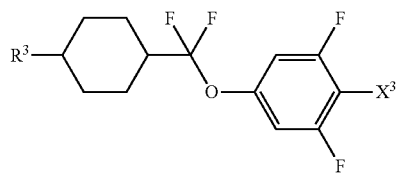
(5-18)
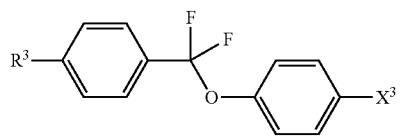
(5-19)
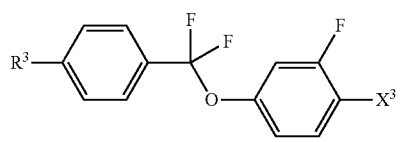
(5-20)
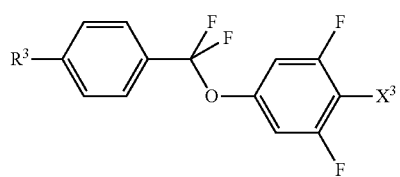
(5-21)
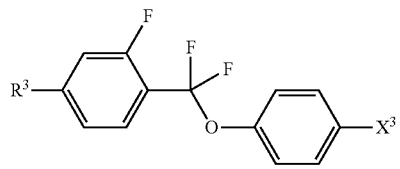
(5-22)
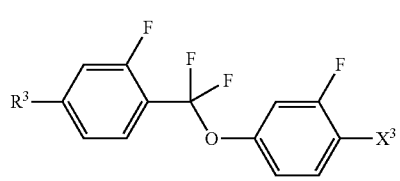
(5-23)
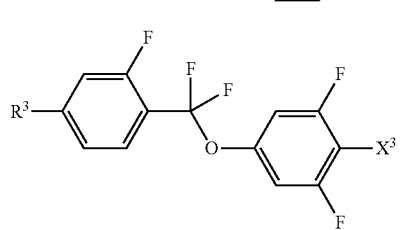
(5-24)
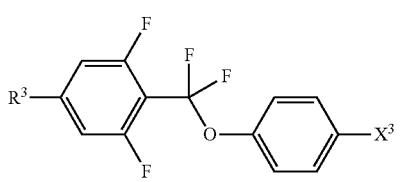
(5-25)
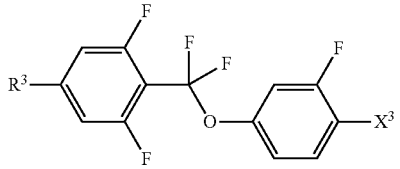
(5-26)
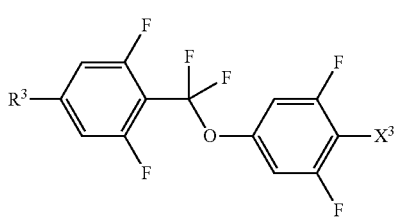
(5-27)
Formula 32
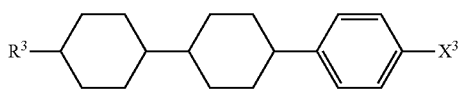
(5-28)
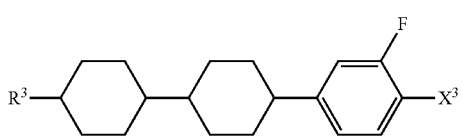
(5-29)
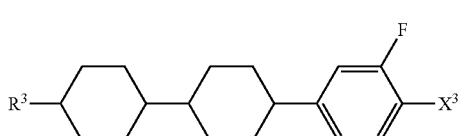
(5-30)
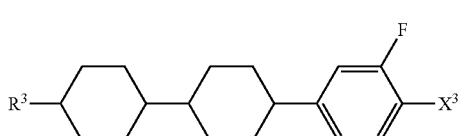
(5-31)
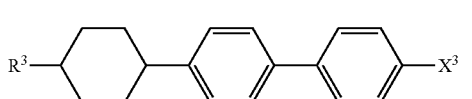
(5-32)
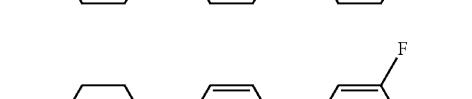
(5-33)
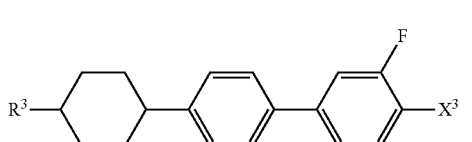
(5-34)
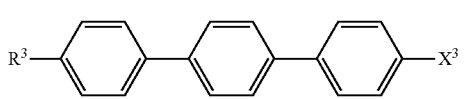

-continued
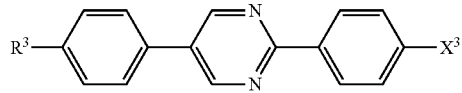
(5-35)
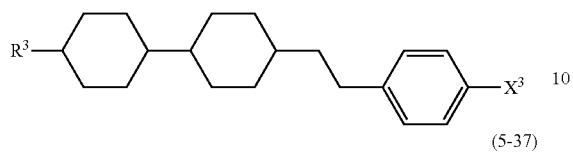
(5-36)
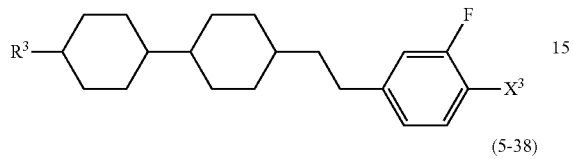
(5-37)
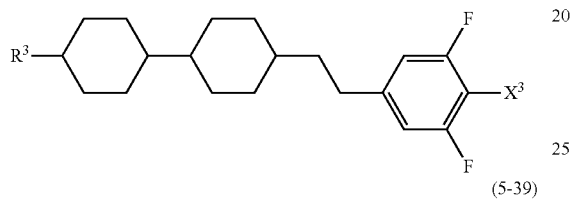
(5-38)
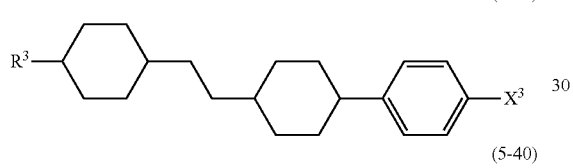
(5-39)
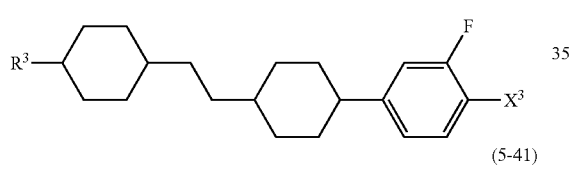
(5-40)
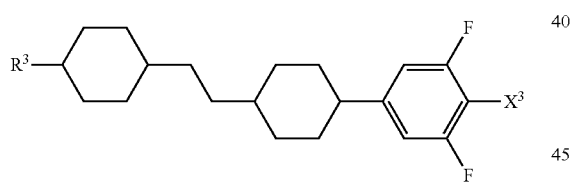
(5-41)
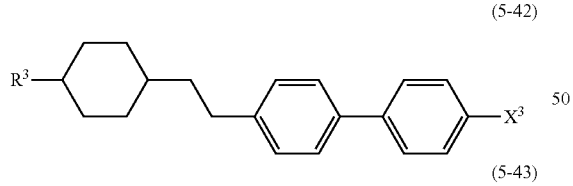
(5-42)
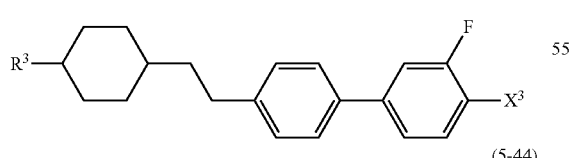
(5-43)
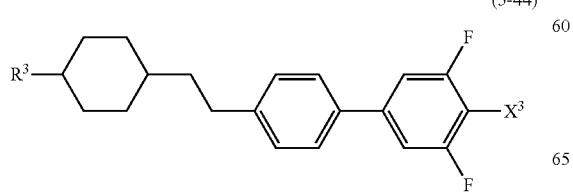
(5-44)
-continued
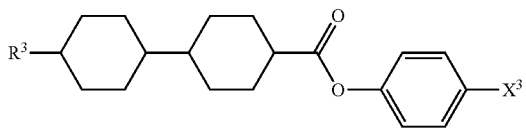
(5-45)
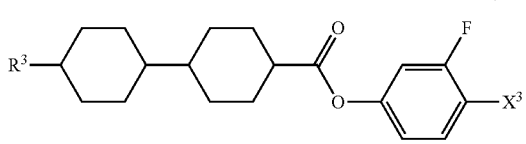
(5-46)
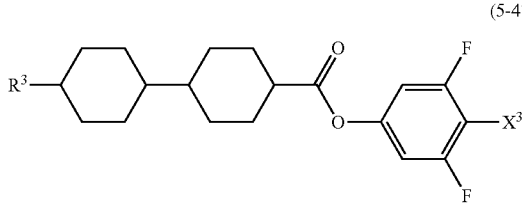
(5-47)
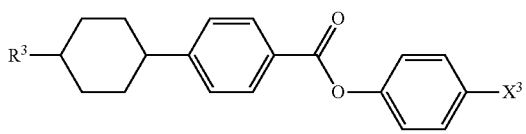
(5-48)
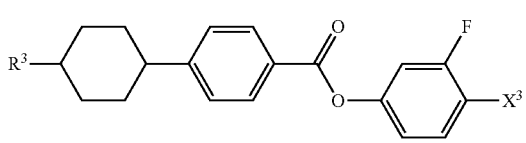
(5-49)
Formula 33
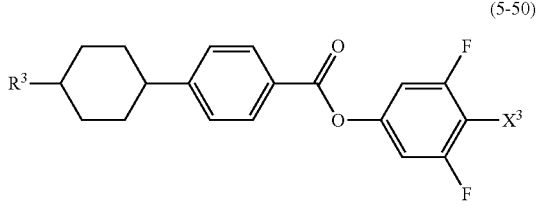
(5-50)
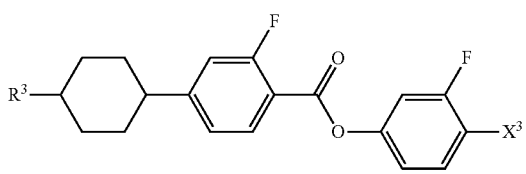
(5-51)
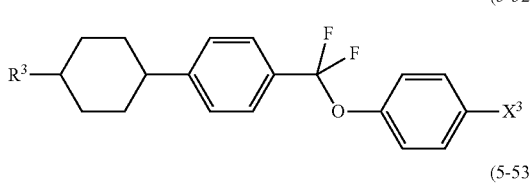
(5-52)
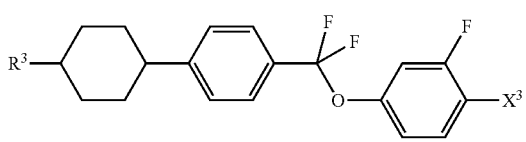
(5-53)

(5-54)
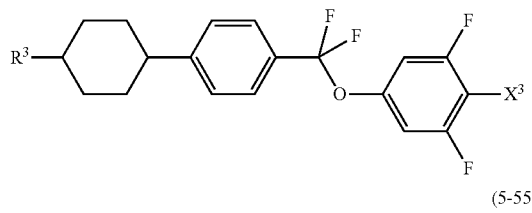

(5-55)
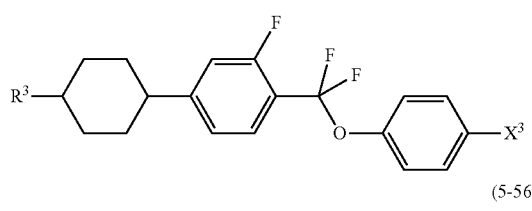

(5-56)
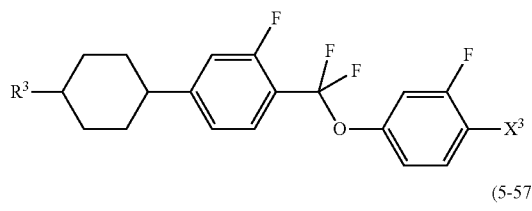

(5-57)
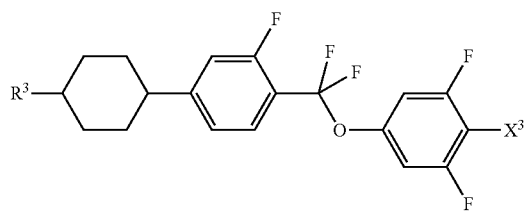

(5-58)
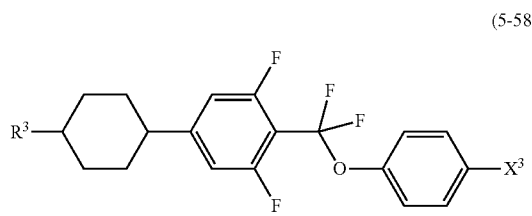

(5-59)
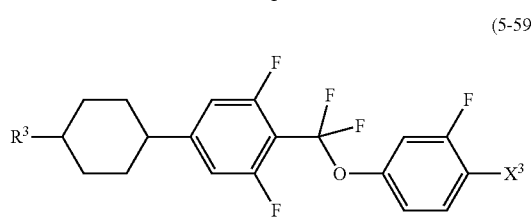

(5-60)
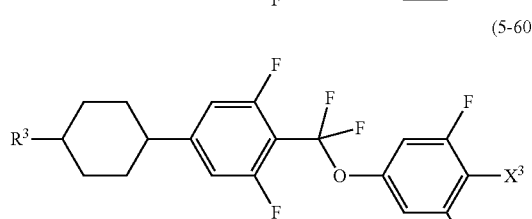

(5-61)
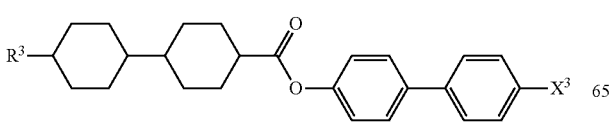

(5-62)
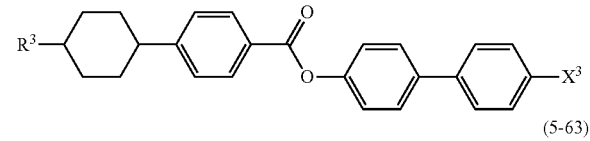

(5-63)
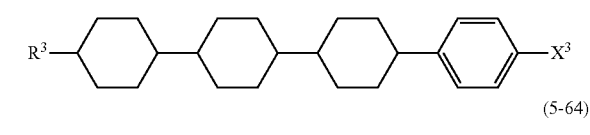

(5-64)
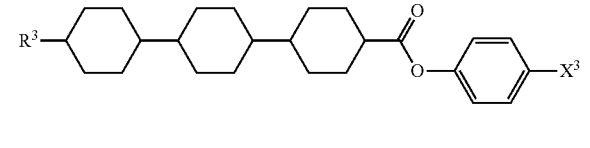

In the formulas, $R^3$ and $X^3$ are defined in a manner identical with the definitions of $R^3$ and $X^3$ in formula (5).

Among types of component D, specific examples of suitable compounds represented by formulas (6) to (11) include compounds represented by formulas (6-1) to (6-6), compounds represented by formulas (7-1) to (7-15), a compound represented by formula (8-1), compounds represented by formulas (9-1) to (9-3), compounds represented by formulas (10-1) to (10-11), and compounds represented by formulas (11-1) to (11-10), respectively.

Formula 34

(6-1)
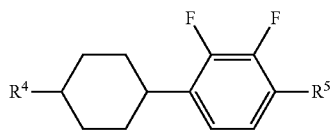

(6-2)
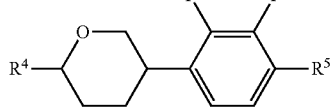

(6-3)
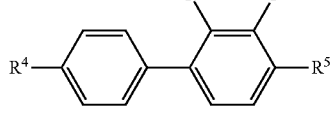

(6-4)
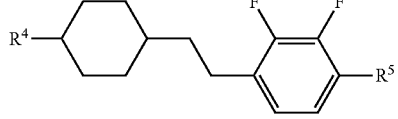

(6-5)
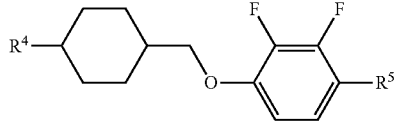

(6-6)
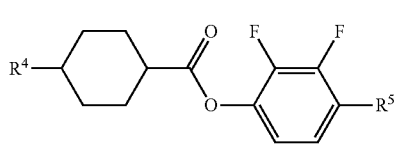

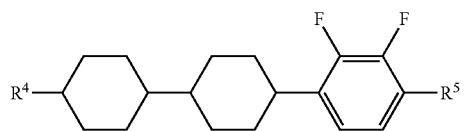 (7-1)
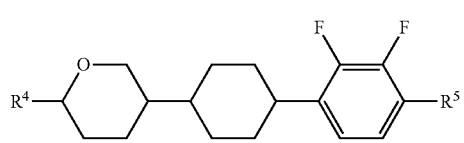 (7-2)
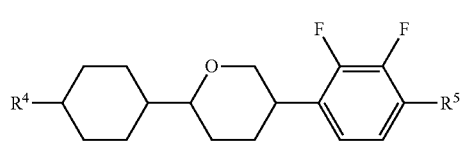 (7-3)
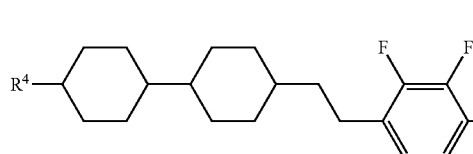 (7-4)
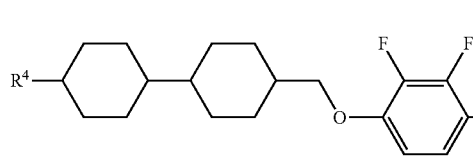 (7-5)
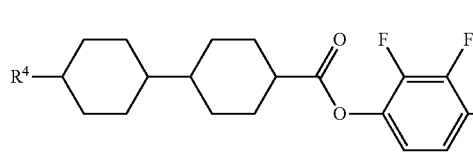 (7-6)
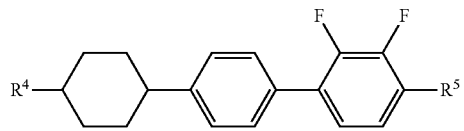 (7-7)
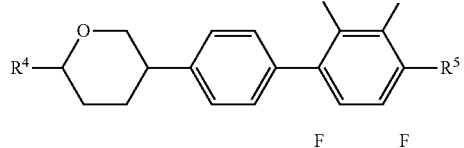 (7-8)
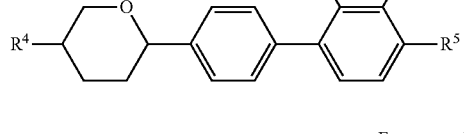 (7-9)
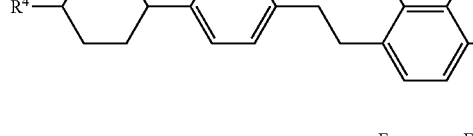 (7-10)
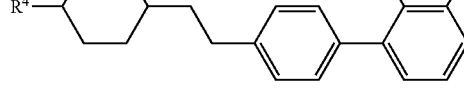 (7-11)
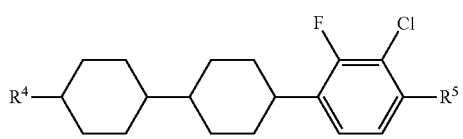 (7-12)
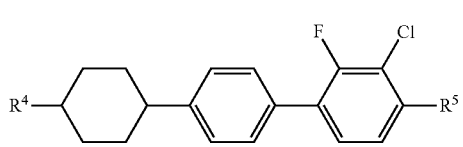 (7-13)
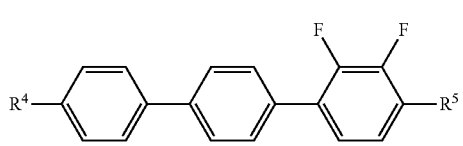 (7-14)
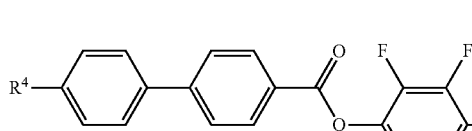 (7-15)
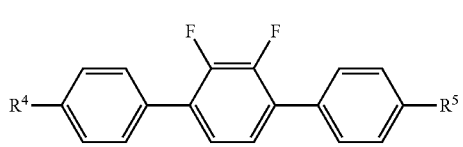 (8-1)
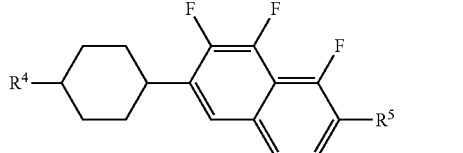 (9-1)
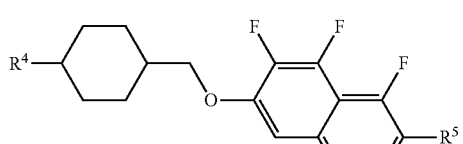 (9-2)
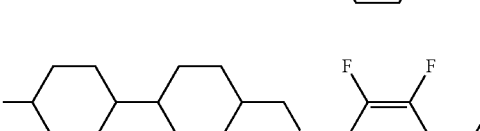 (9-3)
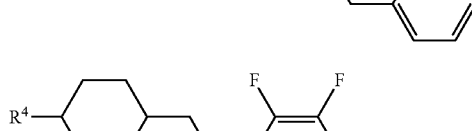 (10-1)
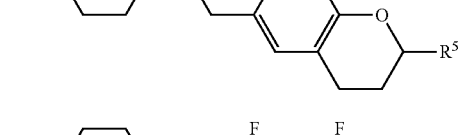 (10-2)

(10-3)
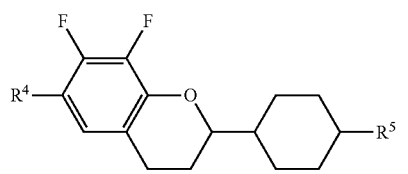
(10-4)
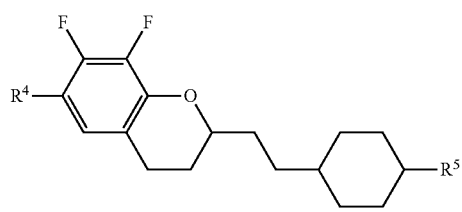
Formula 35
(10-5)
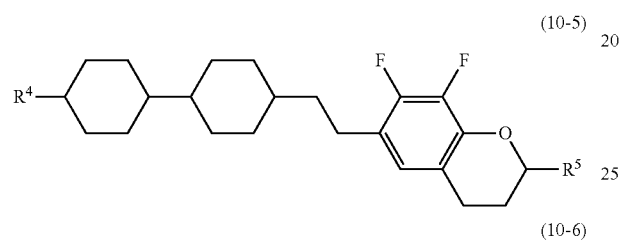
(10-6)
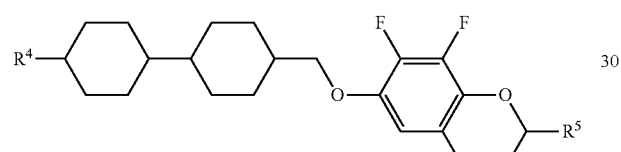
(10-7)
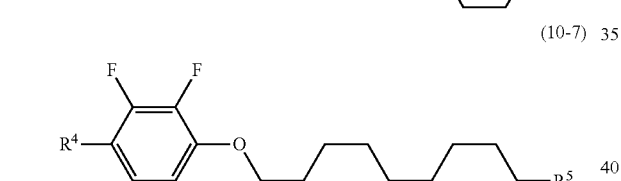
(10-8)
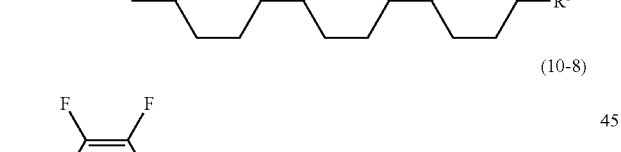
(10-9)
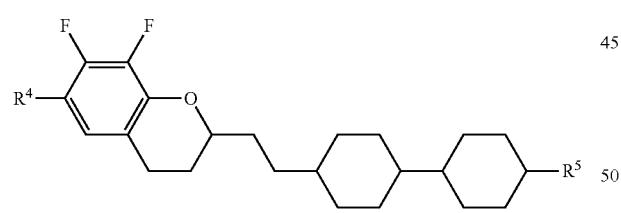
(10-10)
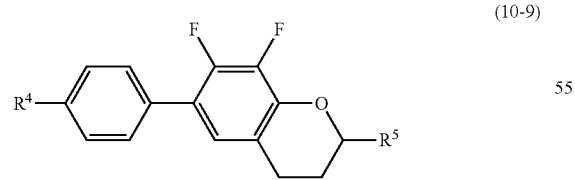
(10-11)
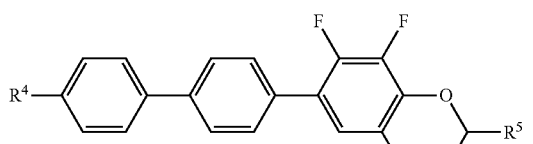
(11-1)
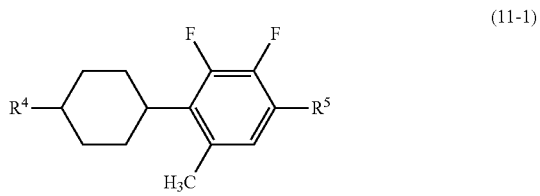
(11-2)
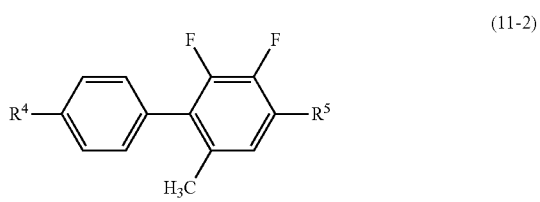
(11-3)
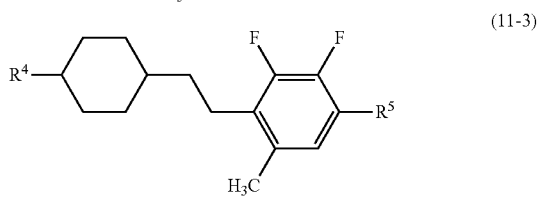
(11-4)
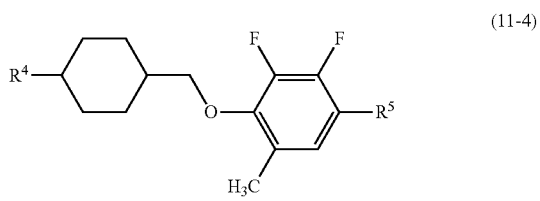
(11-5)
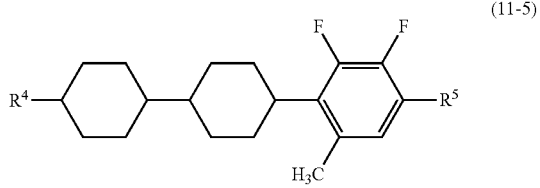
(11-6)
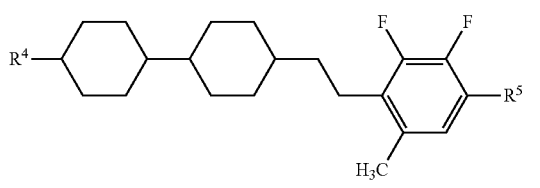
(11-7)
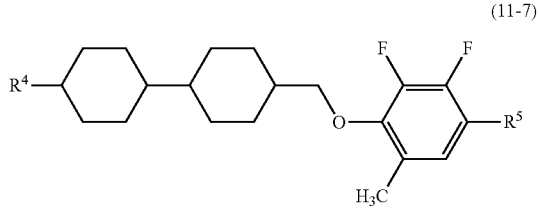

-continued

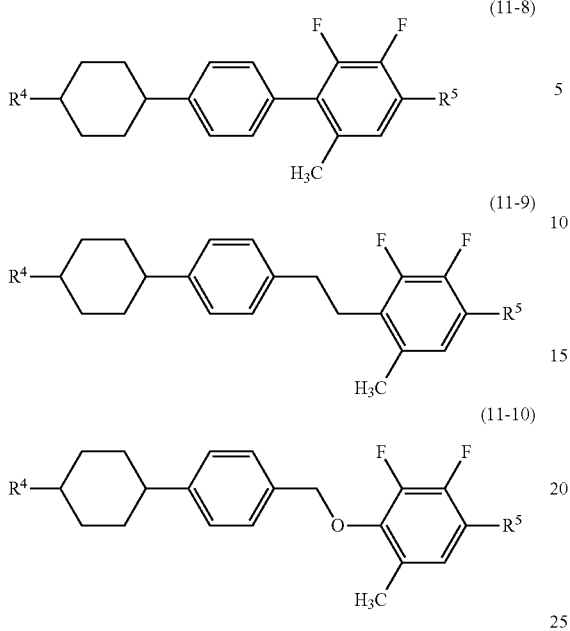

In the formulas, $R^4$ and $R^5$ are defined in a manner identical with the definitions of $R^4$ and $R^5$ in formulas (6) to (11).

Among types of component E, specific examples of suitable compounds represented by formulas (12) to (14) include compounds represented by formulas (12-1) to (12-11), compounds represented by formulas (13-1) to (13-19), and compounds represented by formulas (14-1) to (14-6), respectively.

Formula 36

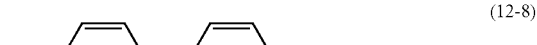
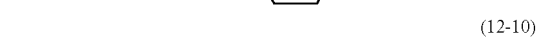
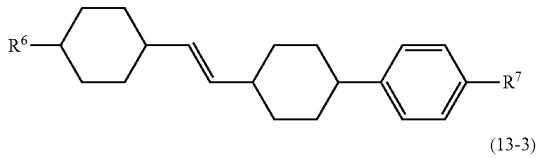
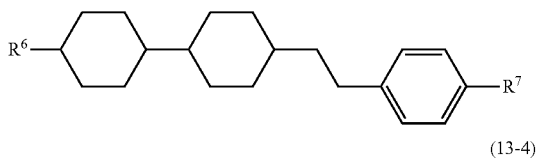
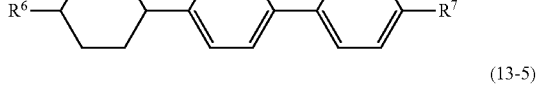
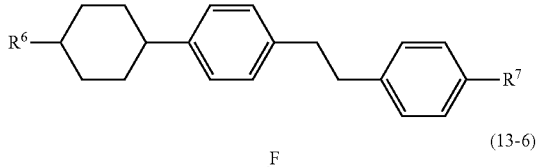
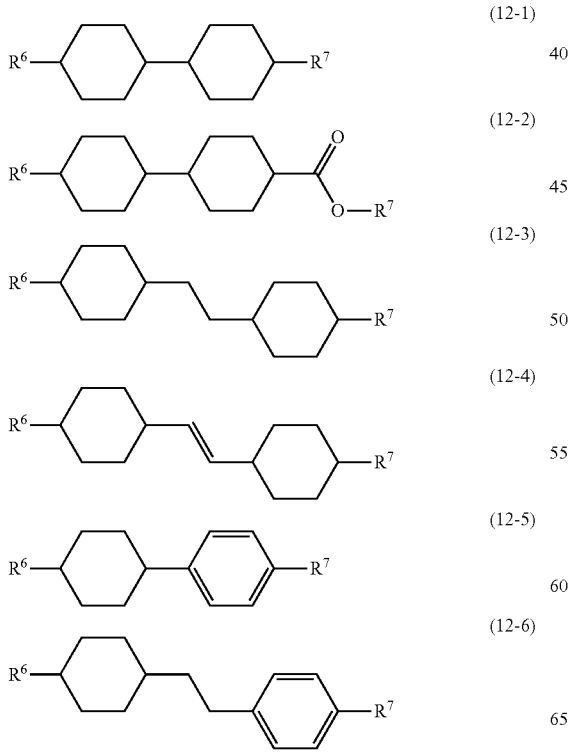
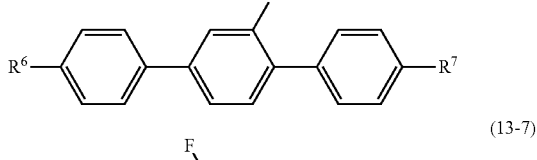

-continued (13-8)
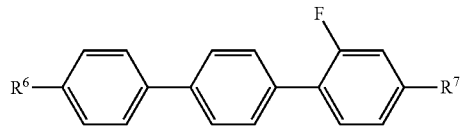

(13-9)

(13-10)

(13-11)
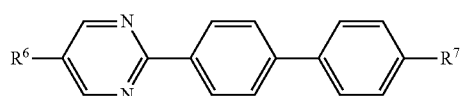

(13-12)
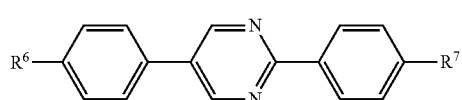

(13-13)
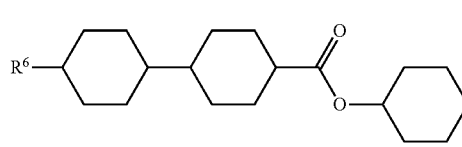

(13-14)
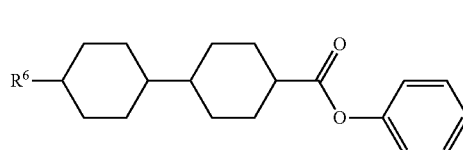

(13-15)
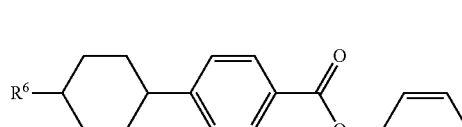

(13-16)
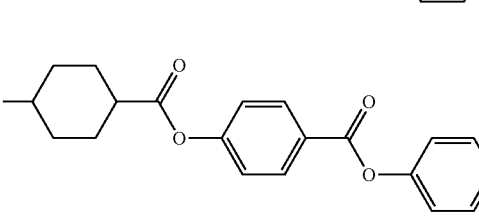

(13-17)
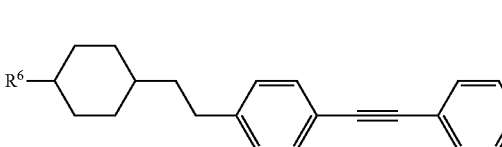

(13-18)
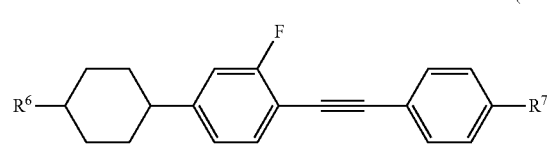

-continued (13-19)
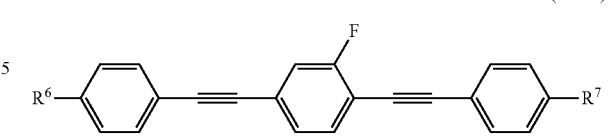

Formula 37

(14-1)

(14-2)

(14-3)

(14-4)

(14-5)

(14-6)

In the formulas, $R^6$ and $R^7$ are defined in a manner identical with the definitions of $R^6$ and $R^7$ in formulas (12) to (14).

Optically Active Compound

The liquid crystal composition of the invention may contain one kind of optically active compound, or two or more kinds of optically active compounds. Specific examples of the optically active compounds include a publicly known chiral dopant. The chiral dopant is effective in inducing a helical structure of liquid crystals to give a required twist angle, and preventing an inverted twist. Specific examples of the chiral dopants include optically active compounds represented by formulas (Op-1) to (Op-13).

Formula 38
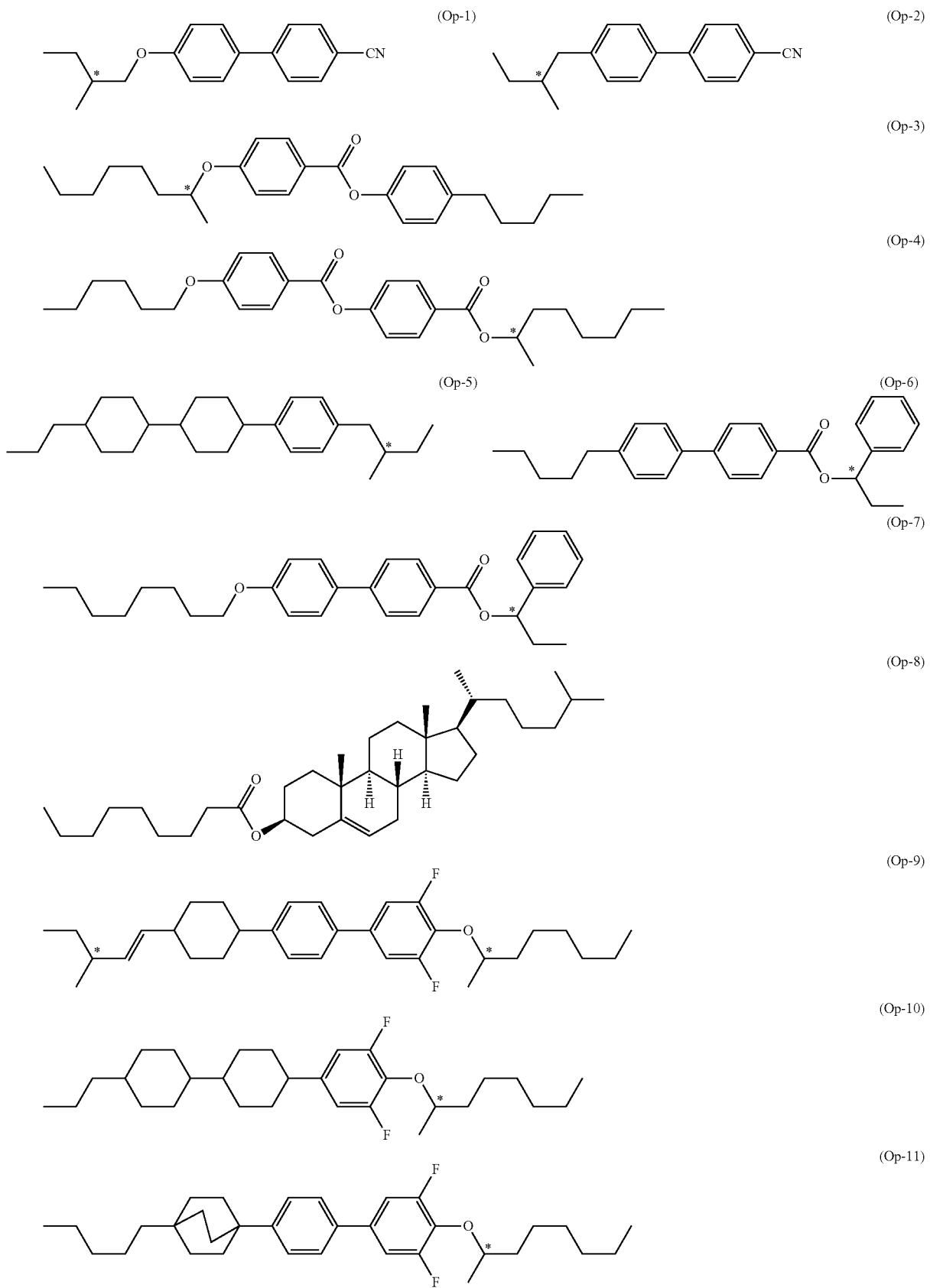

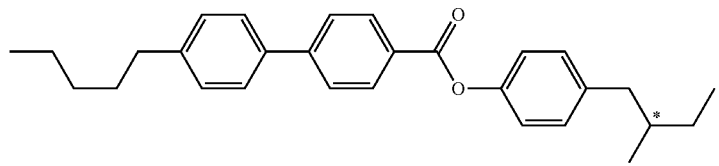

(Op-12)

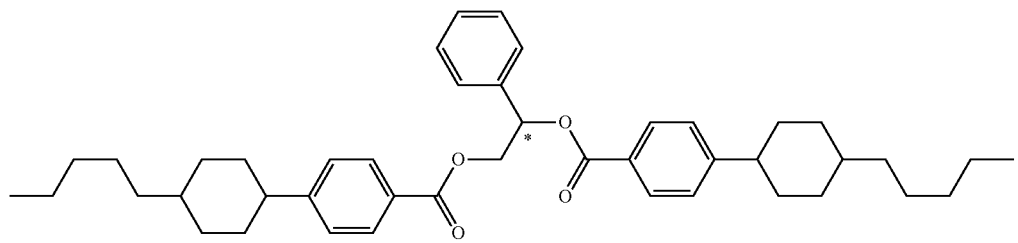

(Op-13)

When the optically active compound is added to the liquid crystal composition of the invention, a helical pitch can be adjusted. The helical pitch is preferably adjusted to the range of approximately 40 to approximately 200 micrometers for a liquid crystal composition for application to the TFT mode and the TN mode; in the range of approximately 6 to approximately 20 micrometers for a liquid crystal composition for application to the STN mode; and in the range of approximately 1.5 to approximately 4 micrometers for a liquid crystal composition for application to the BTN mode. Two or more kinds of optically active compounds may be added for the purpose of adjusting temperature dependence of the pitch.

Polymerizable Compound

The liquid crystal composition of the invention can be used as a liquid crystal composition for application to the PSA mode by adding one kind of polymerizable compound or two or more kinds of polymerizable compounds. Content of the polymerizable compound is preferably in the range of approximately 0.1 to approximately 2% by mass based on the total mass of the liquid crystal composition.

Specific examples of the polymerizable compounds include a compound having a polymerizable group such as acryloyl, methacryloyl, vinyl, vinyloxy, propenyl ether, vinyl ketone, oxiranyl and oxetanyl. The polymerizable compound is preferably polymerized by irradiation with ultraviolet light in the presence of a suitable polymerization initiator such as a photopolymerization initiator.

Suitable conditions for polymerization, suitable types and suitable amounts of the polymerization initiator are known to those skilled in the art and described in each literature. For example, Irgacure 651 (registered tradename; BASF), Irgacure 184 (registered tradename; BASF) or Darocure 1173 (registered tradename; BASF), each being the photopolymerization initiator, are suitable for radical polymerization.

Antioxidant and Ultraviolet Light Absorber

The liquid crystal composition of the invention may further contain at least one kind selected from the group of an antioxidant and an ultraviolet light absorber. The antioxidant is effective in maintaining a large voltage holding ratio. Preferred examples of the antioxidant include 2,6-di-tert-butyl-4-alkyl phenol. The ultraviolet light absorber is effective in order to prevent a decrease in the maximum temperature. Preferred examples of the ultraviolet light absorbent include a benzophenone derivative, a benzoate derivative and a triazole derivative. A light stabilizer such as an amine having steric hindrance is also preferred.

Any Other Component

The liquid crystal composition of the invention can also be used as a liquid crystal composition for application to a guest host (GH) mode by adding a dichroic dye of a merocyanine type, a styryl type, an azo type, an azomethine type, an azoxy type, a quinophthalone type, an anthraquinone type, a tetrazine type or the like.

Method for Preparing a Liquid Crystal Composition and Characteristics Thereof

When preparing the liquid crystal composition of the invention, each component can be selected, for example, in consideration of the value of optical anisotropy of component A. The liquid crystal composition of the invention has a large value of dielectric anisotropy, and a low threshold voltage. The composition has a suitable value of optical anisotropy, and a suitable elastic constant. A term "suitable" herein means that, for example, a suitable range of each characteristic is appropriately determined depending on the operating mode of the liquid crystal display device including the liquid crystal composition of the invention. The composition has a low viscosity. The composition has a wide temperature range of the nematic phase, namely, a high maximum temperature of the nematic phase, and a low minimum temperature of the nematic phase. The liquid crystal composition of the invention has a suitable balance regarding at least two of the characteristics described above.

The liquid crystal composition of the invention is generally prepared by a publicly known method, for example, a method for dissolving necessary components under a high temperature. Moreover, liquid crystal compositions for application to various modes can be prepared by adding an additive (examples: an optically active compound, a polymerizable compound, a polymerization initiator, an antioxidant, an ultraviolet light absorber, a dye) well known to those skilled in the art according to an application. The additive is well known to those skilled in the art, and in addition to the compounds described above, is described in various literatures in detail.

3. Liquid Crystal Display Device

The liquid crystal display device of the invention includes the liquid crystal composition described above. The liquid crystal display device of the invention has a short response time, a long service life, a large contrast ratio and a high voltage holding ratio, and can be used in a wide temperature range, and therefore can be used for a liquid crystal projector, a liquid crystal television or the like.

The liquid crystal composition of the invention can be used for a liquid crystal display device that has the operating mode such as the PC mode, the TN mode, the STN mode, the OCB mode and the PSA mode, and is driven according to an active matrix (AM) mode. The liquid crystal composition of the invention can also be used for a liquid crystal display device that has the operating mode such as the PC mode, the TN mode, the STN mode, the OCB mode, the VA mode and the IPS mode, and is driven according to a passive matrix (PM) mode. The liquid crystal display device according to the AM mode and the PM mode can be applied to any liquid crystal display of a reflective type, a transmissive type, a transflective type or the like.

The liquid crystal composition of the invention can also be used for a nematic curvilinear aligned phase (NCAP) device prepared by microencapsulating nematic liquid crystals, a polymer dispersed liquid crystal display device (PDLCD) prepared by forming a three-dimensional network polymer in liquid crystals, and a polymer network liquid crystal display device (PNLCD).

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

Hereafter, the invention will be explained in more detail by way of Examples, but the invention is in no way limited by the Examples. Unless otherwise noted, "%" is expressed in terms of "% by mass."

Compounds obtained in Examples and so forth were identified by a method such as an NMR analysis.

NMR Analysis

As a measuring apparatus, DRX-500 (made by Bruker BioSpin Corporation) was used. A sample was dissolved into a deuterated solvent such as $CDCl_3$, and measurement of $^1H$ NMR was carried out under the conditions of room temperature, 500 MHz and 24 times of accumulation. Tetramethylsilane was used as a reference material. Measurement of $^{19}F$ NMR was carried out using $CFCl_3$ as a reference material and under conditions of 16 times of accumulation. In the explanation of nuclear magnetic resonance spectra, s, d, t, q, quin, sex, m, br and dd stand for a singlet, a doublet, a triplet, a quartet, a quintet, a sextet, a multiplet, broad, and a double doublet, respectively.

Values of physical properties of a compound obtained in Examples and so forth were determined by methods as described below.

Measurement Sample

A liquid crystal compound per se was used as a sample, and (1) phase structure and (2) phase transition temperature were measured. A composition prepared by mixing a liquid crystal compound and a base liquid crystal was used as a sample, and values of physical properties of the composition, such as (3) compatibility at a low temperature, (4) and (5) maximum temperature and a minimum temperature of the nematic phase, (6) and (7) viscosity, (8) dielectric anisotropy, (9) optical anisotropy, (10) elastic constant, (11) threshold voltage and (12) voltage holding ratio, were determined.

In a case where the composition prepared by mixing the liquid crystal compound and the base liquid crystal as the sample, measurement was carried out by a method described below. The sample was prepared by mixing 15% of liquid crystal compound and 85% of base liquid crystal. From measures values of the sample, extrapolated values were calculated according to an extrapolation method represented by an equation described below, and the extrapolated values were described as values of physical properties of the liquid crystal compound.

(Extrapolated value)={100×(measured value of a sample)−(o of base liquid crystal)×(measured value of the base liquid crystal)}/(% of liquid crystal compound).

However, when a smectic phase was maintained at 25° C. or a crystal precipitated at 25° C. even when a mixing ratio of the liquid crystal compound to the base liquid crystal was as described above, a mixing ratio of the liquid crystal compound to the base liquid crystal (liquid crystal compound: base liquid crystal) was changed in the order of (10%:90%), (5%:95%) and (1%:99%), and values of physical properties of a sample were determined at a mixing ratio at which no smectic phase was maintained at 25° C. or no crystal precipitated at 25° C. In addition, unless otherwise noted, the mixing ratio of the liquid crystal compound to the base liquid crystal (liquid crystal compound:base liquid crystal) is 15%:85%.

As the base liquid crystal, base liquid crystal (i) containing components as described below was used.

A ratio of each component in base liquid crystal (i) is expressed in terms of % by mass.

Formula 39

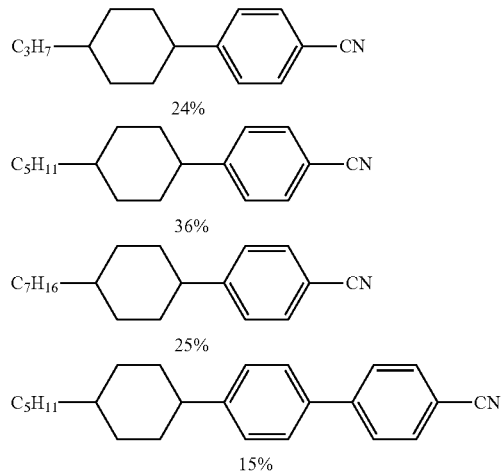

Measuring Method

Measurement of physical properties was carried out or can be carried out by a method as described later. Most of the measuring methods are applied as described in EIAJ ED-2521A of the Standard of Electronic Industries Association of Japan, or as modified thereon. No TFT was attached to a TN device used for measurement.

(1) Phase Structure

A sample (liquid crystal compound) was placed on a hot plate of a melting point apparatus (FP-52 Hot Stage made by Mettler-Toledo International Inc.) equipped with a polarizing microscope, and a state of phase and a change thereof were observed with the polarizing microscope while heating the sample at a rate of 3° C. per minute, and a kind of the phase was specified.

(2) Phase Transition Temperature (° C.)

A sample (liquid crystal compound) was heated and then cooled at a rate of 3° C. per minute using a differential scanning calorimeter, DSC-7 System or Diamond DSC System, made by PerkinElmer, Inc. A starting point of an endothermic peak or an exothermic peak caused by a phase change of the sample was determined by an extrapolation method, and thus a phase transition temperature was determined.

The crystal was expressed as C, and when kinds of the crystals were distinguishable, each of the crystals was expressed as $C_1$ or $C_2$. The smectic phase was expressed as S and a nematic phase as N. When smectic A phase, smectic B phase, smectic C phase or smectic F phase was distinguishable among the smectic phases, the phases were expressed as $S_A$, $S_B$, $S_C$ or $S_F$, respectively. An isotropic (isotropic liquid) was expressed as I. The phase transition temperature was expressed, for example, as "C 50.0 N 100.0 I." The expression shows that a phase transition temperature (CN) from the crystal to the nematic phase is 50.0° C., and a phase transition temperature (clearing point) from the nematic phase to the isotropic phase (isotropic liquid) is 100.0° C. A same rule was applied to other expressions. All of units of the phase transition temperature are ° C.

(3) Compatibility at a Low Temperature

Samples were prepared by mixing base liquid crystal (i) and a liquid crystal compound for a mixing ratio of the liquid crystal compound to be 20%, 15%, 10%, 5%, 3% and 1%, and put in glass vials.

The glass vials were kept in freezers at –10° C. or –20° C. for a fixed period of time, and then whether the crystal or the smectic phase precipitated was observed.

(4) Maximum Temperature of a Nematic Phase ($T_{NI}$ or NI; ° C.)

A sample was placed on a hot plate of a melting point apparatus (FP-52 Hot Stage made by Mettler-Toledo International Inc.) equipped with a polarizing microscope, and heated at a rate of 1° C. per minute. Temperature when part of the sample changed from the nematic phase to the isotropic phase (isotropic liquid) was measured. When the sample was a mixture of a liquid crystal compound and base liquid crystal (i), the temperature was expressed using a symbol $T_{NI}$. When the sample was a mixture of a liquid crystal compound and component B or the like, the temperature was expressed using a symbol NI. $T_{NI}$ is an extrapolated value calculated by the extrapolation method described above, and NI is a measured value of the mixture per se.

(5) Minimum Temperature of a Nematic Phase ($T_c$; ° C.)

Samples each having a nematic phase were kept in freezers at 0° C., –10° C., –20° C., –30° C. and –40° C. for 10 days, and then liquid crystal phases were observed. For example, when a sample maintained the nematic phase at –20° C. and changed to a crystal or a smectic phase at –30° C., $T_c$ was expressed as $T_c \leq -20°$ C.

(6) Viscosity (Bulk Viscosity; η; Measured at 20° C.; mPa·s)

Bulk viscosity (η) was measured using a cone-plate (E type) rotational viscometer.

(7) Viscosity (Rotational Viscosity; γ1; Measured at 25° C.; mPa·s)

Measurement of rotational viscosity (γ1) was carried out according to the method described in M. Imai et al., Molecular Crystals and Liquid Crystals, Vol. 259, p. 37 (1995). A sample was put in a TN device in which a twist angle was 0 degrees and a distance (cell gap) between two glass substrates was 5 micrometers. Voltage was stepwise applied to the TN device in the range of 16 V to 19.5 V at an increment of 0.5 V. After a period of 0.2 second with no application, voltage was applied repeatedly under the conditions of only one of rectangular waves (rectangular pulse; 0.2 second) and no application (2 seconds). A peak current and a peak time of a transient current generated by the application were measured. A value of rotational viscosity (γ1) was obtained from the measured values and a calculation equation (8) described on page 40 of the paper presented by M. Imai et al. A value of dielectric anisotropy required for the calculation was determined by using the TN device used for measuring the rotational viscosity and according to a method described below.

(8) Dielectric Anisotropy (Δ∈; Measured at 25° C.)

A sample was put in a TN device in which a twist angle was 80 degrees and a distance (cell gap) between two glass substrates was 9 micrometers. Sine waves (10 V, 1 kHz) were applied to the TN device, and after 2 seconds, a dielectric constant (∈∥) in the major axis direction of liquid crystal molecules was measured. Sine waves (0.5 V, 1 kHz) were applied to the TN device, and after 2 seconds, a dielectric constant (∈⊥) in the minor axis direction of the liquid crystal molecules was measured. A value of dielectric anisotropy was calculated from an equation: Δ∈=∈∥−∈⊥.

(9) Optical Anisotropy (Δn; Measured at 25° C.)

Measurement of optical anisotropy (Δn) was carried out by means of Abbe refractometer with a polarizing plate mounted on an ocular, using light at a wavelength of 589 nanometers. A surface of a main prism was rubbed in one direction, and then a sample was added dropwise onto the main prism. A refractive index (n∥) was measured when the direction of polarized light was parallel to the direction of rubbing. A refractive index (n⊥) was measured when the direction of polarized light was perpendicular to the direction of rubbing. A value of optical anisotropy was calculated from an equation: Δn=n∥−n⊥.

(10) Elastic Constant (K; Measured at 25° C.; pN)

HP4284A LCR Meter made by Yokogawa-Hewlett-Packard Co. was used for measurement of elastic constant (K). A sample was put in a vertical alignment cell in which a distance (cell gap) between two glass substrates was 20 micrometers. Voltage was applied to the cell in the range of 0 V to 20 V, and electrostatic capacity and applied voltage were measured. Measured values of the electrostatic capacity (C) and the applied voltage (V) were fitted to equation (2.98) and equation (2.101) on page 75 of "Liquid Crystal Device Handbook" (Ekisho Debaisu Handobukku in Japanese) (The Nikkan Kogyo Shimbun, Ltd.), and values of $K_{11}$ and $K_{33}$ were obtained from equation (2.99). Next, $K_{22}$ was calculated using the previously determined values of $K_{11}$ and $K_{33}$ in equation (3.18) on page 171 of the same Handbook. An elastic constant is a mean value of the thus determined $K_{11}$, $K_{22}$ and $K_{33}$.

(11) Threshold Voltage ($V_{th}$; Measured at 25° C.; V)

An LCD-5100 luminance meter made by Otsuka Electronics Co., Ltd. was used for measurement of threshold voltage ($V_{th}$). A light source was a halogen lamp. A sample was put in a normally white mode TN device in which a twist angle was 80 degrees and a distance (cell gap) between two glass substrates was about 0.45/Δn (μm). Voltage (32 Hz, rectangular waves) to be applied to the TN device was stepwise increased from 0 V to 10 V at an increment of 0.02 V. On the occasion, the device was irradiated with light from a direction perpendicular to the device, and the amount of light transmitted through the device was measured. A voltage-transmittance curve was prepared, in which the maximum amount of light corresponds to 100% transmittance and the minimum amount of light corresponds to 0% transmittance. A threshold voltage is a voltage at 90% transmittance.

(12) Voltage Holding Ratio (VHR-2; Measured at 80° C.; %)

A sample was put in a TN device having a polyimide alignment film in which a distance (cell gap) between two glass substrates was 5 micrometers. Then, the device was sealed with an ultraviolet-curable adhesive. A pulse voltage (60 microseconds at 5 V) was applied to the TN device and the TN device was charged. A decaying voltage was measured for 16.7 milliseconds with a high-speed voltmeter, and area A between a voltage curve and a horizontal axis in a unit cycle was determined. Area B is an area without decay. A voltage holding ratio is a percentage of area A to area B.

Raw Materials

Solmix A-11 is a mixture of ethanol (85.5%), methanol (13.4%) and isopropanol (1.1%), and obtained from Japan Alcohol Trading Co., Ltd. Tetrahydrofuran may be occasionally abbreviated as THF.

Examples of Liquid Crystal Compounds

Example 1A

Synthesis of Compound (No. 1)

Formula 40

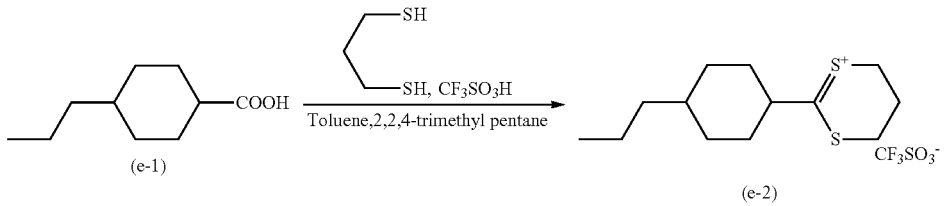

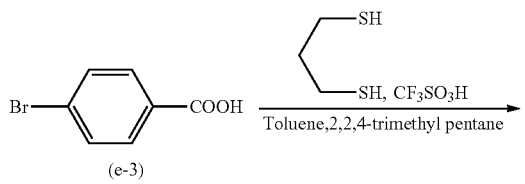

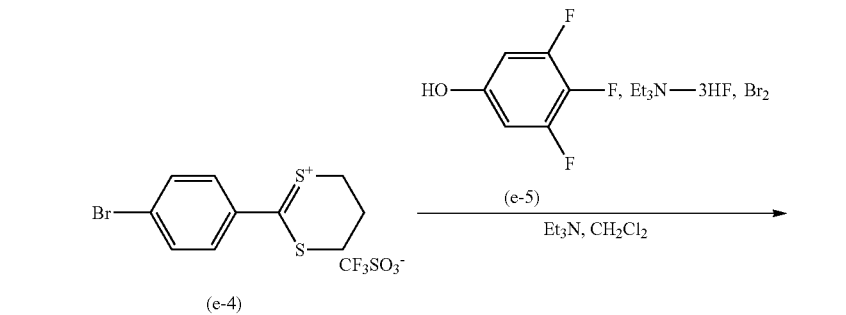

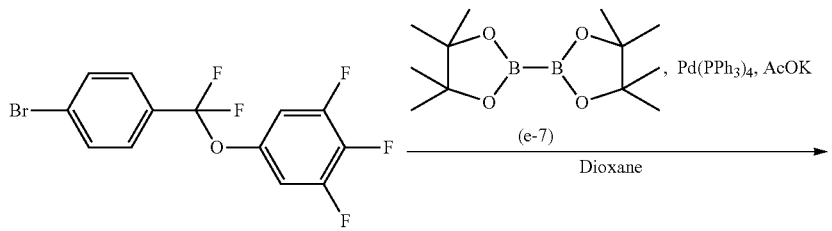

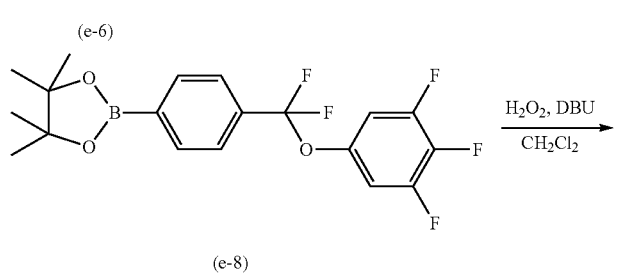

-continued

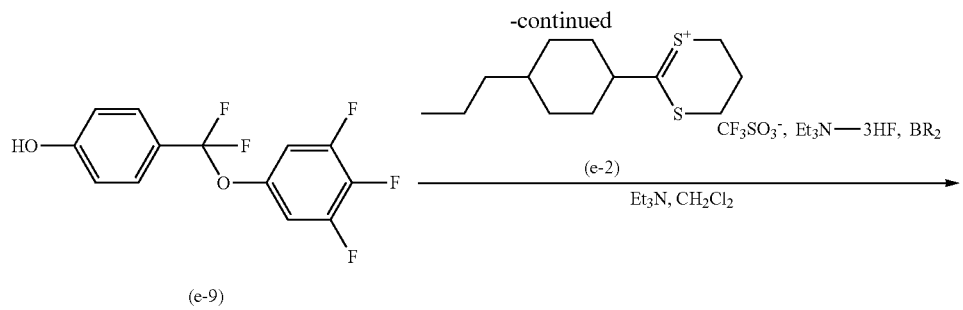

(e-9)

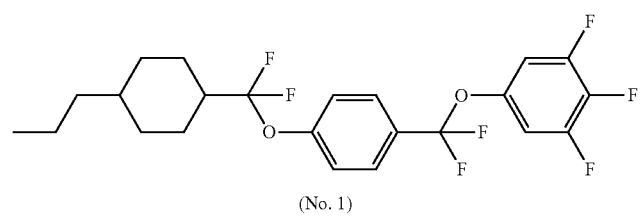

(No. 1)

First Step

Under a nitrogen atmosphere, compound (e-1) (10.00 g), 2,2,4-trimethylpentane (30.0 mL) and toluene (30.0 mL) were put into a reaction vessel, and the resultant mixture was heated to 60° C. Propanedithiol (6.5 mL) was added dropwise, and the resultant mixture was agitated for 60 minutes. Subsequently, trifluoromethanesulfonic acid (19.39 g) was slowly added. The resultant mixture was agitated at 60° C. for 60 minutes, and further agitated at 110° C. for 120 minutes. The resultant reaction mixture was cooled to 25° C., and then concentrated under reduced pressure. A residue was purified by recrystallization from t-butyl methyl ether, and thus dithialinium salt (e-2) (7.79 g; 33.8 mol %) was obtained.

Second Step

Under a nitrogen atmosphere, compound (e-3) (75.00 g), 2,2,4-trimethylpentane (150.0 mL) and toluene (150.0 mL) were put into a reaction vessel, and the resultant mixture was heated to 60° C. Propanedithiol (41.2 mL) was added dropwise, and the resultant mixture was agitated for 90 minutes. Subsequently, trifluoromethanesulfonic acid (123.20 g) was slowly added. The resultant mixture was agitated at 60° C. for 60 minutes, and further agitated at 110° C. for 120 minutes. The resultant reaction mixture was cooled to 25° C., and then concentrated under reduced pressure. A residue was purified by recrystallization from t-butyl methyl ether, and thus dithialinium salt (e-4) (78.38 g; 49.6 mol %) was obtained.

Third Step

Under a nitrogen atmosphere, 3,4,5-trifluorophenol (e-5) (4.20 g), triethylamine (4.3 mL) and dichloromethane (70 mL) were put into a reaction vessel, and the resultant mixture was cooled to −70° C. Thereto, a dichloromethane (70 mL) solution of dithialinium salt (e-4) (10.00 g) was slowly added dropwise. The resultant mixture was agitated for 60 minutes, and then a hydrogen fluoride-triethylamine complex (11.6 mL) was added dropwise, and the resultant mixture was agitated for 30 minutes. Subsequently, bromine (6.1 mL) was slowly added, and the resultant mixture was agitated for 60 minutes. The resultant reaction mixture was returned to 25° C., and then poured into ice water. Sodium hydrogencarbonate was slowly added to the mixture, and the resultant mixture was neutralized. An organic layer was sequentially washed with water, a saturated aqueous solution of sodium hydrogencarbonate, and water, and then dried over anhydrous magnesium sulfate. The resultant solution was concentrated under reduced pressure, a residue was purified by means of silica gel chromatography (heptane), and thus compound (e-6) (4.11 g; 49.3 mol %) was obtained.

Fourth Step

Under a nitrogen atmosphere, compound (e-6) (4.11 g), bispinacolato diborane (e-7) (3.25 g), tetrakis(triphenylphosphine)palladium (0.20 g), potassium acetate (3.43 g) and 1,4-dioxane (20 mL) were put into a reaction vessel, and subjected to heating reflux for 3 hours. The resultant reaction mixture was cooled to 25° C., and poured into water, and an aqueous layer was extracted with toluene. Combined organic layers were washed with water, and then dried over anhydrous magnesium sulfate. The resultant solution was concentrated under reduced pressure, a residue was purified by means of silica gel chromatography (heptane:ethyl acetate=20:1 in a volume ratio), and thus compound (e-8) (4.51 g; 94.5 mol %) was obtained.

Fifth Step

Under a nitrogen atmosphere, compound (e-8) (4.51 g), 1,8-diazabicyclo[5.4.0]undec-7-ene (DBU) (0.17 g) and dichloromethane (20 mL) were put into a reaction vessel. Thereto, an aqueous solution of hydrogen peroxide (30%; aqueous solution; 2.56 g) was slowly added dropwise. The resultant mixture was agitated at room temperature for 2 hours, the resultant reaction mixture was poured into water and an aqueous layer was extracted with dichloromethane (10 mL) twice. A combined organic layer was sequentially washed with water and a saturated aqueous solution of sodium thiosulfate, and dried over anhydrous magnesium sulfate. Anhydrous magnesium sulfate was removed by filtration, a dichloromethane solution of compound (e-9) was obtained, and used for the next reaction as was.

Sixth Step

Under a nitrogen atmosphere, the dichloromethane solution of compound (e-9) and triethylamine (1.7 mL) were put into a reaction vessel, and the resultant mixture was cooled to −70° C. Thereto, a dichloromethane (40 mL) solution of dithialinium salt (e-2) (3.69 g) was slowly added dropwise. The resultant mixture was agitated for 60 minutes, and then a hydrogen fluoride-triethylamine complex (4.6 mL) was added dropwise, and the resultant mixture was agitated for 30 minutes. Subsequently, bromine (2.4 mL) was slowly added, and the resultant mixture was agitated for 60 minutes. The resultant reaction mixture was returned to 25° C., and then poured into ice water. Sodium hydrogencarbonate was slowly added to the mixture, and neutralization was performed. An organic layer was sequentially washed with water, a saturated aqueous solution of sodium hydrogencarbonate, and water, and dried over anhydrous magnesium sulfate. The resultant solution was concentrated under reduced pressure, and a residue was purified by means of silica gel chromatography (heptane), and further purified by recrystallization from a mixed solvent of heptane and Solmix A-11 (1:1 in a volume ratio), and thus compound (No. 1) (2.85 g) was obtained. A yield based on compound (e-2) was 65.4 mol %.

$^1$H-NMR (δ ppm; CDCl$_3$): 7.66 (d, 2H), 7.27 (d, 2H), 6.95 (dd, 2H), 2.08-2.02 (m, 3H), 1.88-1.86 (m, 2H), 1.44-1.17 (m, 7H), 0.98-0.87 (m, 5H).

Example 2A

Synthesis of Compound (No. 2)

Formula 41

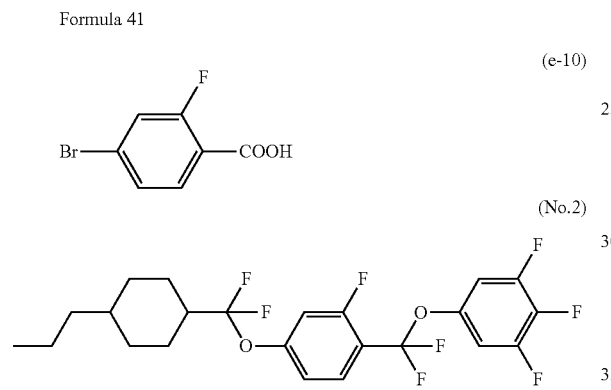

Compound (No. 2) was obtained by using compound (e-10) in place of compound (e-3) in Example 1A.

$^1$H-NMR (δ ppm; CDCl$_3$): 7.62 (dd, 2H), 7.06-7.04 (m, 2H), 6.96 (dd, 2H), 2.07-2.01 (m, 3H), 1.89-1.86 (m, 2H), 1.42-1.17 (m, 7H), 0.97-0.88 (m, 5H).

Example 3A

Synthesis of Compound (No. 4)

Formula 42

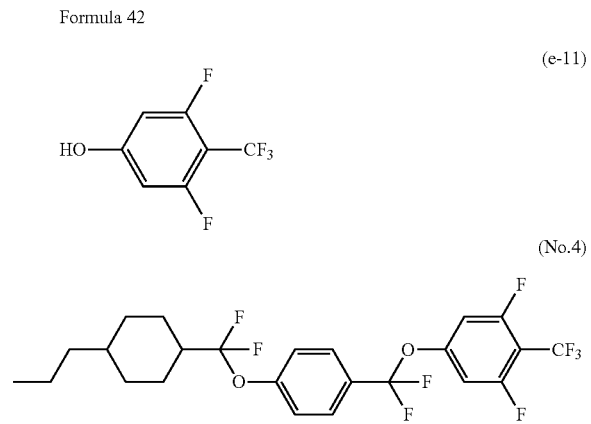

Compound (No. 4) was obtained by using compound (e-11) in place of compound (e-5) in Example 1A.

$^1$H-NMR (δ ppm; CDCl$_3$): 7.66 (d, 2H), 7.29 (d, 2H), 6.80 (d, 2H), 2.08-2.00 (m, 3H), 1.89-1.86 (m, 2H), 1.44-1.17 (m, 7H), 0.98-0.88 (m, 5H).

Comparative Example 1A

Compound (F) was prepared as a comparative compound. The reason is that the compound is described in Example 2 in WO 96/011897 A, and similar to the compound of the invention.

Formula 43

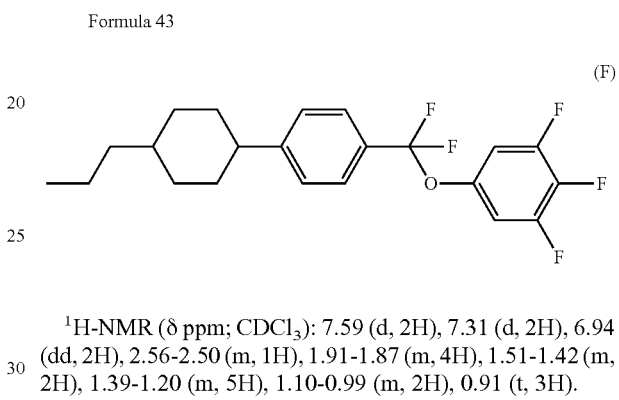

$^1$H-NMR (δ ppm; CDCl$_3$): 7.59 (d, 2H), 7.31 (d, 2H), 6.94 (dd, 2H), 2.56-2.50 (m, 1H), 1.91-1.87 (m, 4H), 1.51-1.42 (m, 2H), 1.39-1.20 (m, 5H), 1.10-0.99 (m, 2H), 0.91 (t, 3H).

Comparative Example 2A

Compound (G) was prepared as a comparative compound. The reason is that the compound is included in compound (609) described in WO 96/011897 A, and similar to the compound of the invention.

Formula 44

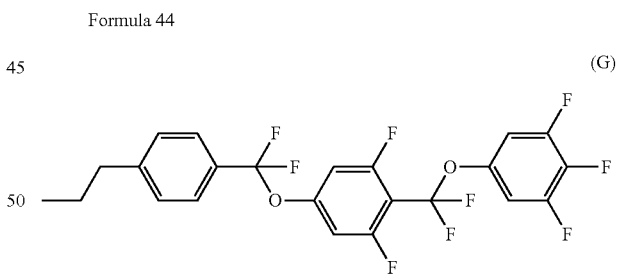

$^1$H-NMR (δ ppm; CDCl$_3$): 7.59 (d, 2H), 7.30 (d, 2H), 6.99-6.93 (m, 4H), 2.66 (t, 2H), 1.71-1.64 (m, 2H), 0.96 (t, 3H).

Comparative Example 3A

Compound (H) was prepared as a comparative compound. The reason is that the compound is included in compound (1) described in WO 96/011897 A, and similar to the compound of the invention.

Formula 45

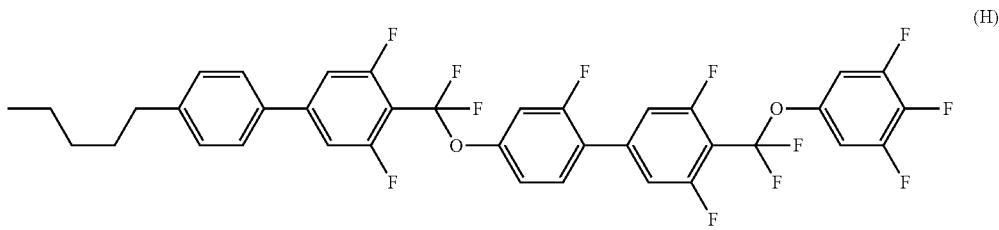

(H)

$^1$H-NMR (δ ppm; CDCl$_3$): 7.50-7.48 (m, 2H), 7.44 (dd, 1H), 7.31-7.29 (m, 2H), 7.23-7.19 (m, 6H), 7.02-6.98 (m, 2H), 2.66 (t, 2H), 1.68-1.62 (m, 2H), 1.40-1.31 (m, 4H), 0.91 (t, 3H).

Values of physical properties of compounds in Examples and Comparative Examples as described above are shown in Table 1.

TABLE 1

| | Example 1A Compound (No. 1) | Comparative Example 1A Comparative Compound (F) | Comparative Example 3A Comparative Compound (H) | Example 2A Compound (No. 2) | Comparative Example 2A Comparative Compound (G) | Example 3A Compound (No. 4) |
|---|---|---|---|---|---|---|
| Phase transition temperature (° C.) | C 43.5 I | C 72.9 I | C 98.4 N 164.6 I | C 20.8 N 25.9 I | C 40.2 I | C 33.2 N 37.2 I |
| T$_{NI}$ (° C.) | 45.0 | 24.4 | 103.7 | 31.7 | −28.3 | 43.0 |
| η (mPa · s) | 25.3 | 18.2 | 71.9 | 35.4 | 22.4 | 39.9 |
| Δε | 18.1 | 17.2 | 47.8 | 21.5 | 29.3 | 26.1 |
| Δn | 0.084 | 0.084 | 0.177 | 0.077 | 0.070 | 0.097 |
| Compatibility (compound/base liquid crystal) | 15%/85% | 15%/85% | 10%/90% | 15%/85% | 15%/85% | 15%/85% |

As described above, the liquid crystal compound per se was used as the sample, and the phase transition temperature of the liquid crystal compound was measured. The liquid crystal composition prepared by mixing the liquid crystal compound (15%) and the base liquid crystal (i) (85%) was used as the sample, and the maximum temperature (T$_{NI}$), the viscosity (η), and the values of dielectric anisotropy (Δε) and optical anisotropy (Δn) were measured on the composition. The extrapolated values were calculated according to the extrapolation method from the measured values of the liquid crystal composition, and the extrapolated values were described as the values of physical properties of the liquid crystal compound.

In addition, each of prepared liquid crystal compounds (15%) dissolved well into the base liquid crystal (i) (85%) at 25° C. However, in Comparative Compound (H), the measurement sample was prepared using 10% of Comparative Compound (H), and 90% of base liquid crystal (i). The reason is that the crystal precipitated at 25° C. at an ordinary ratio (15%:85%).

Table 1 shows that Compound (No. 1) is superior to Comparative Example (F) in view of a higher maximum temperature (T$_{NI}$) and a larger value of dielectric anisotropy (Δε), Compound (No. 2) is superior to Comparative Example (G) in view of a higher maximum temperature (T$_{NI}$) and Compound (No. 1) is superior to Comparative Example (H) in view of a smaller viscosity (η) and a larger compatibility with other liquid crystal compounds.

Compounds (No. 1) to (No. 137) can be prepared in a manner similar to the synthesis methods as described in Examples 1A to 3A. Attached data were determined according to the methods described above.

| No. | |
|---|---|
| | Formula 46 |
| 1 | 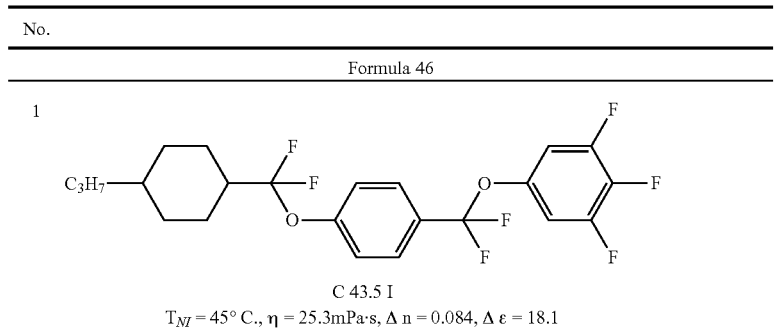 |

C 43.5 I
T$_{NI}$ = 45° C., η = 25.3 mPa·s, Δn = 0.084, Δε = 18.1

| No. |
|---|
| 2 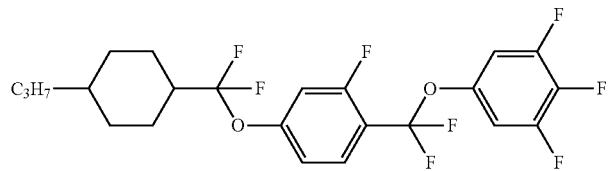   C 20.8 N 25.9 I  $T_{NI} = 31.7°$ C., $\eta = 35.4$ mPa·s, $\Delta n = 0.077$, $\Delta \varepsilon = 21.5$ |
| 3 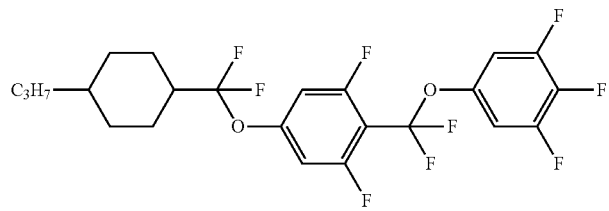 |
| 4 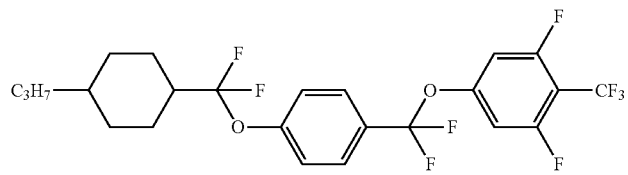   C 33.2 N 37.2 I  $T_{NI} = 43.0°$ C., $\eta = 39.9$ mPa·s, $\Delta n = 0.097$, $\Delta \varepsilon = 26.1$ |
| 5 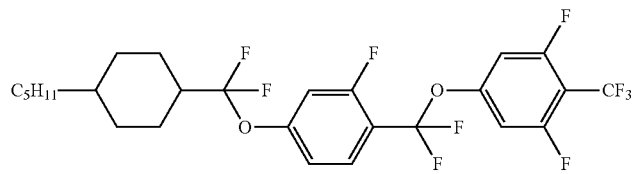 |
| 6 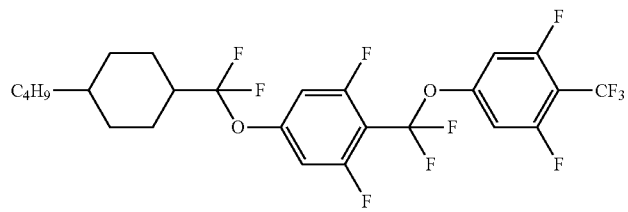 |
| 7 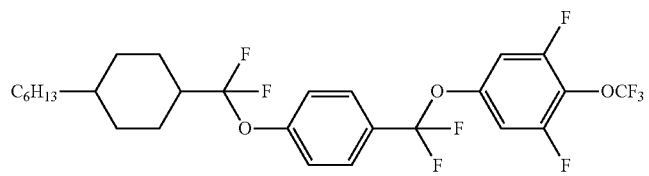 |
| 8 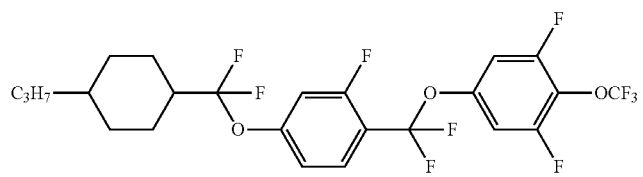 |

-continued
| No. | |
|---|---|
| 9 | 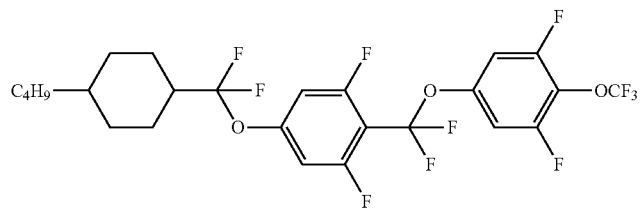 |
| 10 | 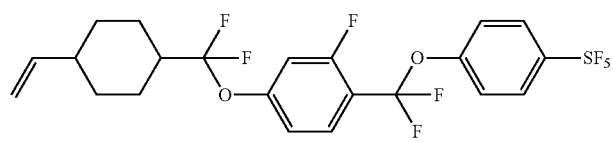 |
| 11 | 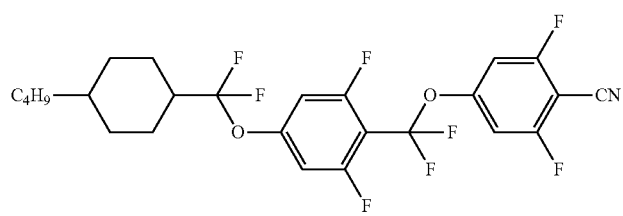 |
| 12 | 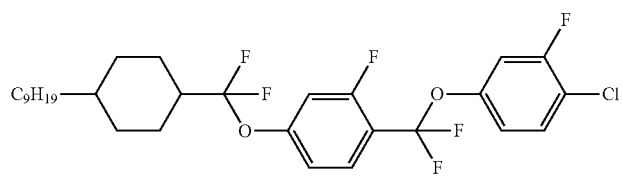 |
| 13 | 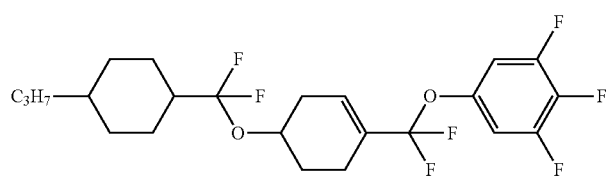 |
| 14 | 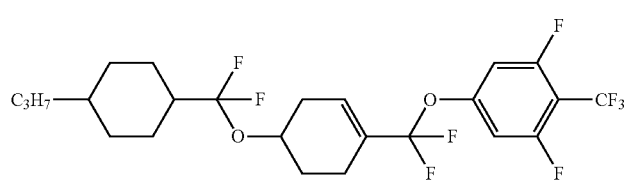 |
| 15 | 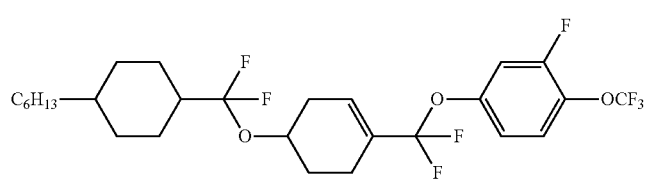 |
| 16 | 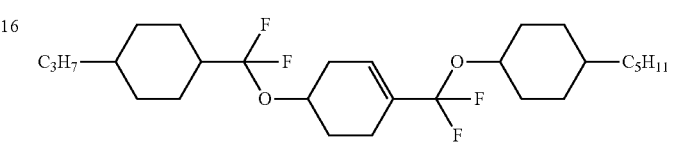 |

-continued
| No. |
|---|
| 17 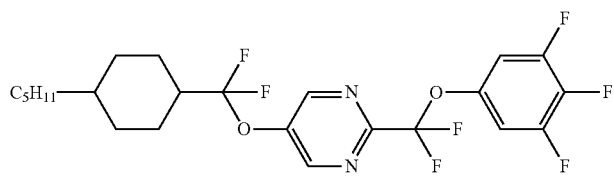 |
| 18 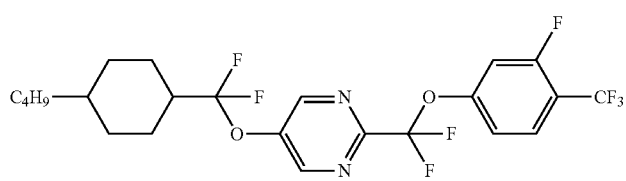 |
| 19 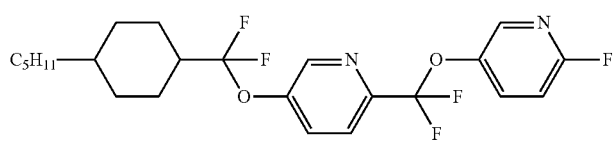 |
| 20 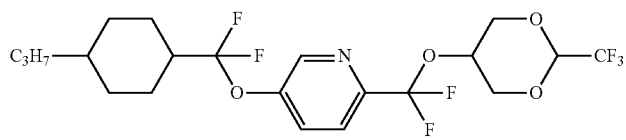 |
| 21 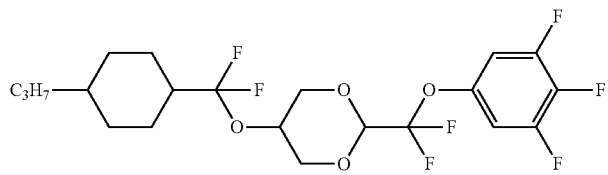 |
| 22 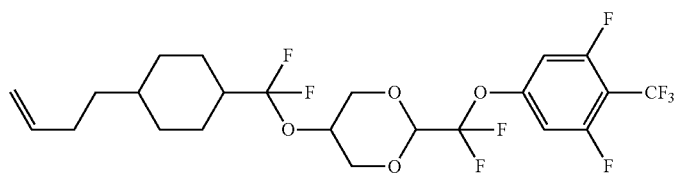 [SMILES: C=CCCC1CCC(C(F)(F)OC2COC(C(F)(F)Oc3cc(F)c(C(F)(F)F)c(F)c3)OC2)CC1] |
| 23 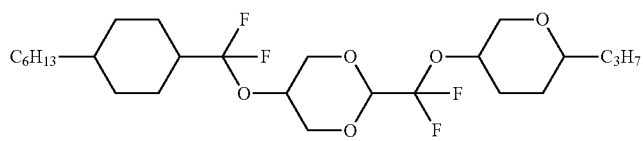 |
| 24 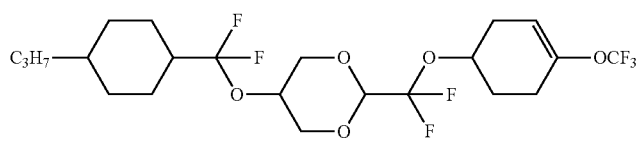 |
Formula 47
| 25 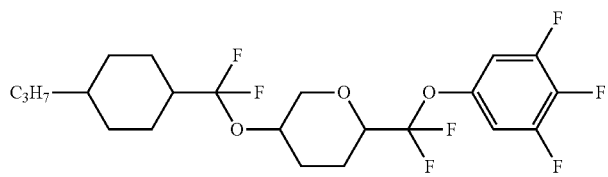 |

-continued
| No. |  |
|---|---|
| 26 | 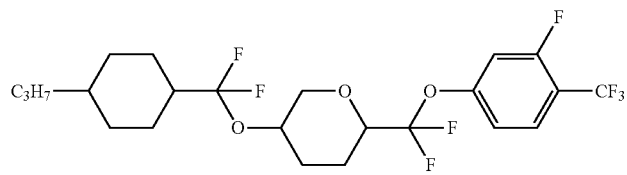 |
| 27 | 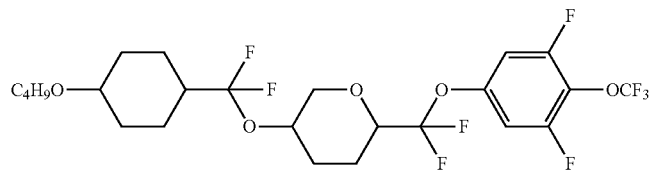 |
| 28 | 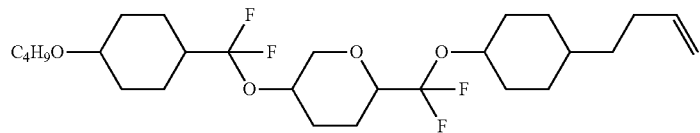 |
| 29 | 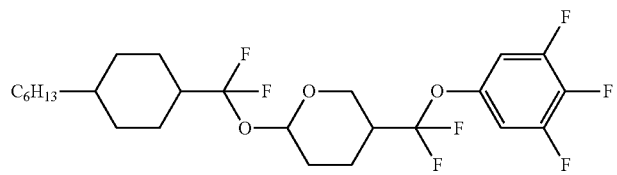 |
| 30 | 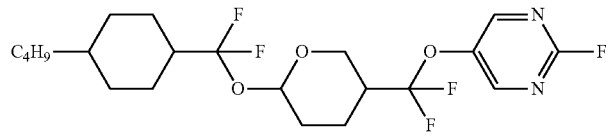 |
| 31 | 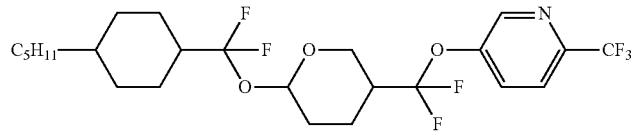 |
| 32 | 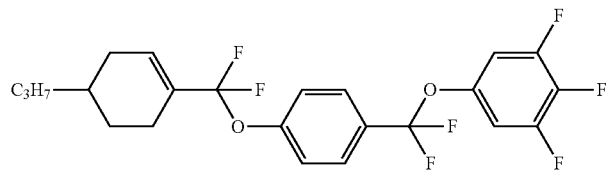 |
| 33 | 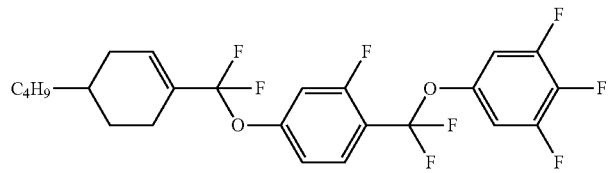 |
| 34 | 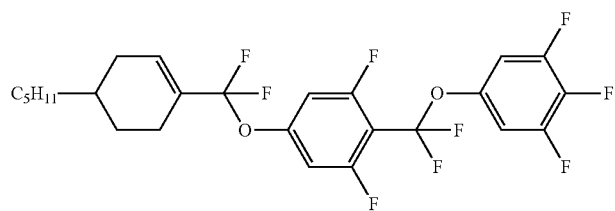 |

-continued
| No. |
|---|
| 35 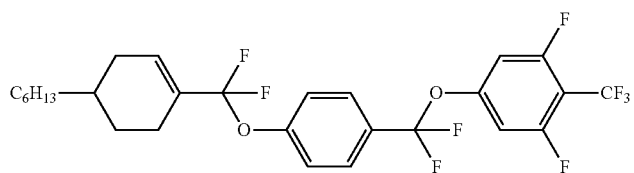 |
| 36 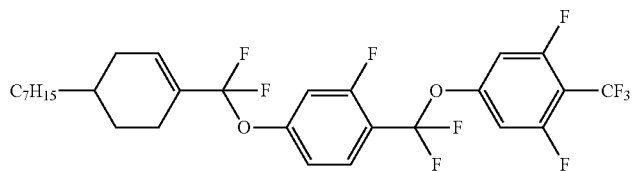 |
| 37 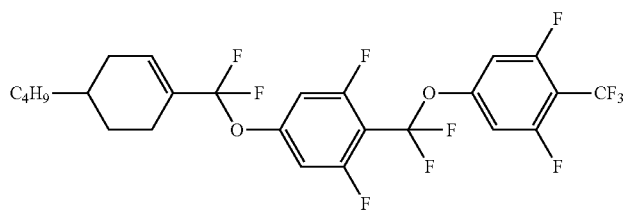 |
| 38 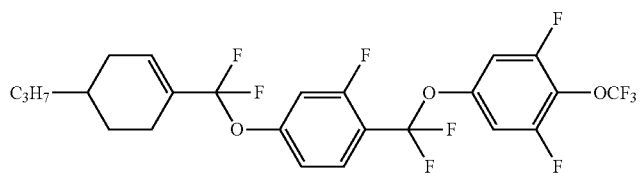 |
| 39 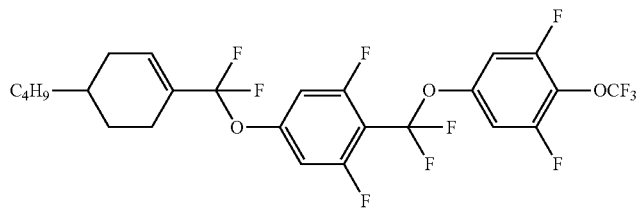 |
| 40 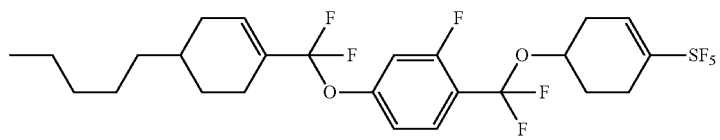 |
| 41 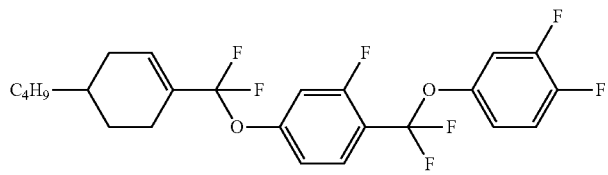 |
| 42 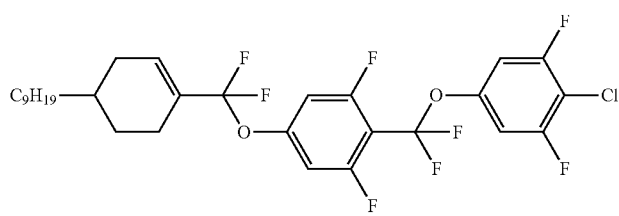 |

| No. |
|---|
| 43 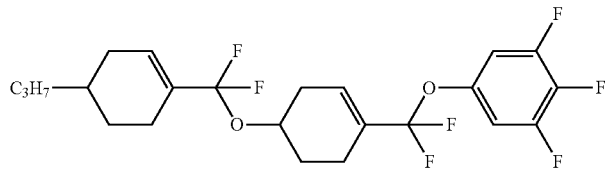 |
| 44 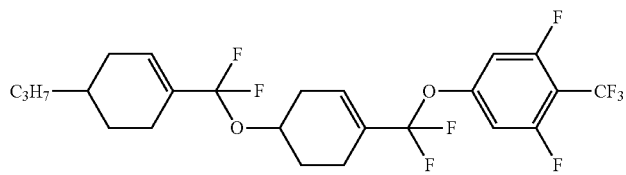 |
| 45 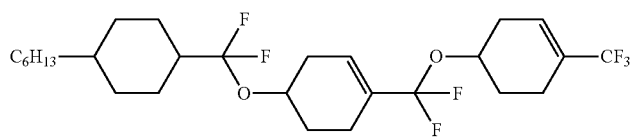 |
| 46 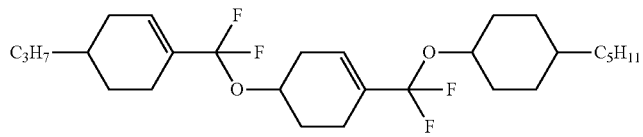 |
| 47 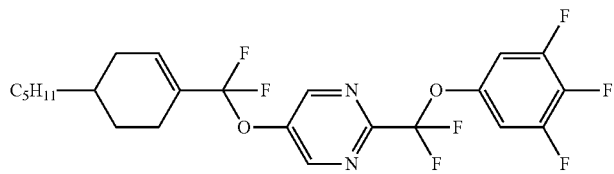 |
| 48 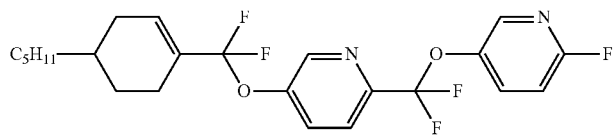 |
Formula 48
| 49 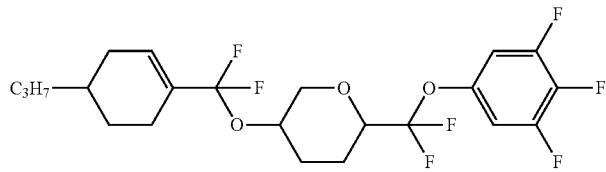 |
|---|
| 50 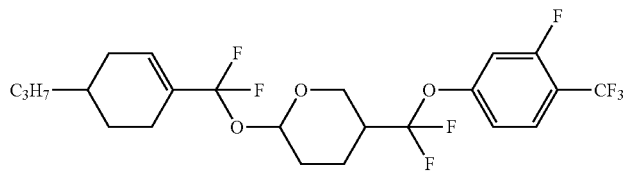 |
| 51 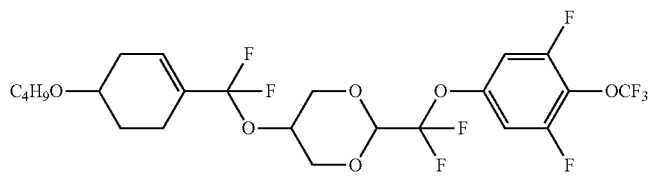 |

-continued
| No. | |
|---|---|
| 52 | 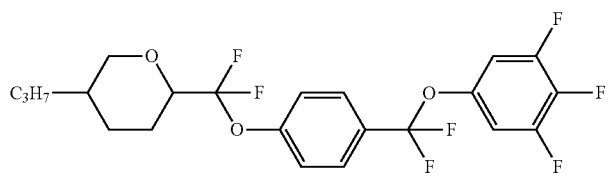 |
| 53 | 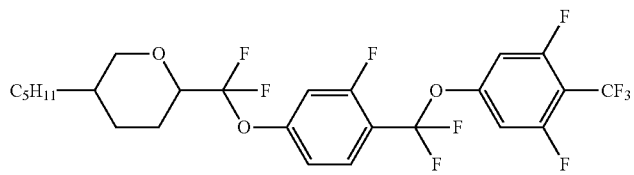 |
| 54 | 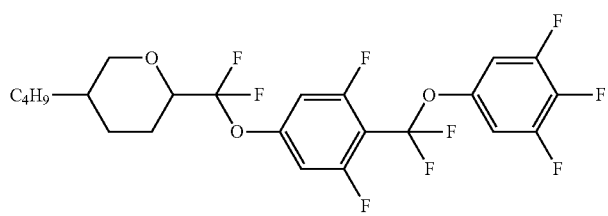 |
| 55 | 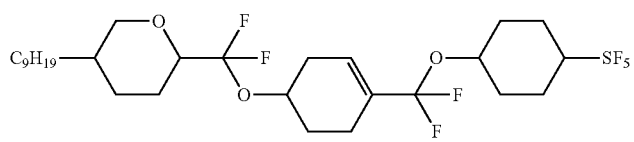 |
| 56 | 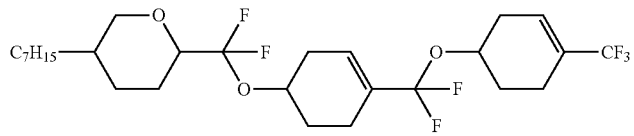 |
| 57 | 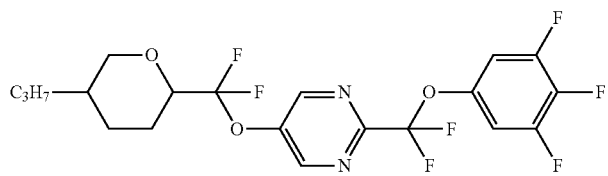 |
| 58 | 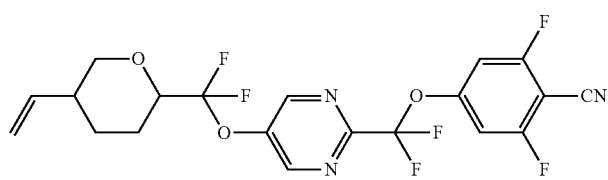 [SMILES: C=CC1CCC(C(F)(F)Oc2cnc(C(F)(F)Oc3cc(F)c(C#N)c(F)c3)nc2)OC1] |
| 59 | 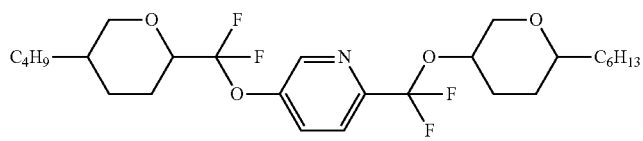 |
| 60 | 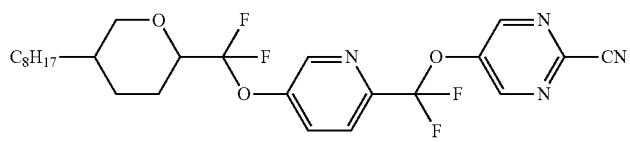 |

-continued
| No. | |
|---|---|
| 61 | 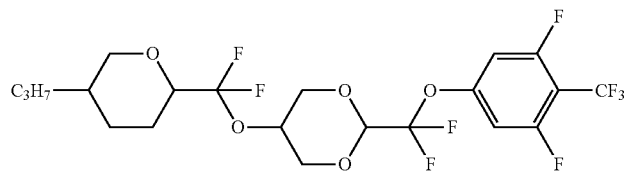 |
| 62 | 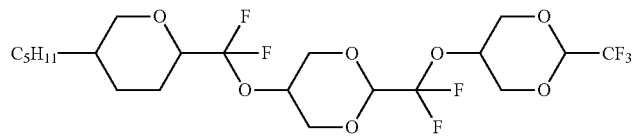 |
| 63 | 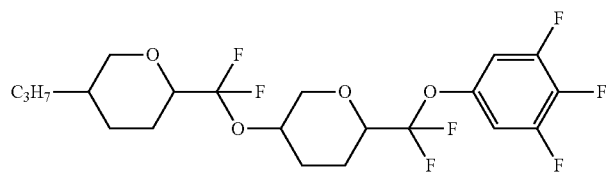 |
| 64 | 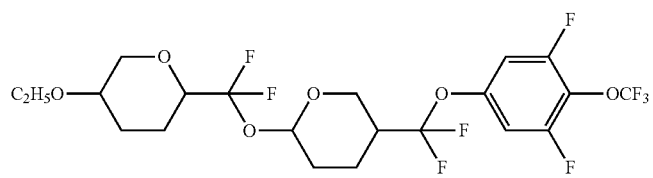 |
| 65 | 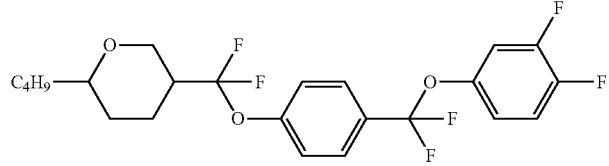 |
| 66 | 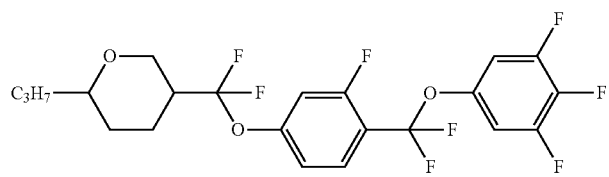 |
| 67 | 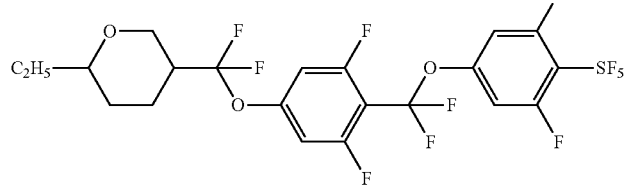 |
| 68 | 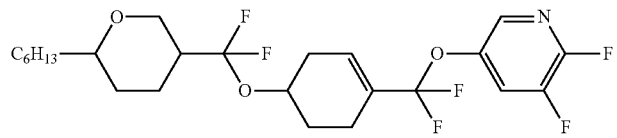 |
| 69 | 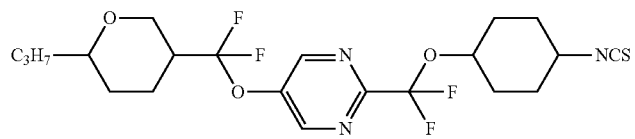 |

| No. | |
|---|---|
| 70 | 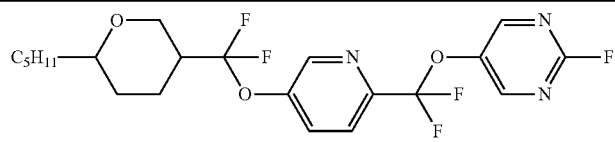 |
| 71 | 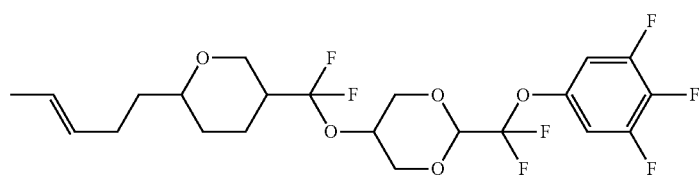 [SMILES: C/C=C/CCC1CCC(C(F)(F)OC2COC(C(F)(F)Oc3cc(F)c(F)c(F)c3)OC2)CO1] |
| 72 | 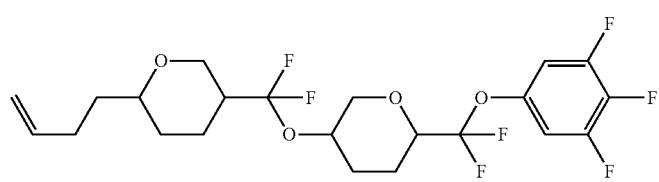 [SMILES: C=CCCC1CCC(C(F)(F)OC2CCC(C(F)(F)Oc3cc(F)c(F)c(F)c3)OC2)CO1] |
| Formula 49 | |
| 73 | 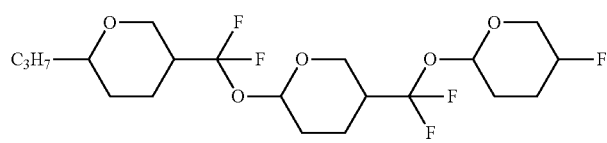 |
| 74 | 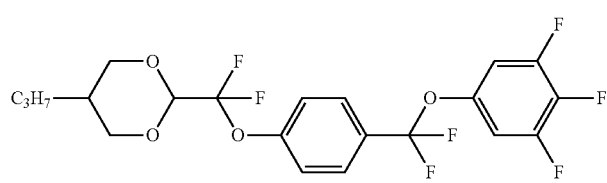 |
| 75 | 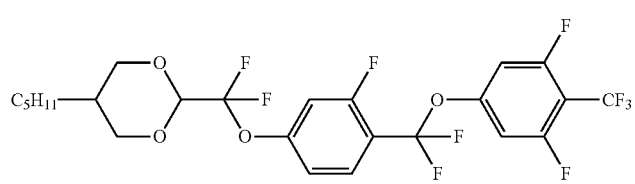 |
| 76 | 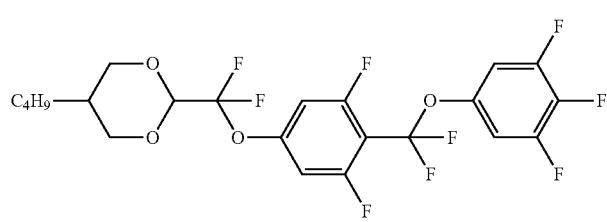 |
| 77 | 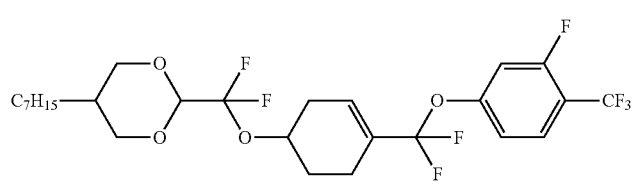 |
| 78 | 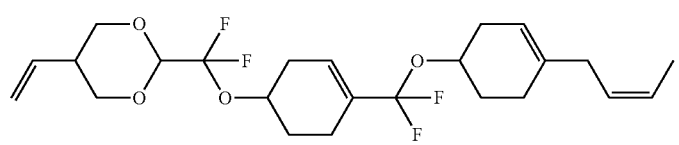 [SMILES: C=CC1COC(C(F)(F)OC2CC=C(C(F)(F)OC3CC=C(C/C=C\C)CC3)CC2)OC1] |

| No. |  |
|---|---|
| 79 | 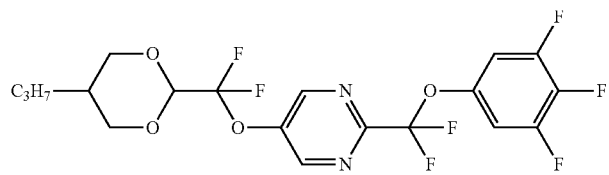 |
| 80 | 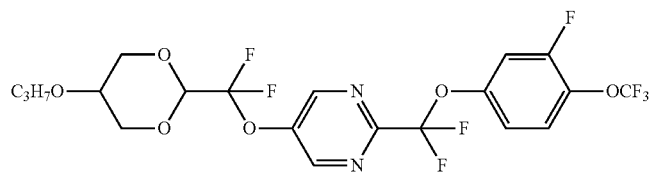 |
| 81 | 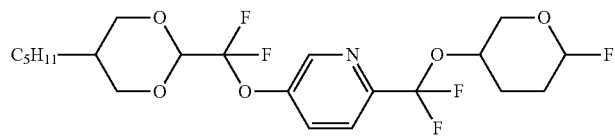 |
| 82 | 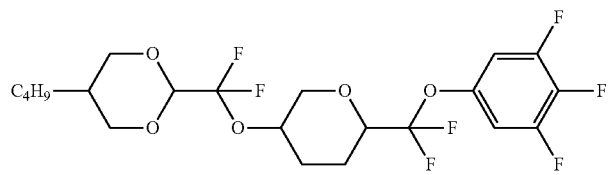 |
| 83 | 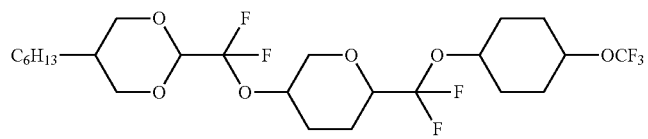 |
| 84 | 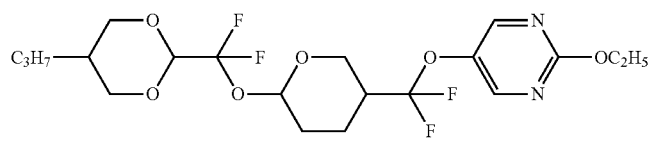 |
| 85 | 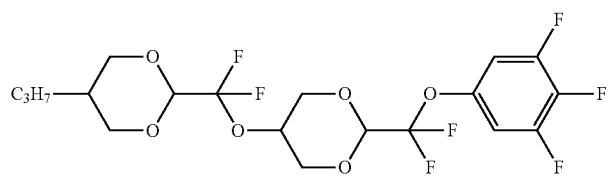 |
| 86 | 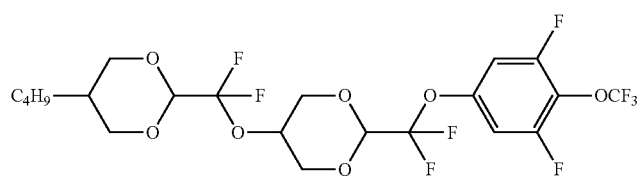 |
| 87 | 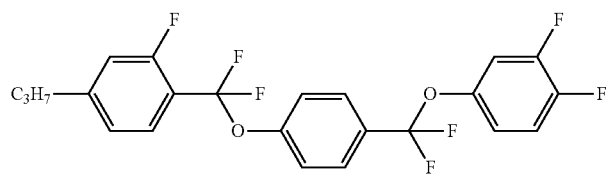 |

-continued
| No. | |
|---|---|
| 88 | 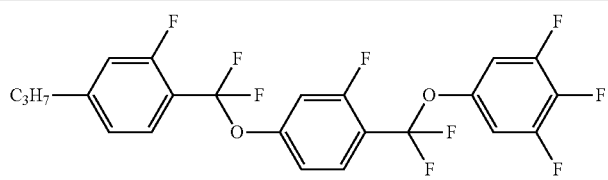 |
| 89 | 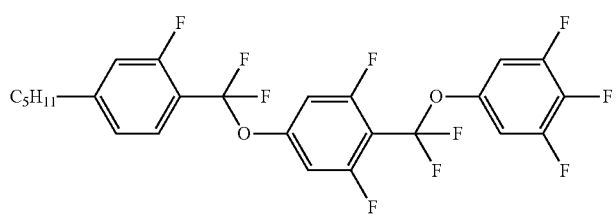 |
| 90 | 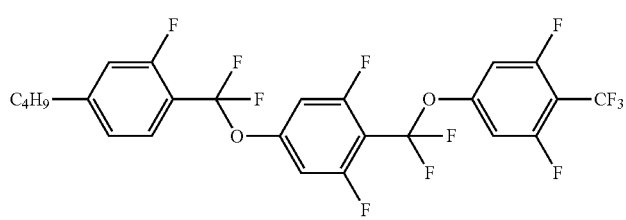 |
| 91 | 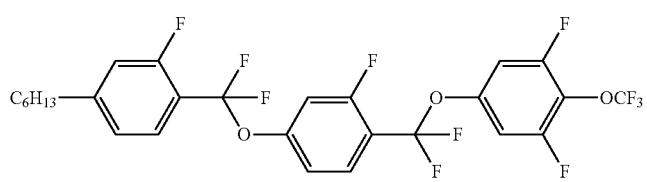 |
| 92 | 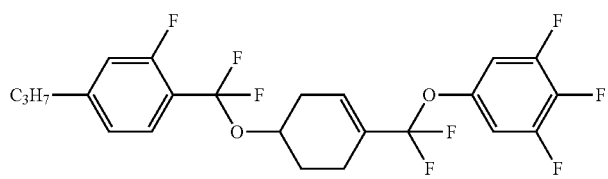 |
| 93 | 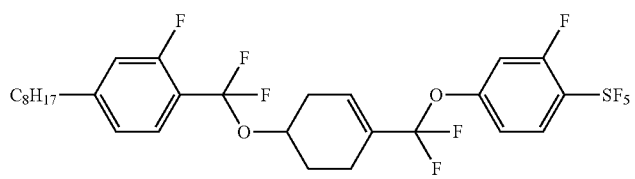 |
| 94 | 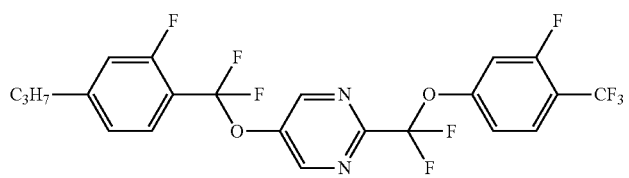 |
| 95 | 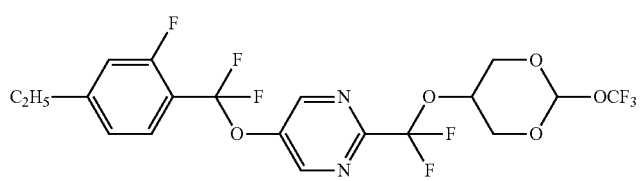 [SMILES: CCc1ccc(C(F)(F)Oc2cnc(C(F)(F)OC3COC(OC(F)(F)F)OC3)nc2)c(F)c1] |

| No. |
|---|
| 96 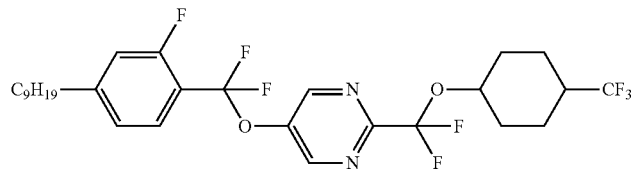 |
| Formula 50 |
| 97 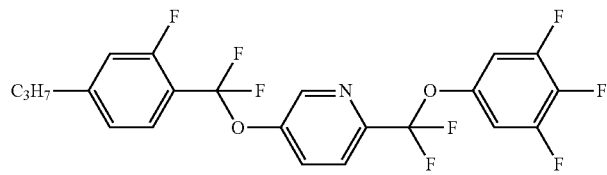 |
| 98 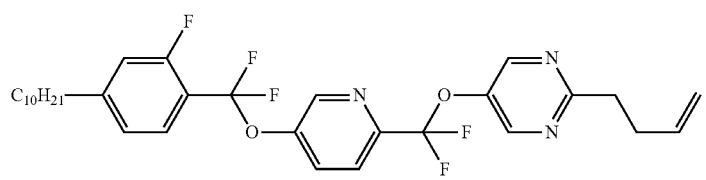 |
| 99 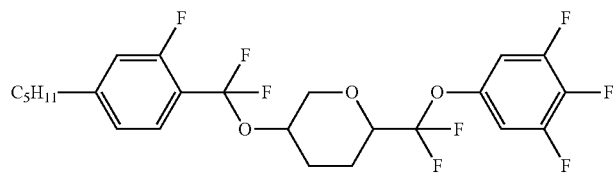 |
| 100 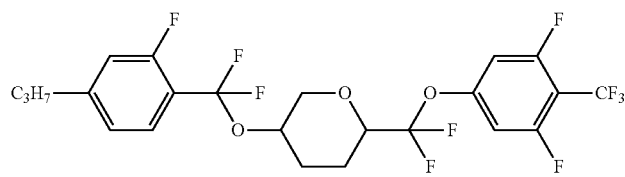 |
| 101 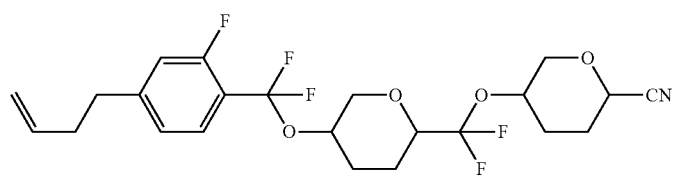 [SMILES: C=CCCc1ccc(C(F)(F)OC2CCC(C(F)(F)OC3CCC(C#N)OC3)OC2)c(F)c1] |
| 102 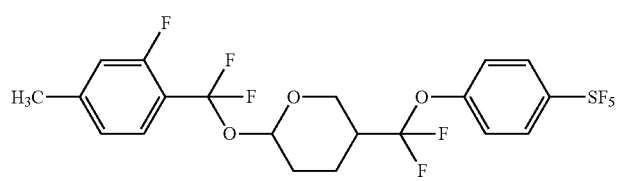 |
| 103 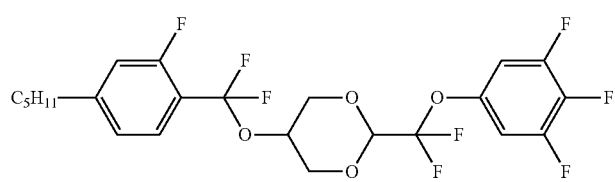 |

-continued
| No. | |
|---|---|
| 104 | 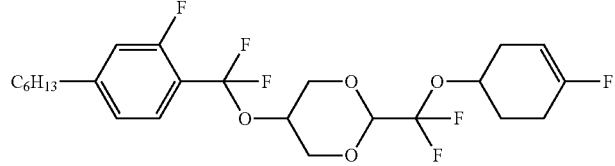 |
| 105 | 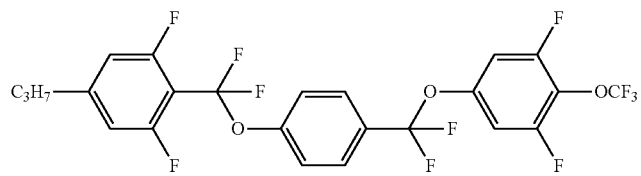 |
| 106 | 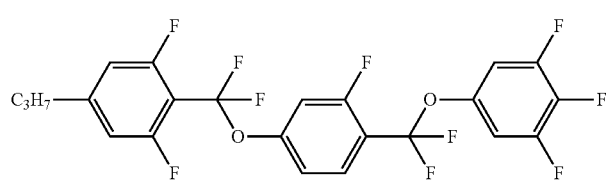 |
| 107 | 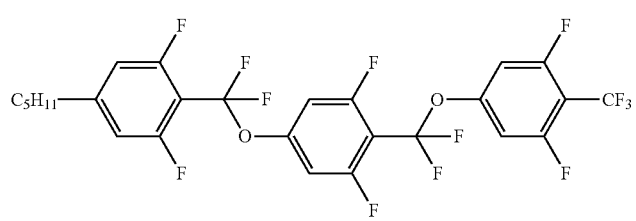 |
| 108 | 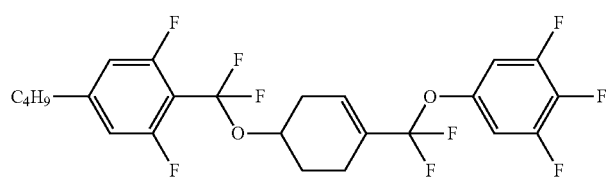 |
| 109 | 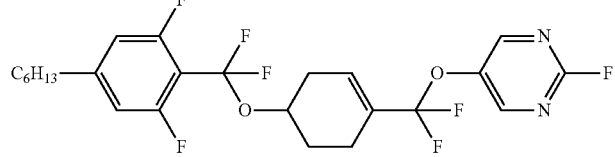 |
| 110 | 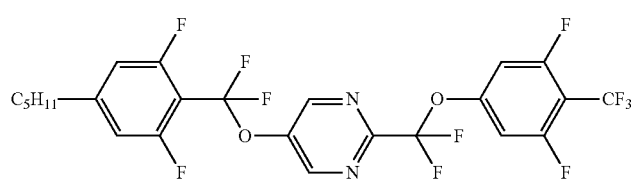 |
| 111 | 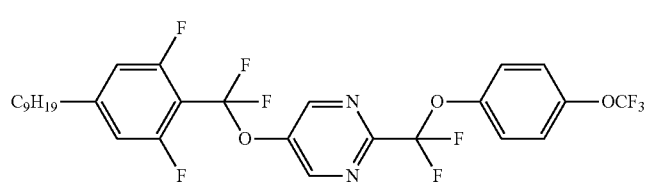 |

-continued
| No. | |
|---|---|
| 112 | 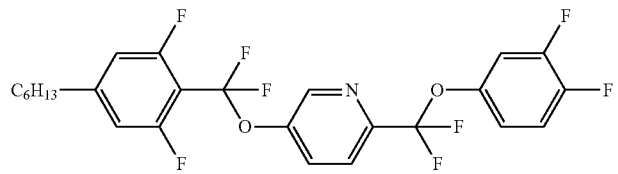 |
| 113 | 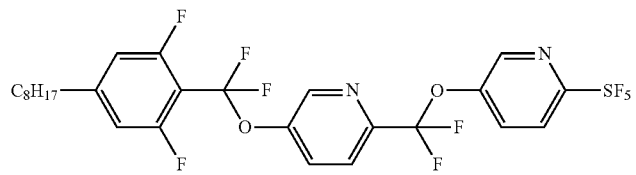 |
| 114 | 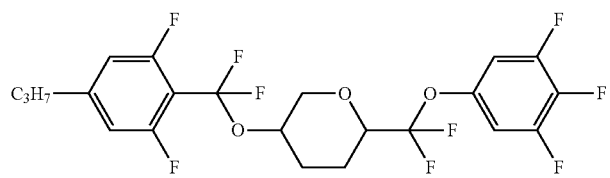 |
| 115 | 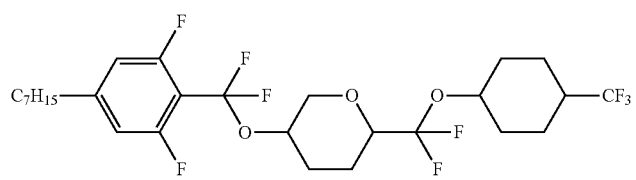 |
| 116 | 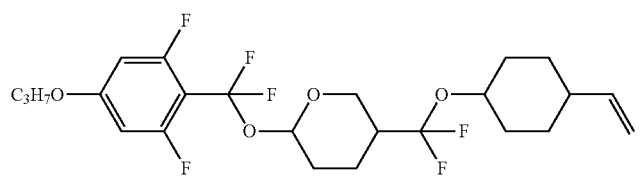 |
| 117 | 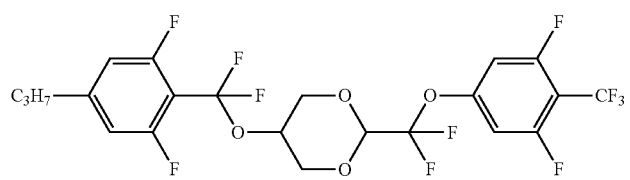 |
| 118 | 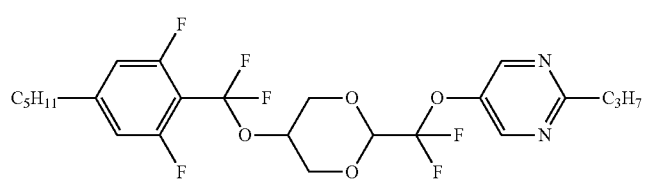 |
| 119 | 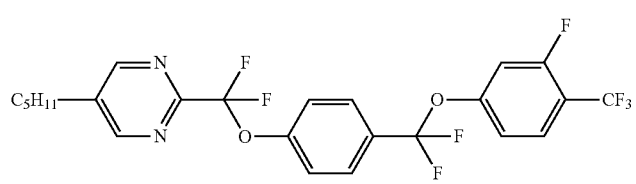 |

| No. | |
|---|---|
| 120 | 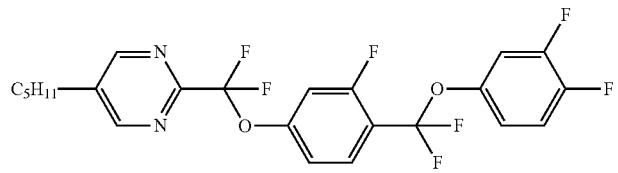 |
| | Formula 51 |
| 121 | 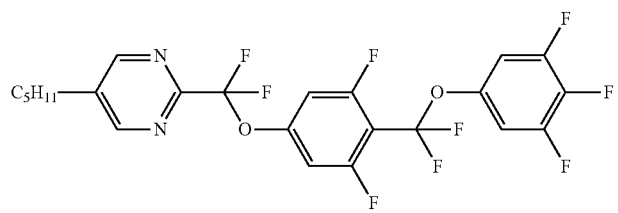 |
| 122 | 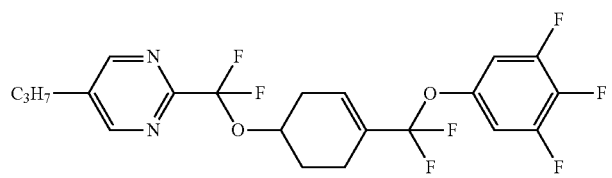 |
| 123 | 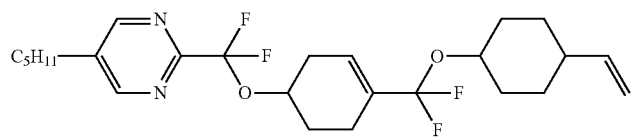 |
| 124 | 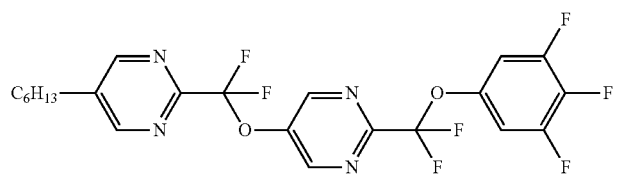 |
| 125 | 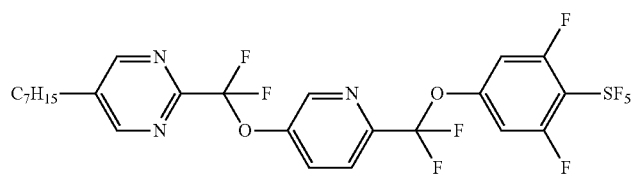 |
| 126 | 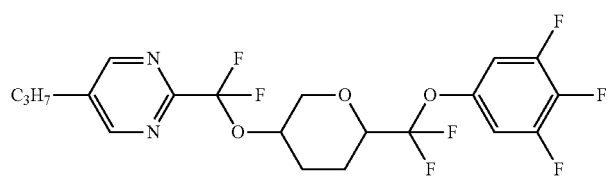 |
| 127 | 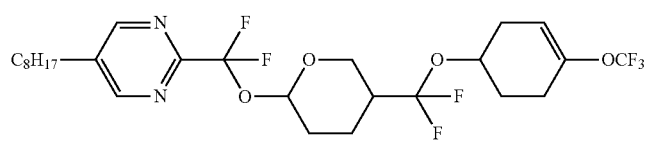 |

-continued
| No. | |
|---|---|
| 128 | 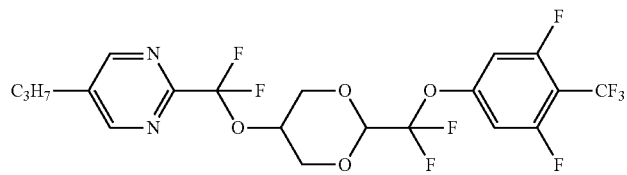 |
| 129 | 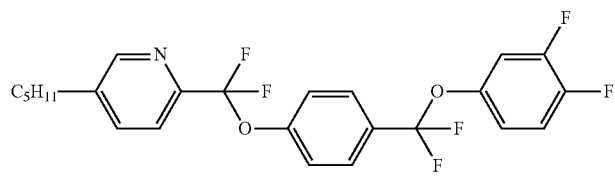 |
| 130 | 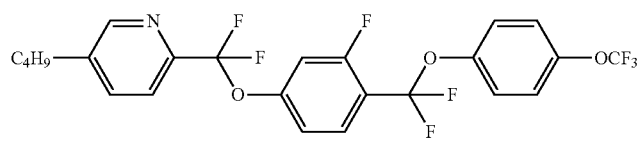 |
| 131 | 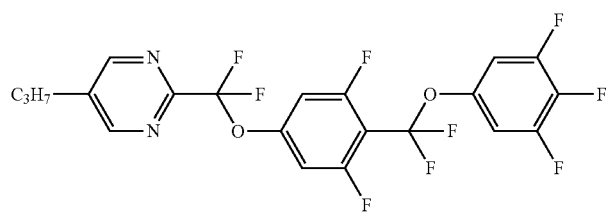 |
| 132 | 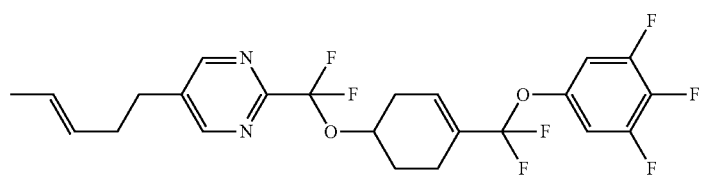 [SMILES: C/C=C/CCc1cnc(C(F)(F)OC2CC=C(C(F)(F)Oc3cc(F)c(F)c(F)c3)CC2)nc1] |
| 133 |  |
| 134 | 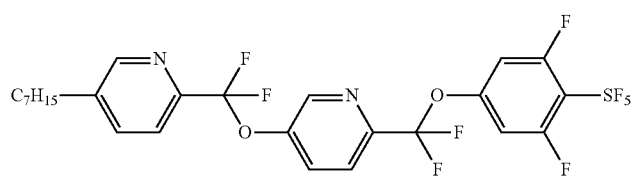 |
| 135 | 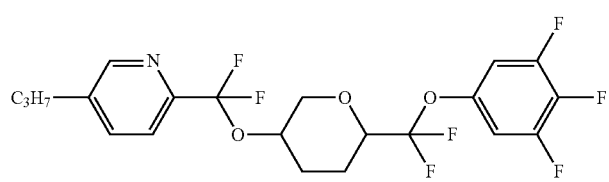 |
| 136 | 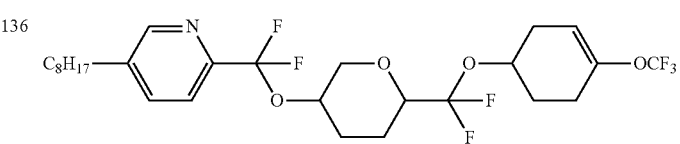 |

| No. | |
|---|---|
| 137 | 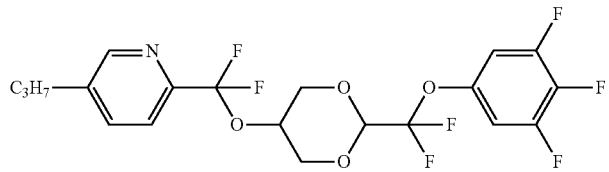 |

Examples of Liquid Crystal Compositions

Each compound used in Examples was described using symbols according to definitions in Table 2. In Table 2, a configuration of 1,4-cyclohexylene is trans. A parenthesized number next to a symbolized compound in Examples corresponds to the number of the compound. A symbol (–) means any other liquid crystal compound. A ratio (percentage) of the liquid crystal compounds is expressed in terms of mass percent (% by mass) based on the total mass of the liquid crystal composition. Values of physical properties of the composition were summarized in the last part. The physical properties were measured according to the methods described above, and directly described without extrapolating the measured values.

TABLE 2

Table Method for Description of Compounds using Symbols
R—(A$_1$)—Z$_1$— ... —Z—(A$_n$)—R'

| 1) Left-terminal Group R— | Symbol |
|---|---|
| C$_n$H$_{2n+1}$— | n- |
| C$_n$H$_{2n+1}$O— | nO— |
| C$_m$H$_{2m+1}$OC$_n$H$_{2n}$— | mOn— |
| CH$_2$=CH— | V— |
| C$_n$H$_{2n+1}$—CH=CH— | nV— |
| CH$_2$=CH—C$_n$H$_{2n}$— | Vn— |
| C$_m$H$_{2m+1}$—CH=CH—C$_n$H$_{2n}$— | mVn— |
| CF$_2$ | VFF— |
| CF$_2$=CH—C$_n$H$_{2n}$— | VFFn— |

| 2) Right-terminal Group —R' | Symbol |
|---|---|
| —C$_n$H$_{2n+1}$ | -n |
| —OC$_n$H$_{2n+1}$ | —On |
| —COOCH$_3$ | —EMe |
| —CH=CH$_2$— | —V |
| —CH=CH—C$_n$H$_{2n+1}$ | —Vn |
| —C$_n$H$_{2n}$—CH=CH$_2$ | —nV |
| —C$_m$H$_m$—CH=CH—CnH2n + 1 | —mVn |
| —CH=CF$_2$ | —VFF |
| —F | —F |
| —Cl | —CL |
| —OCF$_3$ | —OCF$_3$ |
| —OCHF$_2$ | —OCHF2 |
| CF$_3$ | —CF3 |

| 3) Bonding Group —Z$_n$— | Symbol |
|---|---|
| —C$_n$H$_{2n}$— | n |
| —COO— | E |
| —CH=CH— | V |
| —CH$_2$O— | 1O |
| —OCH$_2$— | O1 |
| —CF$_2$O— | X |
| —C≡C— | T |

TABLE 2-continued

Table Method for Description of Compounds using Symbols
R—(A$_1$)—Z$_1$— ... —Z—(A$_n$)—R'

| 4) Ring Structure —A$_n$— | Symbol |
|---|---|
| cyclohexylene | H |
| phenylene | B |
| fluorophenylene | B(F) |
| 2-fluorophenylene | B(2F) |
| difluorophenylene | B(F,F) |
| 2,5-difluorophenylene | B(2F,5F) |
| 2,3-difluorophenylene | B(2F,3F) |
| pyrimidine | Py |
| dioxane | G |

TABLE 2-continued

Table Method for Description of Compounds using Symbols
R—(A₁)—Z₁— ... —Z—(Aₙ)—R'

5) Examples of Desription

Example 1  3-HXB(F)XB(F,F)—F

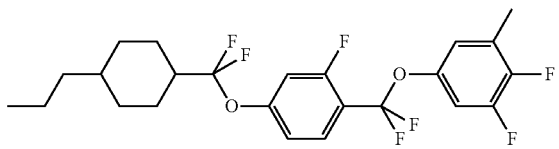 [SMILES: CCCC1CCC(C(F)(F)Oc2ccc(C(F)(F)Oc3cc(C)c(F)c(F)c3)c(F)c2)CC1]

Example 2  3-HXBXB(F,F)—CF3

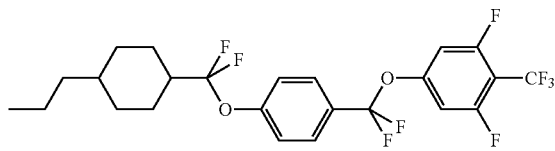 [SMILES: CCCC1CCC(C(F)(F)Oc2ccc(C(F)(F)Oc3cc(F)c(C(F)(F)F)c(F)c3)cc2)CC1]

Example 3  3-HH-4

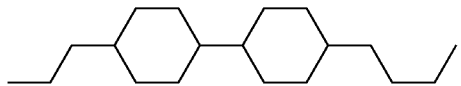 [SMILES: CCCCC1CCC(C2CCC(CCC)CC2)CC1]

Example 4  V2-BB-1

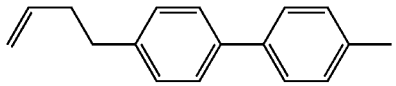

Example 1B

| | | |
|---|---|---|
| 3-HXBXB(F,F)-F | (No. 1) | 3% |
| 3-HXB(F)XB(F,F)-F | (No. 2) | 3% |
| 5-HB-CL | (2-2) | 16% |
| 3-HH-4 | (12-1) | 12% |
| 3-HH-5 | (12-1) | 4% |
| 3-HHB-F | (3-1) | 4% |
| 3-HHB-CL | (3-1) | 3% |
| 4-HHB-CL | (3-1) | 4% |
| 3-HHB(F)-F | (3-2) | 10% |
| 4-HHB(F)-F | (3-2) | 9% |
| 5-HHB(F)-F | (3-2) | 9% |
| 7-HHB(F)-F | (3-2) | 8% |
| 5-HBB(F)-F | (3-23) | 4% |
| 1O1-HBBH-5 | (14-1) | 3% |
| 3-HHBB(F,F)-F | (4-6) | 2% |
| 5-HHBB(F,F)-F | (4-6) | 3% |
| 3-HH2BB(F,F)-F | (4-15) | 3% |

A liquid crystal composition containing the components described above had values of physical properties as described below.

NI=106.3° C., Δn=0.087, Δ∈=4.3 and η=16.4 mPa·s.

Example 2B

| | | |
|---|---|---|
| 3-HXBXB(F,F)-F | (No. 1) | 4% |
| 3-HXBXB(F,F)-CF3 | (No. 4) | 4% |
| 3-HHB(F,F)-F | (3-3) | 9% |
| 3-H2HB(F,F)-F | (3-15) | 8% |
| 4-H2HB(F,F)-F | (3-15) | 8% |
| 5-H2HB(F,F)-F | (3-15) | 8% |
| 3-HBB(F,F)-F | (3-24) | 17% |
| 5-HBB(F,F)-F | (3-24) | 16% |
| 3-H2BB(F,F)-F | (3-27) | 10% |
| 5-HHBB(F,F)-F | (4-6) | 3% |
| 5-HHEBB-F | (4-17) | 2% |
| 3-HH2BB(F,F)-F | (4-15) | 3% |
| 1O1-HBBH-4 | (14-1) | 4% |
| 1O1-HBBH-5 | (14-1) | 4% |

A liquid crystal composition containing the components described above had values of physical properties as described below.

NI=97.1° C., Δn=0.114, Δ∈=9.9 and η=34.5 mPa·s.

Example 3B

| | | |
|---|---|---|
| 3-HXBXB(F,F)-F | (No. 1) | 3% |
| 3-HXB(F)XB(F,F)-F | (No. 2) | 3% |
| 3-HXBXB(F,F)-CF3 | (No. 4) | 3% |
| 5-HB-F | (2-2) | 9% |
| 6-HB-F | (2-2) | 9% |
| 7-HB-F | (2-2) | 7% |
| 2-HHB-OCF3 | (3-1) | 7% |
| 3-HHB-OCF3 | (3-1) | 7% |
| 4-HHB-OCF3 | (3-1) | 7% |
| 5-HHB-OCF3 | (3-1) | 5% |
| 3-HH2B-OCF3 | (3-4) | 4% |
| 5-HH2B-OCF3 | (3-4) | 4% |
| 3-HHB(F,F)-OCHF2 | (3-3) | 4% |
| 3-HHB(F,F)-OCF3 | (3-3) | 5% |
| 3-HH2B(F)-F | (3-5) | 3% |
| 3-HBB(F)-F | (3-23) | 7% |
| 5-HBB(F)-F | (3-23) | 7% |
| 5-HBBH-3 | (14-1) | 3% |
| 3-HB(F)BH-3 | (14-2) | 3% |

A liquid crystal composition containing the components described above had values of physical properties as described below.

NI=84.7° C., Δn=0.091, Δ∈=5.9 and η=16.4 mPa·s. A pitch when 0.25 part by mass of Op-5 (optically active compound) was added to 100 parts by mass of the liquid crystal composition was 60.7 micrometers.

Example 4B

| | | |
|---|---|---|
| 3-HXBXB(F,F)-F | (No. 1) | 4% |
| 3-HXB(F)XB(F,F)-F | (No. 2) | 4% |
| 5-HB-CL | (2-2) | 8% |
| 3-HH-4 | (12-1) | 8% |
| 3-HHB-1 | (13-1) | 2% |
| 3-HHB(F,F)-F | (3-3) | 8% |
| 3-HBB(F,F)-F | (3-24) | 20% |
| 5-HBB(F,F)-F | (3-24) | 15% |
| 3-HHEB(F,F)-F | (3-12) | 8% |
| 4-HHEB(F,F)-F | (3-12) | 3% |
| 5-HHEB(F,F)-F | (3-12) | 3% |
| 2-HBEB(F,F)-F | (3-39) | 3% |
| 3-HBEB(F,F)-F | (3-39) | 5% |
| 5-HBEB(F,F)-F | (3-39) | 3% |
| 3-HHBB(F,F)-F | (4-6) | 6% |

A liquid crystal composition containing the components described above had values of physical properties as described below.

NI=76.6° C., Δn=0.103, Δ∈=9.8 and η=23.5 mPa·s.

Example 5B

| 3-HXB(F)XB(F,F)-F | (No. 2) | 4% |
|---|---|---|
| 3-HXBXB(F,F)-CF3 | (No. 4) | 4% |
| 3-HB-CL | (2-2) | 3% |
| 5-HB-CL | (2-2) | 4% |
| 3-HHB-OCF3 | (3-1) | 5% |
| 3-H2HB-OCF3 | (3-13) | 5% |
| 5-H4HB-OCF3 | (3-19) | 15% |
| V-HHB(F)-F | (3-2) | 5% |
| 3-HHB(F)-F | (3-2) | 5% |
| 5-HHB(F)-F | (3-2) | 5% |
| 3-H4HB(F,F)-CF3 | (3-21) | 8% |
| 5-H4HB(F,F)-CF3 | (3-21) | 10% |
| 5-H2HB(F,F)-F | (3-15) | 5% |
| 5-H4HB(F,F)-F | (3-21) | 7% |
| 2-H2BB(F)-F | (3-26) | 5% |
| 3-H2BB(F)-F | (3-26) | 5% |
| 3-HBEB(F,F)-F | (3-39) | 5% |

A liquid crystal composition containing the components described above had values of physical properties as described below.

NI=68.7° C., Δn=0.095, Δ∈=9.6 and η=27.1 mPa·s.

Example 6B

| 3-HXBXB(F,F)-F | (No. 1) | 3% |
|---|---|---|
| 3-HXBXB(F,F)-CF3 | (No. 4) | 3% |
| 5-HB-CL | (2-2) | 14% |
| 7-HB(F,F)-F | (2-4) | 3% |
| 7-HB-1 | (12-5) | 5% |
| 3-HB-O2 | (12-5) | 12% |
| V2-BB-1 | (12-8) | 5% |
| 3-HHB-1 | (13-1) | 8% |
| 3-HHB-3 | (13-1) | 5% |
| 3-HHB-O1 | (13-1) | 5% |
| 2-HHB(F)-F | (3-2) | 7% |
| 3-HHB(F)-F | (3-2) | 7% |
| 5-HHB(F)-F | (3-2) | 7% |
| 3-HHB(F,F)-F | (3-3) | 6% |
| 3-H2HB(F,F)-F | (3-15) | 5% |
| 4-H2HB(F,F)-F | (3-15) | 5% |

A liquid crystal composition containing the components described above had values of physical properties as described below.

NI=70.1° C., Δn=0.085, Δ∈=4.2 and η=16.7 mPa·s.

Example 7B

| 3-HXBXB(F,F)-F | (No. 1) | 5% |
|---|---|---|
| 3-HXB(F)XB(F,F)-F | (No. 2) | 4% |
| 5-HB-CL | (2-2) | 3% |
| 7-HB(F)-F | (2-3) | 7% |
| 3-HB-O2 | (12-5) | 9% |
| 3-HH-EMe | (12-2) | 23% |
| 3-HHEB-F | (3-10) | 8% |
| 5-HHEB-F | (3-10) | 8% |
| 3-HHEB(F,F)-F | (3-12) | 10% |
| 4-HHEB(F,F)-F | (3-12) | 5% |
| 5-HGB(F,F)-F | (3-103) | 6% |
| 3-H2GB(F,F)-F | (3-106) | 5% |
| 5-GHB(F,F)-F | (3-109) | 7% |

A liquid crystal composition containing the components described above had values of physical properties as described below.

NI=75.3° C., Δn=0.070, Δ∈=6.3 and η=19.3 mPa·s.

Example 8B

| 3-HXBXB(F,F)-F | (No. 1) | 3% |
|---|---|---|
| 3-HXB(F)XB(F,F)-F | (No. 2) | 3% |
| 3-HXBXB(F,F)-CF3 | (No. 4) | 3% |
| 3-HB-O2 | (12-5) | 10% |
| 5-HB-CL | (2-2) | 13% |
| 3-HBB(F,F)-F | (3-24) | 7% |
| 3-PyB(F)-F | (2-15) | 10% |
| 5-PyB(F)-F | (2-15) | 10% |
| 3-PyBB-F | (3-80) | 10% |
| 4-PyBB-F | (3-80) | 10% |
| 5-PyBB-F | (3-80) | 10% |
| 5-HBB(F)B-2 | (14-5) | 6% |
| 5-HBB(F)B-3 | (14-5) | 5% |

A liquid crystal composition containing the components described above had values of physical properties as described below.

NI=81.9° C., Δn=0.176, Δ∈=9.6 and η=37.5 mPa·s.

Example 9B

| 3-HXBXB(F,F)-F | (No. 1) | 4% |
|---|---|---|
| 3-HXBXB(F,F)-CF3 | (No. 4) | 4% |
| 3-HH-V | (12-1) | 25% |
| 3-BB(F,F)XB(F,F)-F | (3-97) | 18% |
| 3-HHB-1 | (13-1) | 2% |
| 2-HBB-F | (3-22) | 3% |
| 3-HBB-F | (3-22) | 4% |
| 3-HHB-CL | (3-1) | 7% |
| 1-BB(F)B-2V | (13-6) | 6% |
| 2-BB(F)B-2V | (13-6) | 6% |
| 3-BB(F)B-2V | (13-6) | 3% |
| 2-HHB(F,F)-F | (3-3) | 4% |
| 3-HHB(F,F)-F | (3-3) | 4% |
| 4-BB(F)B(F,F)XB(F,F)-F | (4-47) | 10% |

A liquid crystal composition containing the components described above had values of physical properties as described below.

NI=87.0° C., Δn=0.137, Δ∈=9.5 and η=22.4 mPa·s.

Example 10B

| 3-HXBXB(F,F)-F | (No. 1) | 4% |
|---|---|---|
| 3-HXB(F)XB(F,F)-F | (No. 2) | 4% |
| 3-HB-O1 | (12-5) | 15% |
| 3-HH-4 | (12-1) | 5% |
| 3-HB(2F,3F)-O2 | (6-1) | 12% |
| 5-HB(2F,3F)-O2 | (6-1) | 12% |
| 2-HHB(2F,3F)-1 | (7-1) | 12% |
| 3-HHB(2F,3F)-1 | (7-1) | 10% |
| 3-HHB(2F,3F)-O2 | (7-1) | 7% |
| 5-HHB(2F,3F)-O2 | (7-1) | 13% |
| 3-HHB-1 | (13-1) | 6% |

A liquid crystal composition containing the components described above had values of physical properties as described below.

NI=77.6° C., Δn=0.087, Δ∈=−1.4 and η=34.5 mPa·s.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

INDUSTRIAL APPLICABILITY

Compound (1) of the invention has a high stability to heat, light and so forth, a high clearing point, a low minimum temperature of a liquid crystal phase, a small viscosity, a large value of dielectric anisotropy, a suitable value of optical anisotropy, a suitable elastic constant and an excellent compatibility with other liquid crystal compounds. A liquid crystal composition of the invention contains the compound (1), and has a high maximum temperature of a nematic phase, a low minimum temperature of the nematic phase, a small viscosity, a large value of dielectric anisotropy, a suitable value of optical anisotropy and a suitable elastic constant. The composition has a suitable balance regarding at least two of characteristics. A liquid crystal display device of the invention includes the composition, and has a wide temperature range in which the device can be used, a short response time, a large voltage holding ratio, a large contrast ratio and a long service life. Accordingly, the device can be widely utilized for the liquid crystal display device used for a personal computer, a television or the like.

What is claimed is:

1. A compound represented by formula (1);

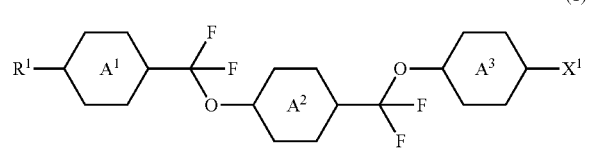

(1)

wherein, in formula (1), $R^1$ is hydrogen, halogen or alkyl having 1 to 20 carbons, and in the alkyl, at least one of —$CH_2$— may be replaced by —O— or —S—, at least one of —$(CH_2)_2$— may be replaced by —CH=CH—, and at least one of hydrogen may be replaced by halogen;

ring $A^1$ is 1,4-cyclohexylene, 2-fluoro-1,4-phenylene, 2,6-difluoro-1,4-phenylene, 1,3-dioxane-2,5-diyl or tetrahydropyran-2,5-diyl;

ring $A^2$ is 1,4-phenylene, 2-fluoro-1,4-phenylene, or 2,6-difluoro-1,4-phenylene;

ring $A^3$ is 2 fluoro-1,4-phenylene, or 2,6-difluoro-1,4-phenylene; and $X^1$ is hydrogen, halogen, —C≡N, —N=C=S, —$SF_5$ or alkyl having 1 to 10 carbons, and in the alkyl, at least one of —$CH_2$— may be replaced by —O— or —S—, at least one of —$(CH_2)_2$— may be replaced by —CH=CH—, and at least one of hydrogen may be replaced by halogen.

2. The compound according to claim 1, represented by formula (1-1):

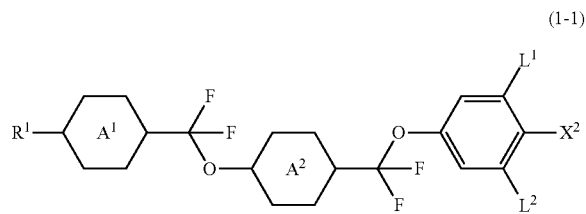

(1-1)

wherein, in formula (1-1), $R^1$ is alkyl having 1 to 15 carbons, and in the alkyl, at least one of may be replaced by —O— or —S—, at least one of —$(CH_2)_2$— may be replaced by —CH=CH—, and at least one of hydrogen may be replaced by fluorine;

ring $A^1$ is 1,4-cyclohexylene, 2-fluoro-1,4-phenylene, 2,6-difluoro-1,4-phenylene, 1,3-dioxane-2,5-diyl or tetrahydropyran-2,5-diyl;

ring $A^2$ is 1,4-phenylene, 2-fluoro-1,4-phenylene, or 2,6-difluoro-1,4-phenylene;

$L^1$ is hydrogen or fluorine; and $X^2$ is fluorine of alkyl having 1 to 10 carbons, and in the alkyl, at least one of —$CH_2$— may be replaced by —O— or —S—, at least one of —$(CH_2)_2$— may be replaced by —CH=CH—, and at least one of hydrogen may be replaced by fluorine.

3. The compound according to claim 1, represented by formula (1-1-1):

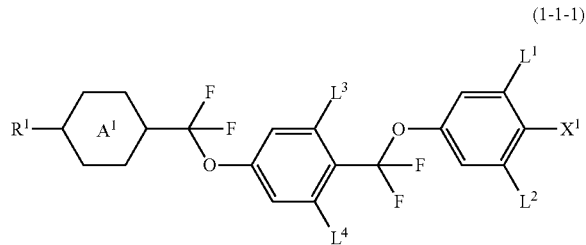

(1-1-1)

wherein, in formula (1-1-1), $R^1$ is alkyl having 1 to 10 carbons, and in the alkyl, at least one of —$CH_2$— may be replaced by —O—, and at least one of —$(CH_2)_2$— may be replaced by —CH=CH—;

ring $A^1$ is 1,4-cyclohexylene, 2-fluoro-1,4-phenylene, 2,6-difluoro-1,4-phenylene, 1,3-dioxane-2,5-diyl or tetrahydropyran-2,5-diyl;

$L^1$, $L^3$ and $L^4$ are independently hydrogen or fluorine; and $X^3$ is fluorine or —$CF_3$.

4. The compound according to claim 1, represented by any one of formulas (1-1-1-1) to (1-1-1-3):

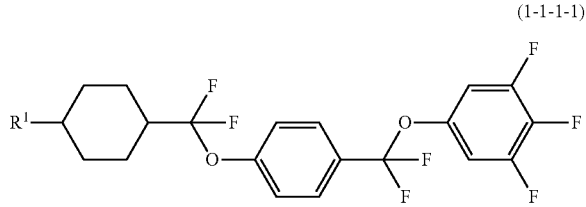

(1-1-1-1)

-continued

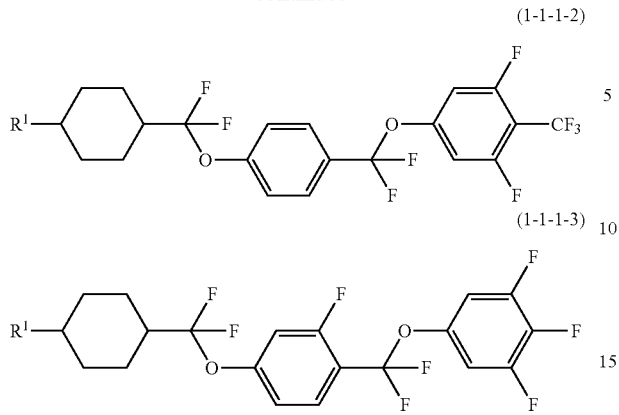

(1-1-1-2)

(1-1-1-3)

wherein, in formulas (1-1-1-1) to (1-1-1-3), $R^1$ is alkyl having 1 to 10 carbons.

5. A liquid crystal composition containing at least one compound according to claim 1.

6. The liquid crystal composition according to claim 5, further containing at least one compound selected from the group of compounds represented by formulas (2) to (4):

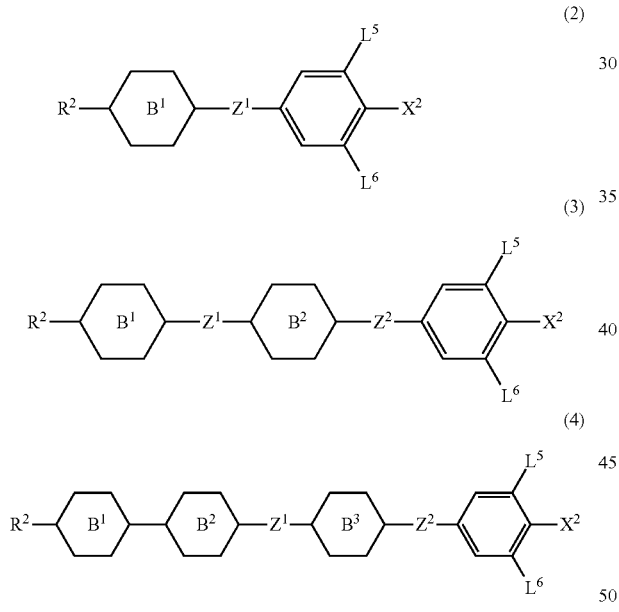

(2)

(3)

(4)

wherein, in formulas (2) to (4),
$R^2$ is independently alkyl having 1 to 10 carbons or alkenyl having 2 to 10 carbons, and in the alkyl and the alkenyl, at least one of hydrogen may be replaced by fluorine, and at least one of —$CH_2$— may be replaced by —O—;
$X^2$ is fluorine chlorine, —$OCF_3$, —$OCHF_2$, —$CF_3$, —$CHF_2$, —$CH_2F$, —$CF$=$CF_2$, —$OCF_2CHF_2$ or —$OCF_2CHFCF_3$;
ring $B^1$, ring $B^2$ and ring $B^3$ are independently 1,4-cyclohexylene, 1,4-phenylene, 2-fluoro-1,4-phenylene, 2,6-difluoro-1,4-phenylene, tetrahydropyran-2,5-diyl, 1,3-dioxane-2,5-diyl or pyrimidine-2,5-diyl;
$Z^1$ and $Z^2$ are independently a single bond, —$(CH_2)_2$—, —CH=CH—, —C≡C—, —COO—, —$CF_2O$—, —$OCF_2$—, —$CH_2O$— or —$(CH_2)_4$—,
with the proviso that $Z^1$ and $Z^2$ cannot both be —$CF_2O$— in formula (3); and
$L^5$ and $L^6$ are independently hydrogen or fluorine, however, when both $Z^1$ and $Z^2$ are —$OCF_2$— in formula (3), both $L^5$ and $L^6$ are hydrogen.

7. The liquid crystal composition according to claim 5, further containing a compound represented by formula (5):

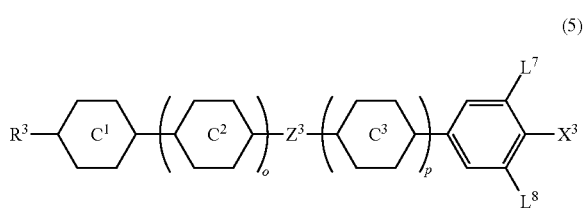

(5)

wherein, in formula (5),
$R^3$ is alkyl having 1 to 10 carbons or alkenyl having 2 to 10 carbons, and in the alkyl and the alkenyl, at least one of hydrogen may be replaced by fluorine, and at least one of —$CH_2$— may be replaced by —O—;
$X^3$ is —C≡N or —C≡C—C≡N;
ring $C^1$, ring $C^2$ and ring $C^3$ are independently 1,4-cyclohexylene, 1,4-phenylene, tetrahydropyran-2,5-diyl, 1,3-dioxane-2,5-diyl or pyrimidine-2,5-diyl, and in the 1,4-phenylene, at least one of hydrogen may be replaced by fluorine;
$Z^3$ is a single bond, —$(CH_2)_2$—, —C≡C—, —COO—, —$CF_2O$—, —$OCF_2$— or —$CH_2O$—;
$L^7$ and $L^8$ are independently hydrogen or fluorine; and
o is 0, 1 or 2, p is 0 or 1, and
a sum of o and p is 0, 1, 2 or 3.

8. The liquid crystal composition according to claim 5, further containing at least one compound selected from the group of compounds represented by formulas (6) to (11):

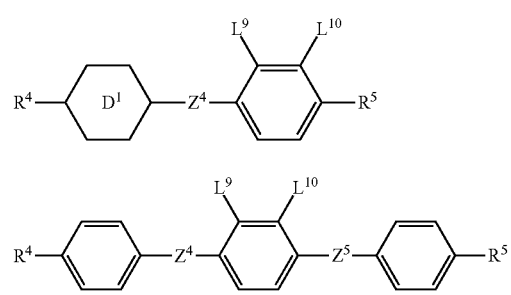

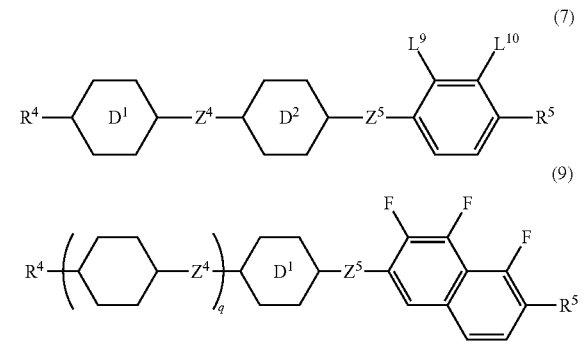

(6)

(7)

(8)

(9)

(10)

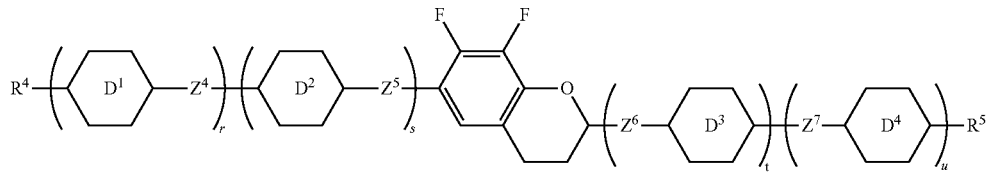

(11)

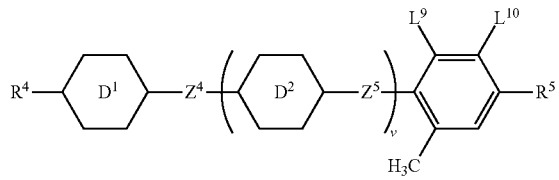

wherein, in formulas (6) to (11), $R^4$ and $R^5$ are independently alkyl having 1 to 10 carbons or alkenyl having 2 to 10 carbons, and in the alkyl and the alkenyl, at least one of hydrogen may be replaced by fluorine, and at least one of —$CH_2$— may be replaced by —O—;

ring $D^1$, ring $D^2$, ring $D^3$ and ring $D^4$ are independently 1,4-cyclohexylene, 1,4-cyclohexenylene, 1,4-phenylene, tetrahydropyran-2,5-diyl or decahydro-2,6-naphthalene, and in the 1,4-phenylene, at least one of hydrogen may be replaced by fluorine;

$Z^4$, $Z^5$, $Z^6$ and $Z^7$ are independently a single bond, —$(CH_2)_2$—, —COO—, —$CH_2O$—, —$OCF_2$— or —$OCF_2(CH_2)_2$—;

$L^9$ and $L^{10}$ are independently fluorine or chlorine; and q, r, s, t, u and v are independently 0 or 1, and a sum of r, s, t and u is 1 or 2.

9. The liquid crystal composition according to claim 5, further containing at least one compound selected from the group of compounds represented by formulas (12) to (14):

(12)

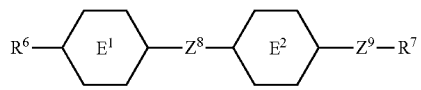

(13)

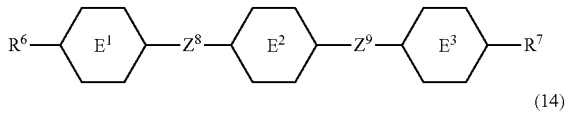

(14)

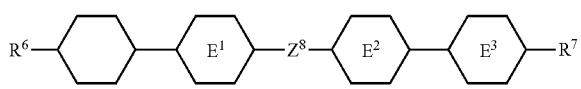

wherein, in formulas (12) to (14), $R^6$ and $R^7$ are independently alkyl having 1 to 10 carbons or alkenyl having 2 to 10 carbons, and in the alkyl and the alkenyl, at least one of may be replaced by —O—;

ring $E^1$, ring $E^2$ and ring $E^3$ are independently 1,4-cyclohexylene, 1,4-phenylene, 2-fluoro-1,4-phenylene, 2,5-difluoro-1,4-phenylene or pyrimidine-2,5-diyl; and $Z^8$ and $Z^9$ are independently a single bond, —$(CH_2)$—, —CH=CH—, —C≡C— or —COO—.

10. The liquid crystal composition according to claim 5, further containing an optically active compound.

11. A liquid crystal display device including the liquid crystal composition according to claim 5.

* * * * *